US012622454B2

(12) United States Patent
Suzuki et al.

(10) Patent No.: US 12,622,454 B2
(45) Date of Patent: May 12, 2026

(54) MANUFACTURING METHOD FOR STARCH-CONTAINING COMPOSITION FOR HEAT COOKING

(71) Applicant: MIZKAN HOLDINGS CO., LTD., Aichi (JP)

(72) Inventors: Makoto Suzuki, Aichi (JP); Kiyoshi Endo, Aichi (JP); Yusuke Tange, Aichi (JP); Kota Ono, Aichi (JP); Mariko Nakamura, Aichi (JP)

(73) Assignee: MIZKAN HOLDINGS CO., LTD., Aichi (JP)

( * ) Notice: Subject to any disclaimer, the term of this patent is extended or adjusted under 35 U.S.C. 154(b) by 441 days.

(21) Appl. No.: 18/165,500

(22) Filed: Feb. 7, 2023

(65) Prior Publication Data

US 2023/0180815 A1 Jun. 15, 2023

Related U.S. Application Data

(63) Continuation of application No. PCT/JP2021/029437, filed on Aug. 6, 2021.

(30) Foreign Application Priority Data

Aug. 7, 2020 (JP) ................................. 2020-135377
Feb. 9, 2021 (WO) ................. PCT/JP2021/004829

(51) Int. Cl.
*A23P 30/20* (2016.01)
*A23L 11/00* (2021.01)
*A23L 29/212* (2016.01)

(52) U.S. Cl.
CPC ............... *A23P 30/20* (2016.08); *A23L 11/05* (2016.08); *A23L 29/212* (2016.08)

(58) Field of Classification Search
CPC .. A23C 1/00; A23C 1/06; A23C 1/065; A23C 1/142; A23C 1/144; A23C 1/149;
(Continued)

(56) References Cited

U.S. PATENT DOCUMENTS 3,904,769 A * 9/1975 Sair ........................... A23J 3/26
426/507
4,124,727 A * 11/1978 Rockland ................ A23L 11/05
426/441
(Continued)

FOREIGN PATENT DOCUMENTS

CN H09-506503 A 6/1997
CN 107927587 A 4/2018
(Continued)

OTHER PUBLICATIONS

International Search Report issued in corresponding International Application No. PCT/JP2021/029437 mailed Oct. 26, 2021 (3 pages).
(Continued)

*Primary Examiner* — Erik Kashnikow
*Assistant Examiner* — Austin Parker Taylor
(74) *Attorney, Agent, or Firm* — Osha Bergman Watanabe & Burton LLP

(57) ABSTRACT

A manufacturing method for a starch-containing composition that is not prone to collapsing shape in a liquid during heat cooking, is highly lusterless, and has excellent appearance which utilizes an extruder including a feeder for loading a food material and a die for discharging the food material after kneading and shaping. The screw has a first flight, a kneading, and a second flight section, and the barrel has a bend section at the first-half of the second flight section of the screw. A composition containing at least 3.0 mass % insoluble dietary fiber, at least 10.0 mass % starch, at least
(Continued)

Direction of extrusion 3.0 mass % protein, and a dry-basis water content of at least 25 mass % is prepared.; The composition is then heated under pressure, kneaded, and depressurized until the degree of gelatinization is lowered by at least 6 mass %.

20 Claims, 5 Drawing Sheets

(58) Field of Classification Search
CPC ........ A23C 1/1495; A23L 11/00; A23L 11/05; A23L 7/10; A23L 7/109; A23L 29/212; A23P 30/20
USPC ........................................ 426/448, 451, 516
See application file for complete search history.

(56) References Cited

U.S. PATENT DOCUMENTS

| | | | | | | |
|---|---|---|---|---|---|---|
| 5,165,950 | A | * | 11/1992 | Boehmer | ................ | A23L 7/165 |
| | | | | | | 426/449 |
| 5,208,062 | A | * | 5/1993 | Sugisawa | ................ | A23L 23/00 |
| | | | | | | 426/601 |
| 5,397,587 | A | | 3/1995 | Thompson et al. | | |
| 5,750,173 | A | * | 5/1998 | Kazemzadeh | ......... | A23K 50/40 |
| | | | | | | 426/302 |
| 5,989,620 | A | * | 11/1999 | Wang | ...................... | A23L 7/109 |
| | | | | | | 426/443 |
| 5,993,187 | A | * | 11/1999 | Manser | ................... | B29C 48/05 |
| | | | | | | 425/204 |
| 2003/0152681 | A1 | * | 8/2003 | Bortone | .................... | A23L 7/17 |
| | | | | | | 426/516 |
| 2009/0047390 | A1 | * | 2/2009 | Cassel | ..................... | A23L 7/111 |
| | | | | | | 426/92 |
| 2009/0142462 | A1 | * | 6/2009 | Zhu | ....................... | B29C 48/397 |
| | | | | | | 426/515 |
| 2009/0181126 | A1 | * | 7/2009 | Wicking | .............. | A23K 20/189 |
| | | | | | | 426/624 |
| 2013/0022732 | A1 | * | 1/2013 | Khan | ...................... | A23L 19/01 |
| | | | | | | 426/446 |
| 2015/0150288 | A1 | * | 6/2015 | Tutuncu | .................. | A23L 7/109 |
| | | | | | | 426/451 |
| 2016/0037803 | A1 | * | 2/2016 | Tumagyan | ............ | B29C 48/686 |
| | | | | | | 426/11 |
| 2019/0364925 | A1 | * | 12/2019 | Saarinen | ................. | A23P 30/20 |
| 2020/0120970 | A1 | * | 4/2020 | Rokey | .................... | A23K 10/20 |

FOREIGN PATENT DOCUMENTS

| | | | | | |
|---|---|---|---|---|---|
| CN | 108041459 | A | | 5/2018 | |
| CN | 108244501 | A | | 7/2018 | |
| GB | 2205475 | A | * 12/1988 | .............. A23P 30/20 |
| JP | H01-91751 | A | | 4/1989 | |
| JP | 2015-181417 | A | | 10/2015 | |

OTHER PUBLICATIONS

Writtenn Opinion issued in corresponding International Application No. PCT/JP2021/029437 mailed Oct. 26, 2021 (4 pages).

M.A. Gimenez et al., "Effect of extrusion conditions on physicochemical and sensorial properties of corn-broad beans (vicia faba) spaghetti type pasta" Food Chemistry, 2013, vol. 136, p. 538-545 (8 pages).

Qingbin (Mark) Guo et al., "Extruded corn soy blends: physicochemical and molecular characteriztion" Journal of Cereal Science, 2018, vol. 79, p. 486-493 (8 pages).

N. Wang et al., "Pasta-Like Product from Pea Flour by Twin-Screw Extrusion" Journal of Food Science, 1999, vol. 64, No. 4, p. 671-678 (8 pages).

Nobuko Yoshio, Journal of Agriculture and Health, 2010, https://www.alic.go.jp/joho (6 pages).

Shinichiro Kawamura, Journal of the Starch Industry Society, 1959, vol. 6, No. 2, p. 18-20 (3 pages).

Masako Kawanishi-Asaoka et al., "hysicochemical Properties of Various Legume Starches" Applied Sugar Science, 2018, vol. 8, No. 4, p. 307-318 (12 pages).

Notice of Reasons for Refusal issued in corresponding Japanese Application No. 2021-565142 mailed Jan. 4, 2022 (6 pages).

* cited by examiner

Direction of extrusion

302

302A

302B

Direction of
extrusion

800B / 802B

800B/ 802B

500B

500A

800A/ 802A

MANUFACTURING METHOD FOR STARCH-CONTAINING COMPOSITION FOR HEAT COOKING

TECHNICAL FIELD

One or more embodiments of the present invention relate to a composition containing starch for heat cooking.

BACKGROUND

Recently, food products have been required to combine not only good taste but also a beautiful appearance. In particular, there has been a demand for foods with a highly matte appearance to give a natural impression when photographed.

However, there are no conventional compositions for heat cooking that are less prone to shape disintegration during heat cooking and, at the same time, have a highly matte appearance.

In this regard, a method conventionally known to the art prevents vegetable tissues from collapsing and losing shape when stewing vegetables by using, as an anti-disintegration agent during stewing, a sugar composition containing 35 mass % or more of maltotriose relative to the total solid content (Patent Literature 1).

However, the anti-disintegration agent during stewing described in Patent Literature 1 imparts the unique flavor and texture of maltotriose to the food product, and that the high content of sugar results in a composition with lack of a matte texture and with an inferior appearance.

PATENT LITERATURE

[Patent Literature 1] JP2015-181417 A

One or more embodiments of the present invention are directed to providing a method for producing a starch-containing composition for heat cooking which does not easily disintegrate in shape during heat cooking in liquid, and which has a highly matte texture and an excellent appearance.

Through intensive efforts in view of various plant starches and their processing conditions, the present inventors have found that a composition that has both a matte appearance and resistance to disintegration during heat cooking can be produced by a method in which a composition containing certain amounts of starch and moisture is pressurized, heated and kneaded, and then rapidly depressurized and cooled using an extruder capable of rapid depressurization with cooling, to thereby disintegration the starch grains in the raw material and then to form an aged starch layer on the surface of the composition while creating a strong starch matrix structure inside the composition. Based on these findings, the present inventors have further conducted diligent research, and have finally completed the following inventions.

Specifically, aspects of one or more embodiments of the present invention include the following.

[Aspect 1] A method for producing a starch-containing composition for heat cooking using an extruder comprising:

a screw to be rotated by a motor;

a barrel surrounding the circumference of the screw;

a feeder, attached to the base side of the barrel, for injecting a food material; and a die section, attached to the tip side of the barrel, for molding and discharging a kneaded food material;

wherein the screw includes, from the base side to the tip side, at least a first flight section and a kneading section, and the barrel has a vent section at a position around the tip side on the kneading section of the screw, the method comprising the steps of:

(i) preparing a composition with an insoluble dietary fiber content of 3.0 mass % or more in terms of wet mass basis, a starch content of 10.0 mass % or more in terms of wet mass basis, a protein content of 3.0 mass % or more in terms of wet mass basis, and a dry mass basis moisture content of more than 25 mass %;

(ii) heating the composition prepared at step (i) along a course from the first flight section to the kneading section so as to reach a temperature of 100° C. or more but 200° C. or less at the kneading section under pressurized conditions, while kneading the composition with an SME value of 350 kJ/kg or more;

(iii) depressurizing the composition kneaded at step (ii), from the pressurized state at the kneading section to atmospheric pressure or less at the vent section; and (iv) lowering the degree of gelatinization in the composition kneaded at step (ii) by 6 mass % or more at the kneading section and onward.

[Aspect 2] The method according to Aspect 1, wherein the vent section and the die section are integrated as a single unit.

[Aspect 3] The method according to Aspect 1, wherein the screw further includes a second flight section on the tip side of the kneading section, and the vent section is located on a position of the barrel corresponding to the first half of the second flight section.

[Aspect 4] The method according to any one of Aspects 1 to 3, wherein the composition kneaded at step (ii) is cooled by 20° C. or more along a course from the kneading section to the die section.

[Aspect 5] The method according to Aspect 3 or 4, wherein the second flight section includes a flow retarding structure between the tip side end point and the die section.

[Aspect 6] The method according to any one of Aspects 1 to 5, wherein a groove-like structure is formed on the inner wall of the barrel in an area of 30% or less of the total length of the kneading section.

[Aspect 7] The method according to any one of Aspects 3 to 6, wherein a cooling equipment is provided at any position between the kneading section and the second flight section and/or the die section.

[Aspect 8] The method according to any one of Aspects 1 to 7, wherein the average thread groove depth in a region corresponding to the last 80% of the total length of the first flight section is smaller than the average thread groove depth in a region corresponding to the first 20% of the total length of the first flight section from the base side start point of the first flight section.

[Aspect 9] The method according to any one of Aspects 3 to 8, wherein the average thread groove depth in a region corresponding to the last 80% of the total length of the second flight section is smaller than the average thread groove depth in a region corresponding to the first 20% of the total length of the second flight section from the base side start point of the second flight section.

[Aspect 10] The method according to any one of Aspects 3 to 9, wherein the average thread groove pitch in a region corresponding to the last 80% of the total length of the second flight section is larger than the average thread groove pitch in a region corresponding to the first 20% of the total length of the second flight section from the base side start point of the second flight section.

[Aspect 11] The method according to any one of Aspects 1 to 10, wherein the starch contained in the composition at step (i) is derived from edible plant which has undergone heating treatment at a temperature of 80° C. or more under water-containing conditions with a dry mass basis moisture content of 25 mass % or more.

[Aspect 12] The method according to any one of Aspects 1 to 11, wherein when the composition prepared by the method is subjected to the treatment under [Procedure A] below followed by ultrasonication, and then to measurement for the particle diameter distribution, the $d_{50}$ and/or $d_{90}$ obtained from the particle diameter distribution is less than 450 μm.

[Procedure A] 6 mass % aqueous suspension of the composition is treated with 0.4 volume % of protease and 0.02 mass % of α-amylase at 20° C. for 3 days.

[Aspect 13] The method according to any one of Aspects 1 to 12, wherein the preparation of the composition at step (i) includes adding moisture to a raw material before being injected to the extruder.

[Aspect 14] The method according to any one of Aspects 1 to 12, wherein the preparation of the composition at step (i) includes injecting a raw material to the extruder and then adding moisture to the raw material in the extruder.

[Aspect 15] The method according to Aspect 14, wherein at step (i), the raw material in the extruder is not exposed to temperatures of 90° C. or more during a period when its dry mass basis moisture content is less than 25 mass %.

[Aspect 16] The method according to any one of Aspects 1 to 15, wherein the degree of gelatinization of starch in the composition after the kneading at step (ii) is 30 mass % or more.

[Aspect 17] The method according to any one of Aspects 1 to 16, wherein the depressurization at step (iii) is carried out by forced exhaustion from the vent section.

[Aspect 18] The method according to any one of Aspects 1 to 17, wherein the composition after the kneading at step (ii) or after the depressurization at step (iii) satisfies the requirement(s) (a) and/or (b) below.

(a) When 6% suspension of a crushed product of the composition is observed, the number of starch grain structures observed is 300/mm² or less.

(b) When 14 mass % aqueous slurry of a crushed product of the composition is subjected to measurement with a rapid visco-analyzer with elevating the temperature from 50° C. to 140° C. at a rate of 12.5° C./min, the peak temperature of gelatinization obtained is lower than 120° C.

[Aspect 19] The method according to any one of Aspects 1 to 18, wherein the degree of gelatinization of starch in the composition after the decrease in the degree of gelatinization at step (iv) is 90 mass % or less.

[Aspect 20] The method according to any one of Aspects 1 to 19, wherein the composition contains edible plant.

[Aspect 21] The method according to Aspect 20, wherein the ratio of the content of starch contained in the edible plant to the total starch content in the composition is 30 mass % or more.

[Aspect 22] The method according to Aspect 20 or 21, wherein the edible plant is pulse.

[Aspect 23] The method according to Aspect 22, wherein the pulse is one or more species of pulse selected from *Pisum, Phaseolus, Cajanus, Vigna, Vicia, Cicer, Glycine* and Lens species.

[Aspect 24] The method according to Aspect 22 or 23, wherein the composition contains pulse at a ratio of 50 mass % or more in terms of dry mass basis.

[Aspect 25] The method according to any one of Aspects 1 to 24, wherein the composition is a non-swollen product.

[Aspect 26] The method according to any one of Aspects 1 to 25, further comprising the step of:

(v) crushing the composition from step (iii) or (iv) to produce a crushed composition.

[Aspect 27] The method according to Aspect 26, further comprising the step of:

(vi) agglomerating the crushed composition from step (v) to produce a crushed composition agglomerate.

[Aspect 28] The method according to Aspect 26 or 27, further comprising the step of:

incorporating the crushed composition from step (v) and/or the crushed composition agglomerate from step (vi) into the composition at step (i) at a ratio of 5 mass % or more in terms of dry mass basis.

One or more embodiments of the present invention makes it possible to produce a starch-containing composition for heat cooking which does not easily disintegrate in shape during heat cooking in liquid, and which has a highly matte texture and an excellent appearance.

DETAILED DESCRIPTION

Figure 1:
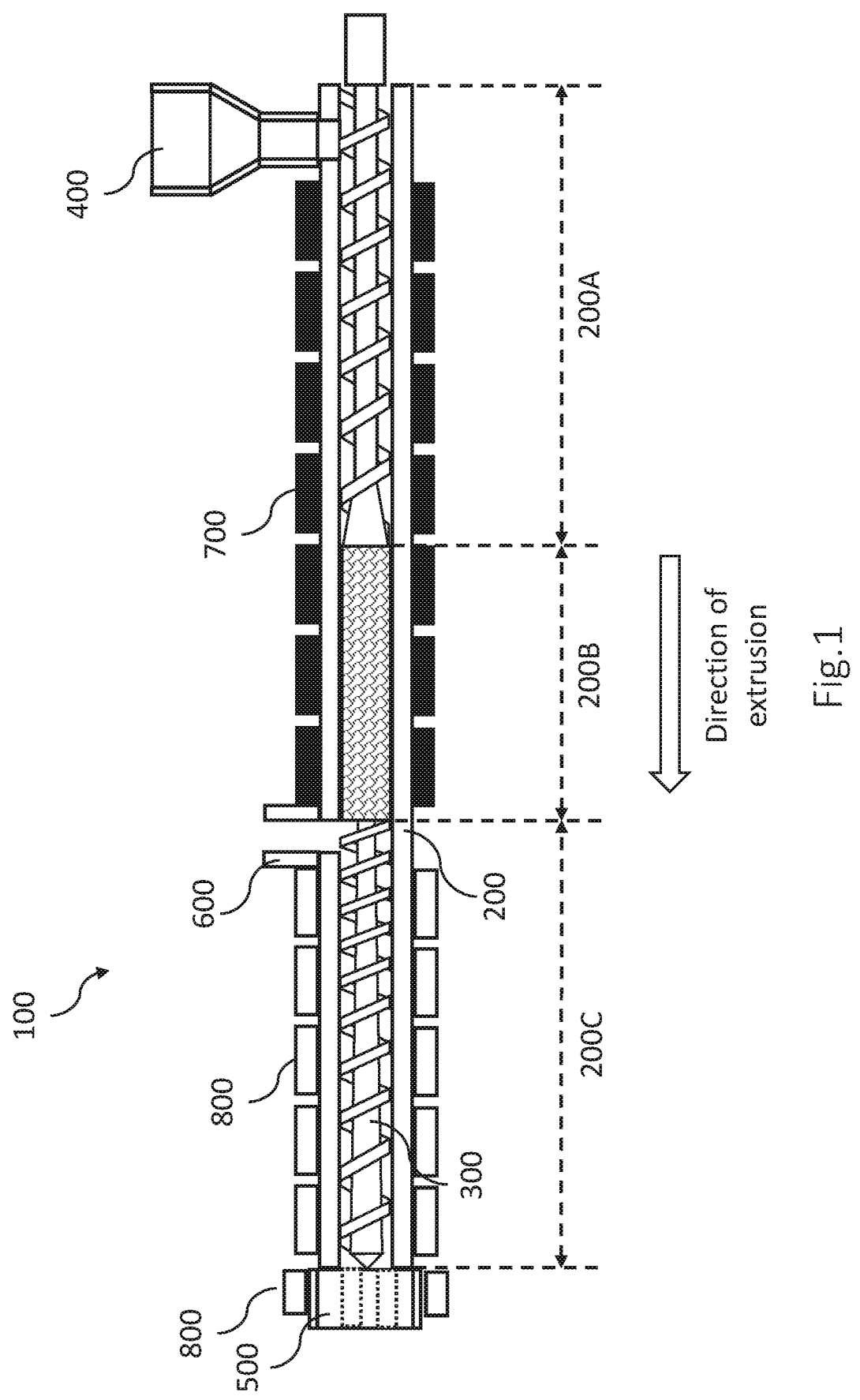
FIG. 1 is a cross-sectional view schematically showing an illustrative configuration of an extruder according one or more embodiments for use in the production method of one or more embodiments of the present invention.

One or more embodiments of the present invention will now be described based on specific embodiments. These embodiments should not be construed to limit the scope of the present invention. All references, including patent publications, unexamined patent publications, and non-patent publications cited in this specification, can be incorporated by reference in their entirety for all purposes.

One or more embodiments of the present invention relate to a method for producing a starch-containing composition for heat cooking with specific properties (hereinafter also referred to as "the starch-containing composition of one or more embodiments of the present invention" or "the composition of one or more embodiments of the present invention") using a specific extruder (hereinafter also referred to as "the production method of one or more embodiments of the present invention"). The following description will be made first on the features of the specific extruder for use in the production method of one or more embodiments of the present invention (hereinafter also referred to as "the extruder of one or more embodiments of the present invention"), and then on the features of the production method one or more embodiments of the present invention using the extruder of one or more embodiments of the present invention.

[I. Extruder]

(Configuration of the Extruder)

Typical extruders include uniaxial extruders and biaxial extruders, of which uniaxial extruders may preferably be used in the production method of one or more embodiments of the present invention. Apparatuses generally referred to as extruders (especially those referred to as "extruders" or "single screw extruders" outside Japan) encompass those that merely have a mixer or kneader function, but such an extrusion apparatus is not preferred because it cannot provide strong kneading that is one of the features of the production method of one or more embodiments of the present invention, making it difficult to form the characteristic composition structure that is to be created by the production method of one or more embodiments of the present invention.

The extruder of one or more embodiments of the present invention includes: a screw to be rotated by a motor; a barrel surrounding the circumference of the screw; a feeder, attached to the base side of the barrel, for injecting a food material; and a die section attached to the tip side of the barrel. According to one or more embodiments, the screw in the extruder of one or more embodiments of the present invention may include, from the base side to the tip side (i.e., in the direction of extrusion or towards the extruding side), a first flight section and a kneading section, and have a configuration in which the barrel has a vent section at a position corresponding to the tip side of the kneading section of the screw. According to one or more embodiments, the vent section and the die section may preferably have been integrated into a single section. According to one or more embodiments, the screw in the extruder of one or more embodiments of the present invention may include, in addition to the one or more embodiments mentioned above, a second flight section on the tip side of the kneading section, and the barrel may preferably have a vent section at a position corresponding to the base side start point of the second flight section of the screw. The barrel may also preferably have a heater in the area corresponding to the first flight section and the kneading section and a cooler in the area corresponding to the second flight section.

As will be discussed below, most of the steps of the production method of one or more embodiments of the present invention using this specific extruder are carried out at high temperatures and/or under high pressure. It goes without saying, therefore, that each of the elements constituting the extruder of one or more embodiments of the present invention should have sufficient temperature-resistance and pressure-resistance, depending on its function and the temperature and pressure required for the steps of the production method of one or more embodiments of the present invention.

Examples of configurations of the extruder for use in the production method of one or more embodiments of the present invention will be described in detail below using schematic figures. However, these figures are merely examples of extruders that can be used for the production method of one or more embodiments of the present invention from the viewpoint of facilitating the understanding of one or more embodiments of the invention. The extruder that can be used for the production method of one or more embodiments of the present invention is in no way restricted by these figures.

FIG. 1 is a cross-sectional view schematically showing an illustrative configuration of an extruder according to one or more embodiments for use in the production method of one or more embodiments of the present invention. The extruder 100 shown in FIG. 1 includes a barrel 200, which has an elongated cylindrical form, and a screw 300, which is arranged inside the barrel 200 and has an elongated uniaxial form, as well as a feeder 400, a die section 500 (which includes a flow channel in the die section that runs from inside the barrel to the outside, as represented by broken lines), a vent section 600, a heater 700, and a cooler 800, which are arranged on their respective positions on the barrel 200.

Figure 2:
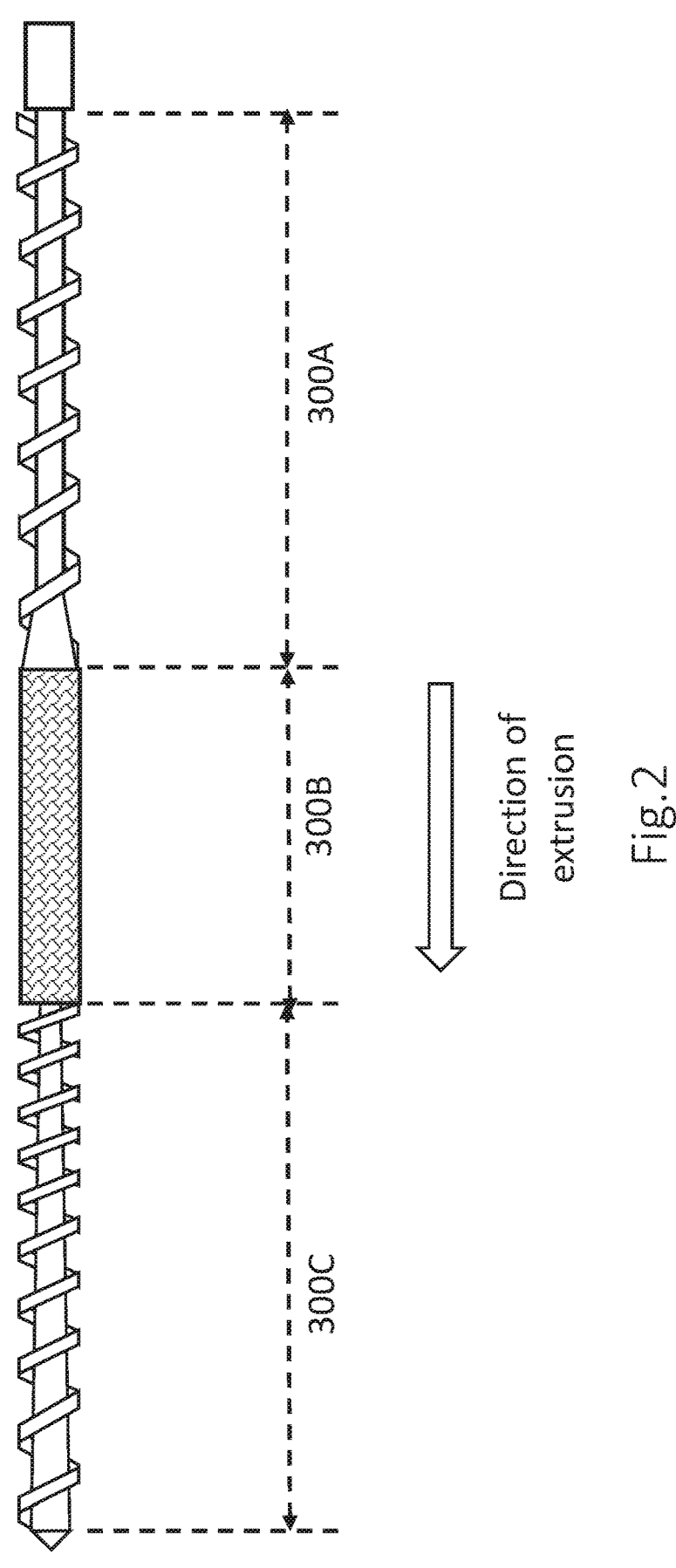
FIG. 2 is a side view schematically showing an illustrative configuration of a screw for use in the extruder according to the embodiment shown in FIG. 1.

FIG. 2 is a side view schematically showing an illustrative configuration of a screw 300 for use in the extruder according to the embodiment shown in FIG. 1. The screw 300 has a base side end point and a tip side end point, and the base side end point is connected to the rotary shaft of a motor (not shown) and is configured to be driven by rotation. From its base side (motor side) to its tip side (opposite side) (i.e., in the extrusion direction indicated by the white arrow in FIG. 1), the screw has a first flight section 300A, a kneading section 300B, and a second flight section 300C. The circumferences of the first flight section 300A and the second flight section 300C are provided with spiral convex structures (flights or flight structures), while the circumference of the kneading section 300B is provided with known structures for kneading (e.g., concave and convex structures).

As shown in FIG. 1, when the screw 300 is arranged inside the barrel 200, the barrel 200 can be divided into three regions 200A, 200B, and 200C, which correspond to the first flight section 300A, the kneading section 300B, and the second flight section 300C of the screw 300, respectively. These three regions 200A, 200B, and 200C of the barrel 200 herein may also be referred to as first flight section 200A, kneading section 200B, and second flight section 200C, in accordance with the names of the corresponding three sections of the screw 300. In addition, when the corresponding sections of the barrel 200 and the screw 300 are referred to without distinction, they may be collectively referred to as, e.g., the first flight section 200A,300A, the kneading section 200B,300B, and the second flight section 200C, 300C.

The feeder 400 may be located near the base side of the first flight section 200A of the barrel 200 (specifically, the feeder 400 may preferably be located at a position on the barrel corresponding to the first half of the first flight section, i.e. within 50% of the total length of the first flight section from the base side start point of the first flight section, more preferably within 20% of the total length of the first flight section from the start point of the first flight section, still more preferably within 5% of the total length of the first flight section from the start point of the first flight section, most preferably in a position on the barrel corresponding to the base start point of the first flight section), and may be configured so that the food material to be kneaded can be fed into the barrel 200 (into the space between the barrel 200 and the screw 300) through the feeder 400.

The die section 500 may be attached to the barrel 200 near the tip side end point of the second flight section 200C, and may be configured to allow the composition kneaded by the screw 300 to be discharged with molding.

The vent section 600 may be attached to the barrel 200 near the base side of the second flight section 200C (the detailed location will be described later) and may be configured to exhaust gas present in the space between the barrel 200 and the screw 300 so as to adjust its pressure.

The heater (heating equipment) 700 may be attached to the barrel 200 around the first flight section 200A and/or the kneading section 200B, and may be configured to heat barrel 200 so as to adjust the temperature of the composition inside the barrel 200 (the space between the barrel 200 and the screw 300) segment by segment. From the viewpoint of exhibiting the effects of one or more embodiments of the present invention, the heater 700 may preferably be installed around the barrel circumference corresponding at least to the entire length of the kneading section 200B, more preferably around the barrel circumference corresponding to the entire length of the kneading section 200B and the second half of the first flight section 200A, i.e. from the mid-point of the entire length of the first flight section 200A to the tip side end point of the first flight section 200A, still more preferably around the barrel circumference corresponding to the entire length of the kneading section 200B and the entire length of the first flight section 200A.

The cooler (cooling equipment) 800 may be attached to the barrel 200 around the second flight section 200C or the die section, and may be configured to cool the barrel 200 or the die section 500 so as to adjust the temperature of the composition inside the barrel 200 (the space between the barrel 200 and the screw 300) around the second flight section 200C, 300C or the temperature of the composition extruded from the die section. From the viewpoint of exhibiting the effects of one or more embodiments of the present invention, the cooler 800 may preferably be installed over a predetermined area around the barrel circumference corresponding to the entire length of the barrel 200C and/or at the die section. Specifically, the cooler 800 may preferably be installed over 30% or more of the entire length of the barrel 200C, or preferably over 50% or more or more of the entire length of the barrel 200C, or preferably over 90% or more or more of the entire length of the barrel 200C, or preferably over 30% or more or more of the entire length of the barrel 200C, or preferably over 100% or more or more of the entire length of the barrel 200C.

When the extruder according to the embodiment shown in FIG. 1 100 is used, each raw material of the composition is injected via the feeder 400 into the barrel 200 from the base side (the space between the barrel 200 and the screw 300), and the screw 300 is driven in a predetermined direction inside the barrel 200. The dough composition composed of these raw materials is thereby kneaded while being conveyed from the base side towards the tip side as the screw 300 rotates, and the kneaded composition is molded and discharged via the die section 500. In addition, the composition is heated by the heater 700 during conveying by the first flight sections 200A,300A and during kneading by the kneading sections 200B,300B. Once the kneading by the kneading sections 200B,300B ends, the composition is then vented and depressurized by the vent section 600 and cooled by the cooler 800 while conveyed by the second flight sections 200C,300C, and finally molded and extruded by the die section 500.

Figure 3:
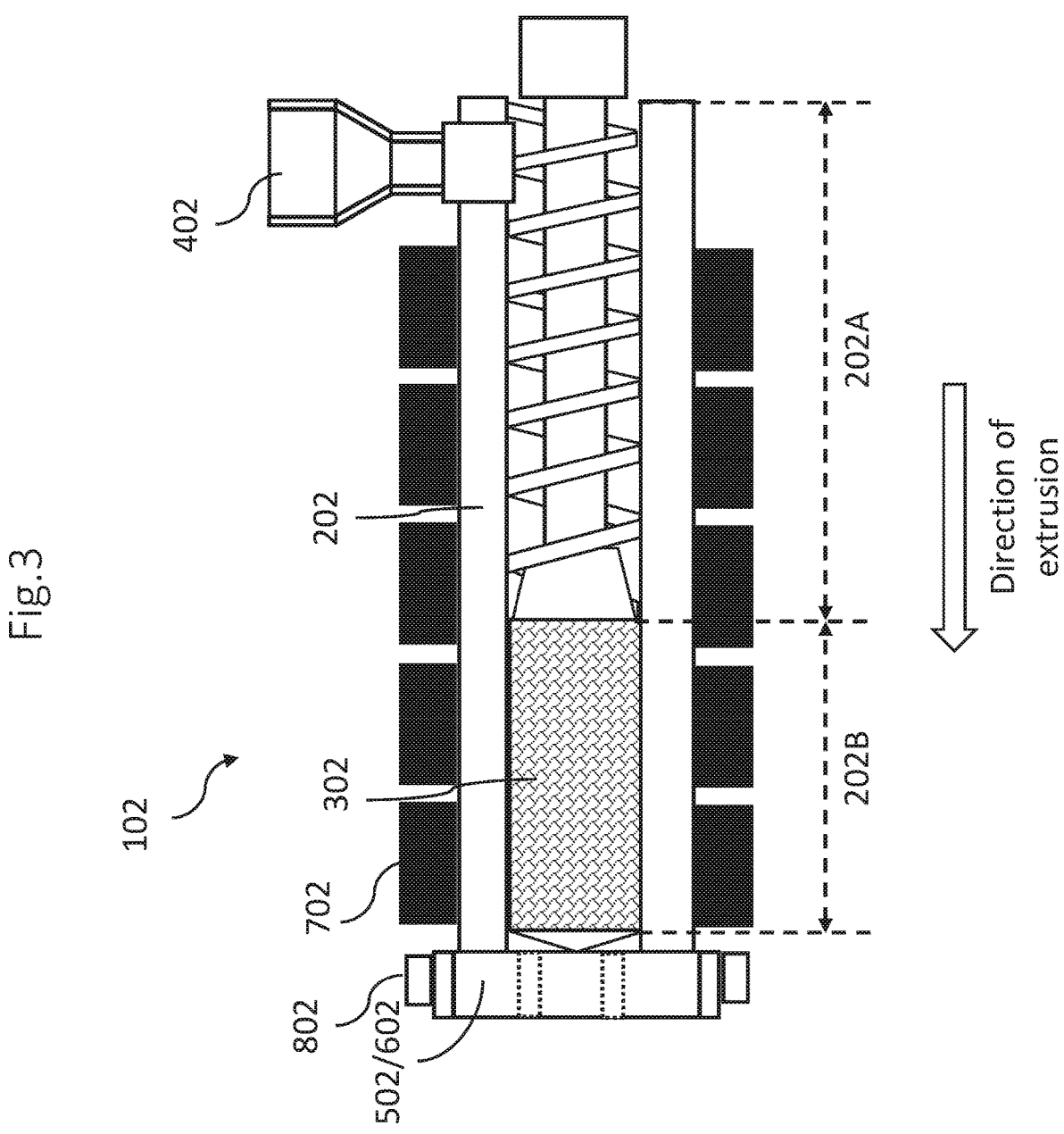
FIG. 3 is a cross-sectional view schematically showing an illustrative configuration of an extruder according the production method of one or more embodiments of the present invention.

FIG. 3 is a cross-sectional view schematically showing an illustrative configuration of an extruder according to a second embodiment for use in the production method of one or more embodiments of the present invention. The extruder 102 shown in FIG. 3 includes a barrel 202, which has an elongated cylindrical form, and a screw 302, which is arranged inside the barrel 202 and has an elongated uniaxial form, as well as a feeder 402, a die and vent section 502/602

(which includes a flow channel in the die section that runs from inside the barrel to the outside, as represented by dashed lines), and a heater 702, which are arranged on their respective positions on the barrel 202.

Figure 4:
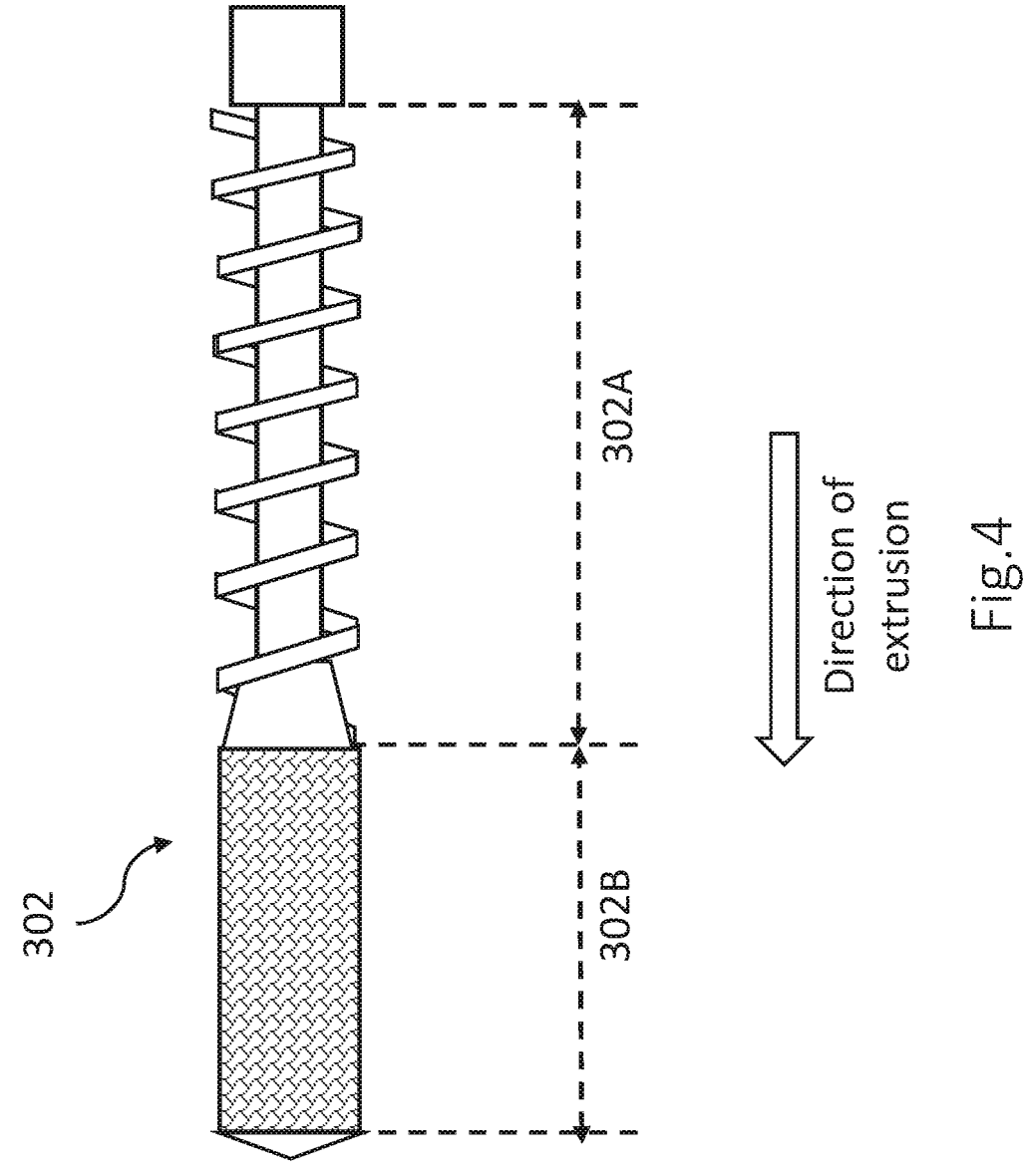
FIG. 4 is a side view schematically showing an illustrative configuration of a screw for use in the extruder according to the embodiment shown in FIG. 3.

FIG. 4 is a side view schematically showing an illustrative configuration of a screw 302 for use in the extruder according to the embodiment shown in FIG. 3. The screw 302 has a base side end point and a tip side end point, and from its base side (motor side) to its tip side (opposite side) (i.e., in the extrusion direction indicated by the white arrow in the figure), the screw has a first flight section 302A and a kneading section 302B, but does not have a second flight section. Correspondingly, the barrel 202 shown in the figure also has, from its base side to its tip side, a first flight section 202A and a kneading section 202B, in order from its base side to its tip side, but does not have a second flight section.

The extruder according to the embodiment shown in FIG. 3 102 is different from the extruder according to the embodiment shown in FIG. 1 100 in that the barrel 202 and the screw 302 have no second flight sections, and the die and vent section 502/602 is provided on the base side end point of the kneading section 202B of the barrel 202. Other points (e.g., as described below, a flow retarding structure may preferably be installed at a position between the tip side end point of the kneading section 202B and the die section 502/602, or a cooler 802 may preferably be installed at the die section 502/602) are the same as the extruder according to the embodiment shown in FIG. 1 100, so details thereof are omitted.

When the extruder according to the embodiment shown in FIG. 3 102 is used, each raw material of the composition is injected via the feeder 402 into the barrel 202 from the base side (the space between the barrel 202 and the screw 302), and the screw 302 is driven in a predetermined direction inside the barrel 202. The dough composition composed of these raw materials is thereby kneaded while being conveyed from the base side towards the tip side as the screw 302 rotates, and the kneaded composition is molded and discharged via the die section 502. In addition, the composition is heated by the heater 700 during conveying by the first flight sections 202A,302A and during kneading by the kneading sections 200B,300B. Once the kneading by the kneading sections 202B,302B ends, the composition is then vented, depressurized, molded and extruded by the die and vent section 502/602 while being cooled by the cooler 802.

Figure 5:
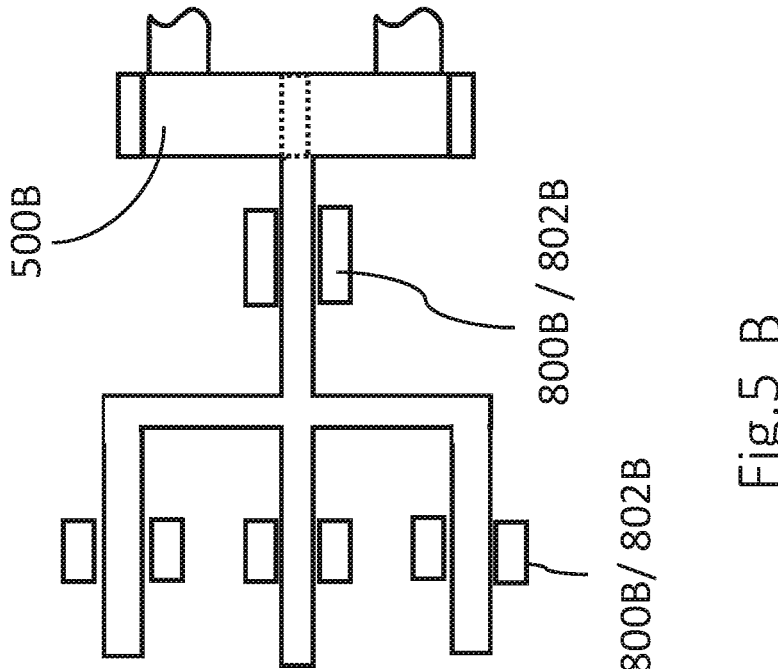
FIGS. 5(A) and 5(B) are cross-sectional views each schematically showing a variant of a die section of an extruder for use in the production method of one or more embodiments of the present invention.
Figure 5:
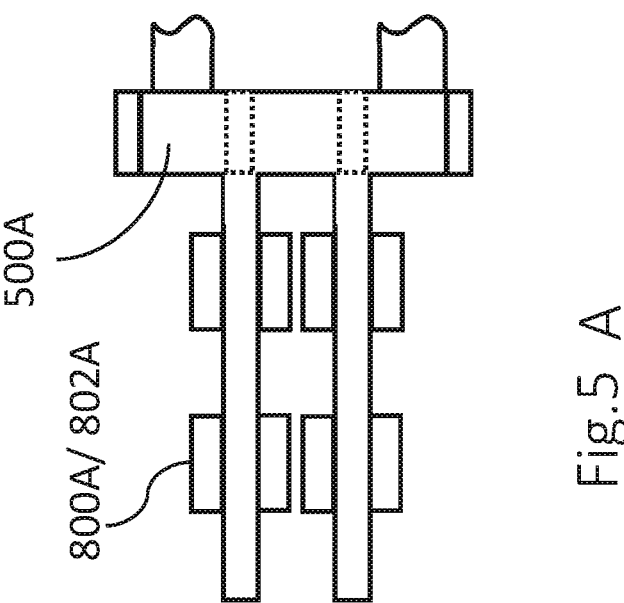

Various modifications may be made to the extruders of each of these embodiments. For example, a part of the flow channel of the die sections 500 and 502 may be extended and a cooler (802) may be provided around the extended flow channel. FIGS. 5A and 5B are both cross-sectional views schematically showing a variant of the die section having a modified configuration. The variants of the die sections shown in FIGS. 5A and 5B described below are indicated simply for the purpose of examples, and possible configurations of the die sections are not limited to these variants. In addition, the variant(s) of the die section(s) shown in FIGS. 5A and/or 5B described below may be combined together or with the first and/or second embodiment(s) described above as appropriate. All possible combinations are included in the one or more embodiments of the present invention.

The die section 500A according to the variant shown in FIG. 5A (which includes a flow channel in the die section that runs from inside the barrel to the outside, as represented by broken lines) has a plurality of branch flow channels each having an extrusion opening at its tip end point, and each branch flow channel is formed in an elongated shape, and coolers 800A/802A are provided around such elongated branch flow channels. When the die section 500A according to this variant is used, the composition kneaded and conveyed by the screw and the barrel in the previous step is branched into the plurality of branch channels with being cooled by the coolers when passing through the branch channels, and then extruded from the extruder at the end of each branch channel to be molded. The number of the coolers installed and the area where the coolers are installed are not limited and may be determined as appropriate. Any cooler with an appropriate cooling capacity can be used, a preferred example being a jacket system (e.g., a water jacket system using water as a refrigerant to cool the cooler), which includes a cooler such as a cooling water pipe installed on the surface of the part surrounding the area to be cooled, such that the cooler acts indirectly on the area to be cooled. In this variant, the piping may be installed so as to wrap around each elongated branch flow channel. The number of the elongated branch channels is not limited and may be any number, depending on the number of one or more flow channels in the die section, such that they penetrate from inside the barrel to the outside. Alternatively, a plurality of elongated branch flow channels can be attached to the flow channel penetrating from inside the barrel to the outside in the die section. In this case, for example, the plurality of elongated branch channels may be formed so as to radially diverge (as if fan bones widening) on a virtual plane starting from the tip end point of the channel inside the die section that penetrates from the barrel interior to the exterior. Alternatively, the plurality of elongated branch channels may be formed so as to expand conically towards the extrusion direction (i.e., the plurality of branch flow channels may be connected directly to the flow channel penetrating the die section from inside to the outside of the barrel, without a trunk flow channel as shown in FIG. 5B).

The die section 500B according to the variant shown in FIG. 5B (which includes a flow channel in the die section that runs from inside the barrel to the outside, as represented by broken lines) has a trunk flow channel into which the composition flows from the screw and barrel side, and a plurality of branch channels branching from the trunk flow channel and each having an extrusion opening at the tip end thereof, the trunk flow channel and/or each branch channel being formed in an elongated shape. The die section 500B also has coolers 800B/802B provided around the elongated trunk flow channel and/or each branch channel. When the die section 500B according to this variant is used, the composition kneaded and conveyed by the screw and the barrel in the previous step is received by the trunk flow channel, and then enters the plurality of branch flow channels with branching, and cooled by the coolers in the trunk flow channel and/or each branch flow channel, and is finally extruded from the extruder while being molded at the end of each branch channel. In this variant, the cooler may be installed only around the trunk flow channel, or around each branch flow channel, or both around the trunk flow channel and around each branch flow channel. However, the cooler may preferably be installed at least one position around the trunk flow channel to efficiently cool the entire dough composition, more preferably both one or more positions around the trunk flow channel and one or more positions around each branch flow channel. The number of the coolers installed and the area where the coolers are installed are not limited, and may be determined as appropriate. Any cooler with an appropriate cooling capacity can be used, a preferred example being a jacket system (e.g., a water jacket system using water as a refrigerant to cool the cooler), which includes a cooler such as a cooling water pipe installed on the surface of the part surrounding the area to be cooled, such that the cooler acts indirectly on the area to be cooled. In this variant, the piping may be installed so as to wrap around the trunk flow channel and/or each branch flow channel. In one or more embodiments of the die section having a trunk flow channel and a plurality of branch flow channels, the number of the branch flow channels to be connected to the trunk flow channel is not limited and may be any number. The cross-section of the trunk flow channel may be elongated transversely to the extrusion direction (e.g., rectangular or elliptical), and any number of branch channels may be connected to its tip end. Alternatively, the cross-section of the trunk flow channel may be expanded in area gradually in the extrusion direction. There is also no restriction to the connection sites between the trunk flow channel and each branch flow channel, and also to the shape and the direction of each branch flow channel. Examples include, but are not limited to: (a) one or more embodiments where the plurality of branch flow channels are connected to the tip side end point of the trunk flow channel and formed so as to diverge radially on a virtual plane (as if the branch flow channels are formed like fan bones spreading out from the tip of the trunk flow channel); (b) one or more embodiments where the plurality of branch flow channels are connected to the single point on the trunk flow channels and formed so as to expand conically along the direction of extrusion; and (c) one or more embodiments where the plurality of branch flow channels are connected to different points of the trunk flow channel and formed so as to expand conically along the direction of extrusion.

The die sections 500A, 500B and the coolers 800A, 800B of each of the above variants may be installed in any type of extruder without limitation. That is, they may be installed in the extruder 100 of the embodiment shown in FIG. 1, in the extruder 102 of the embodiment shown in FIG. 3 as the coolers 802A and 802B, or in any other types of extruders of any modifications.

The configuration and operation of the extruder of one or more embodiments of the present invention are described in more detail below.

(Screw)

As described above, the screw to be used in the extruder of one or more embodiments of the present invention is an elongated screw having a base end and a tip end, with the base end connected to the rotary shaft of a motor to drive the rotation.

The shape of the screw to be used in the extruder of one or more embodiments of the present invention is not limited, but may preferably be a flight screw or a flight-based screw. The term "flight screw" herein refers to a screw composed of a cylindrical base shaft with spiral ridges (flights) formed on a part or all of its circumference surface such that the ridges define screw threads while the remaining areas on the circumference surface other than the ridges define thread grooves. Alternatively, the flight screw may have a structure with an uneven groove bottom shape, specifically a wave shape where the groove bottom of each flight is uneven along the groove width, or may be a sub-flight type screw with main flights and sub flights.

Specifically, the screw to be used in the extruder according to the embodiment shown in FIG. 1 has, from its base side (motor side) to its tip side (opposite side), a first flight section, a kneading section, and a second flight section, and each of the first and second flight sections has screw flights on its circumference surface. On the other hand, the screw to be used in the extruder according to the embodiment shown in FIG. 3 has, from its base side to its tip side, a first flight section and a kneading section but lacks a second flight section, and the first flight section has screw flights on its circumference surface.

The diameter (D) of the screw to be used in one or more embodiments of the present invention is not restricted, but may preferably be typically 25 mm or more, particularly 30 mm or more, or 35 mm or more, or 40 mm or more, especially 45 mm or more, and typically 300 mm or less, particularly 200 mm or less, or 150 mm or less. The diameter of the screw herein refers to a value obtained by setting a virtual cutting plane to cut the screw perpendicular to its axis of rotation, connecting any two points on the screw circumference on the virtual cutting plane to determine the length of the longest line segment (longest line segment length), determining the longest line segment lengths at multiple points along the entire screw length including the threaded area, and calculating the arithmetic mean of the longest line segment lengths. Incidentally, the average value herein (also referred to simply as the average or arithmetic average value) refers to an arithmetic average value unless otherwise specified.

The length (L) of the screw to be used in one or more embodiments of the present invention is not restricted, but may preferably be typically 1000 mm or more, particularly 1100 mm or more, or 1200 mm or more, or 1300 mm or more, especially 1400 mm or more. The upper limit is also not particularly restricted, but may preferably be 5000 mm or less, particularly 4000 mm or less, or 3000 mm or less.

The ratio of the length to the diameter (L/D) of the screw to be used in one or more embodiments of the present invention is not restricted, but may preferably be 20 or higher, particularly 25 or higher, still more particularly 30 or higher, especially 35 or higher. When the L/D ratio of the screw is adjusted to these lower limits or higher, the resulting composition tends to exhibit a smooth surface on a consistent basis with less flouriness to be felt on eating. On the other hand, the upper limit of the L/D ratio of the screw is also not particularly restricted, but may preferably be typically 300 or lower, particularly 200 or lower, more particularly 100 or lower. In particularly, it may be especially preferable to use a screw having a L/D ratio satisfying these preferred range in combination with a specific raw material (micronized pulse) having a particle diameter $d_{50}$ after ultrasonication satisfying a preferred range as will be explained below, and carrying out the production with adjusting the ratio of the total mass flow rate (also referred to as the flow volume) to the internal content of the extruder to within a predetermined range as will be explained below, since this may promote the tendency for the resulting composition to exhibit a smooth surface on a consistent basis with less flouriness to be felt on eating. The "L/D ratio" of a screw herein refers to the ratio of the length of the screw (L) to the diameter of the screw (D).

(First Flight Section)

In the screw of the extruder according to the embodiment shown in FIG. 1, the first flight section refers to a section with screw flights on its circumferential surface that is located on the base side (motor side) with respect to most (preferably all) of the kneading section and all of the second flight section. In the screw of the extruder according to the embodiment shown in FIG. 3, the first flight section refers to a section with screw flights on its circumferential surface that is located on the base side (motor side) with respect to most (preferably all) of the kneading section. In the production method of one or more embodiments of the present invention, the first flight section has the function of conveying the composition to the tip side as the screw rotates while heating the composition by optionally using a heater, thereby causing the starch grains in the composition to swell with water by heating.

The flight structure in which the composition is conveyed to the tip side as the screw rotates may be referred to herein as the "forward flight," while the flight structure in which the composition is conveyed to the base side as the screw rotates herein may be referred to herein as the "reverse flight." In addition, in each of the first flight section and (in the case of the screw of the extruder according to the embodiment shown in FIG. 1 explained above) the second flight section, a section with the forward flight may be referred to as the "forward flight section," and a section with the reverse flight as the "reverse flight section."

The length of the first flight section is not restricted but may preferably account for a specific ratio or more to the total length of the screw, since this may promote the starch grains in the composition to swell with water by heating. Specifically, the ratio of the length of the first flight section to the total length of the screw may preferably be typically 20% or more, particularly 25% or more, or 30% or more, or 35% or more, or 40% or more, or 45% or more, or 50% or more. On the other hand, the upper limit of the ratio of the length of the first flight section to the total length of the screw is not restricted, but may preferably be typically 80% or less, or 70% or less, or 60% or less, in consideration to the relationship with other screw components.

The ratio of the length of the flight screw section to the total length of the first flight section may preferably be typically 90% or more, particularly 95% or more, especially 100%. On the other hand, the ratio of the length of the reverse flight section to the total length of the first flight section may preferably be typically 10% or less, particularly 5% or less, especially 0%.

(Kneading section)

In the screw of the extruder according to the embodiment shown in FIG. 1, the kneading section refers to a known structure for kneading the majority (preferably more than 70%, more preferably more than 90%, still more preferably 100%) of which is located between the first flight section and the second flight section (specific examples include Maddock mixing section, Egan mixing section, blister ring mixing section, pin mixing section, Dulmage mixing section, Saxton mixing section, pineapple-type mixing section, mixing section having a screw with groove holes (will be explained later), cavity transfer mixing section, and any combinations thereof). In the screw of the extruder according to the embodiment shown in FIG. 3, the kneading section refers to a known structure for kneading the majority (preferably more than 70%, more preferably more than 90%, still more preferably 100%) of which is located on the tip side with respect to the first flight section. The kneading section to be used in one or more embodiments of the present invention screw has the function to break up and knead the composition flow by heating the composition with a heater so as to decompose the starch grains by high-temperature strong kneading under pressurized conditions.

The form of the kneading section is not particularly restricted, but from the viewpoint of preventing the composition from being burnt, it may be preferable that no Dulmage screw structure or barrier-type screw structure, which has a lot of grooves, is formed on the circumferential surface of the kneading section, or if any, the proportion of the area with such a structure is limited. Specifically, the ratio of the length of an area with a Dulmage screw structure or barrier-type screw structure to the total length of the kneading section may preferably be typically 10% or less, particularly 5% or less, especially substantially 0% (i.e., substantially no such structure is formed).

The length of the kneading section is not restricted, but may preferably account for a predetermined ratio or more with respect to the total length of the screw, since this may serve to decompose the starch grains by high-temperature strong kneading under pressurized conditions. Specifically, the ratio of the length of the kneading section to the total length of the screw may preferably be typically 20% or more, particularly 25% or more, or 30% or more, or 35% or more, or 40% or more, or 45% or more, or 50% or more. On the other hand, the upper limit of the ratio of the length of the kneading section to the total length of the screw is not restricted, but may preferably be typically 80% or less, or 70% or less, or 60% or less, in consideration to the relationship with other screw components.

(Second Flight Section)

In the screw of the extruder according to the embodiment shown in FIG. 1, the second flight section refers to an optional section with screw flights on its circumferential surface that is located on the tip side (extrusion side) with respect to all of the first flight section and most (preferably all) of the kneading section. In the production method of one or more embodiments of the present invention, the second flight section has the function of conveying the composition from the kneading section to the die section on the tip side as the screw rotates with a quick drop in the pressure by the vent section, thereby homogenizing the composition with decomposed starch grain structures to form a starch matrix structure so as not to generate heat and, optionally, rapidly lowering the composition temperature using a cooler to locally age the starch near the composition surface.

The length of the second flight section is not restricted. However, if the second flight section is too long, the starch in the composition may be so aged as to prevent the resulting composition from being discharged. Accordingly, the ratio of the length of the second flight section to the total length of the screw may preferably be a predetermined limit or lower. Specifically, the ratio of the length of the second flight section to the total length of the screw may preferably be typically-50% or less, particularly 45% or less, or 40% or less, or 35% or less, or 30% or less. On the other hand, the lower limit of the ratio of the length of the second flight section to the total length of the screw is not restricted. However, from the viewpoint of homogenizing the composition with decomposed starch grain structures to form a starch matrix structure so as not to generate heat and, optionally, rapidly lowering the composition temperature using a cooler to locally age the starch near the composition surface, the ratio may preferably be typically 5% or more, particularly 10% or more, or 15% or more, or 20% or more.

The ratio of the length of the flight screw section to the total length of the second flight section may preferably be typically 90% or more, particularly 95% or more, especially 100%. On the other hand, the ratio of the length of the reverse flight section to the total length of the second flight section may preferably be typically 10% or less, particularly 5% or less, especially 0%.

The ratio of the length of the second flight section to the length of the first flight section {(the length of the second flight section)/(the length of the first flight section)×100%} is not restricted, but may preferably be typically 120% or less, particularly 115% or less, or 110% or less, or 105% or less, or 100% or less, or 95% or less, or 90% or less, or 85% or less, or 80% or less, or 70% or less, or 60% or less, and typically 5% or more, particularly 10% or more, or 15% or more, or 20% or more.

As in the extruder according to the embodiment shown in FIG. 2, the screw may be configured to lack a second flight section in the screw and to cool the composition at the die section and/or after extrusion, so as to locally age the starch near the surface of the composition.

(Flow Retarding Structure)

According to one or more embodiments of the present invention, it may be preferable to provide a flow retarding structure at a position between the tip side end point of the second flight section and the die section in the case of the extruder according to the embodiment shown in FIG. 1, or at a position between the tip side end point of the kneading section and the die section in the case of the extruder according to the embodiment shown in FIG. 3. Specifically, the flow retarding structure may preferably be installed in the extruder according to the embodiment shown in FIG. 1, since it allows for the stable discharge of the composition with an increased viscosity due to ageing by the second flight section. On the other hand, the flow retarding structure may preferably be installed in the extruder according to the embodiment shown in FIG. 3, which do not have a second flight section, since this may result in the effect of stabilizing the extrusion. In addition, both in the embodiment shown in FIG. 1 and in the embodiment shown in FIG. 2, the flow retarding structure may preferably be provided around the tip side end point of the kneading section (preferably, immediately after the tip side end point of the kneading section), since this may serve to increase the pressure at the kneading section and improve the kneading efficiency. The "flow retarding structure" herein refers to a structure that reduces the flow rate of the contents from the flight section, relative to the average flow rate of the contents in the flight section upstream of said structure. For example, in the embodiment shown in FIG. 1, the flow retarding structure is configured to reduce the flow rate of the contents relative to the flow rate of the contents in the second flight section. And in the embodiment shown in FIG. 3, the flow retarding structure is designed to reduce the flow rate of the contents relative to the flow rate of the contents in the first flight section. Examples of the flow retarding structures include: a structure with relatively large screw groove depths and/or pitch widths around the tip side end point of the second flight section to thereby decrease the flow rate; and a structure with relatively large internal diameters of the barrel around the tip side end point of the second flight section to thereby decrease the flow rate. The flow retarding structure may be provided as a structure independently of the second flight section at a position between the tip side end point of the second flight section and the die section in the case of the extruder according to the embodiment shown in FIG. 1, or at a position between the tip side end point of the kneading section and the die section in the case of the extruder according to the embodiment shown in FIG. 3. Such an independent flow retarding structure may be a structure that reduces the flow rate generated by screw rotation to thereby lower the flow rate compared to that generated by a forward flight structure. Examples include: a structure derived from a forward flight section by perforating or removing or deforming a part of the forward flight section (also referred to as a screw structure with groove holes); a reverse flight structure, which generates a relatively lower flow rate than the forward flight structure; and a torpedo structure, which lacks a torsional angle that provides feed to the material to be molded (e.g., a structure with ring-shaped projections formed on the screw surface with a radius of 80% or more of the distance between the rotation axis of the screw and the inner wall of the barrel). Among these, it may be preferable to provide a screw structure with groove holes or a reverse flight structure or a torpedo structure as the flow retarding structure at a position between the tip side end point of the second flight section and the die section in the case of the extruder according to the embodiment shown in FIG. 1, or at a position between the tip side end point of the kneading section and the die section in the case of the extruder according to the embodiment shown in FIG. 3. When adopting a torpedo structure with ring-shaped projections formed on the screw surface with a radius of 80% or more of the distance between the rotation axis of the screw and the inner wall of the barrel, it may be preferable to arrange two or more ring-shaped projections in succession, because this structure may serve to easily adjust the flow rate in the flow retarding structure.

The flow retarding ratio to be achieved by the flow retarding structure (i.e., the ratio of the flow rate at the flow retarding structure to the flow rate at the flight section upstream of the flow retarding structure) may be less than 100%, preferably 97% or less, more preferably 95% or less, still more preferably 93% or less, or 90% or less. The lower limit is not particularly restricted, but may preferably be 10% or more, or 20% or more.

When the flow retarding structure is adopted, it may be preferable from the viewpoint of achieving the effects of one or more embodiments of the present invention that the size of the flow retarding structure is limited to a predetermined ratio or lower, because if the size is too large, the size of other sections such as the kneading section and the second flight section becomes relatively small. Specifically, the ratio of the length of the flow retarding structure to the total length of the screw may preferably be typically 20% or less, particularly 15% or less, more particularly 10% or less, or 8% or less, or 5% or less. The lower limit is not particularly restricted, but may preferably be 0% or more, or 1% or more. (Average Thread Groove Depth)

According to one or more embodiments of the present invention, the average thread groove depth of the screw flights formed in the first flight section and/or (in the case of the extruder according to the embodiment shown in FIG. 1) the second flight section of the screw may preferably satisfy predetermined conditions. The "average thread groove depth" herein refers to, on virtual parallel cross-sections including the rotation center with respect to the rotation axis of the screw (i.e., virtual cross-sections assuming the screw is split along its longitudinal axis), the average distance to the deepest part of each thread groove (the shaft surface closest to the axis of rotation) relative to the hypothetical line segment connecting adjacent threads. The average screw groove depth can be determined, for example, by assuming several parallel sections to the axis of rotation at 450 intervals along the axis of rotation of the screw, measuring the screw groove depth in each parallel section, and averaging the obtained values.

The screw used in the extruder according to the embodiment shown in FIG. 1 of the present invention may preferably have a smaller average thread groove depth in the second flight section than in the first flight section, from the viewpoint of decomposing starch grains more efficiently and locally ageing the starch near the surface of the composition. Specifically, the ratio of the average thread groove depth of the second flight section to the average thread groove depth of the first flight section may preferably be typically 98% or less, particularly 95% or less, or 93% or less, or 90% or less, or 87% or less, or 85% or less, or 83% or less, or 80% or less. The lower limit is not restricted, but may preferably be typically 10% or more, or 20% or more, or 30% or more, or 40% or more, or 50% or more, or 60% or more.

The average thread groove depth of the first flight section is not restricted, but may preferably be typically 30 mm or less, particularly 25 mm or less, or 20 mm or less, or 10 mm or less. The lower limit is not restricted, but may preferably be typically 5 mm or more may preferably be.

The ratio of the average thread groove depth of the first flight section to the screw diameter is not restricted, but may preferably be 30% or less, particularly 25% or less, or 20% or less, or 15% or less, or 10% or less, or 5% or less. The lower limit of the ratio is not restricted, but may preferably be typically 3% or more, or 6% or more, or 9% or more, or 12% or more.

The thread groove depth of the first flight section may be either uniform or non-uniform along the total length of the first flight section. However, from the viewpoint of decomposing starch grains more efficiently and locally ageing the starch near the surface of the composition, it may be preferable that the thread groove depths are relatively large on the base side the base side of the first flight section, and gradually decrease from the base side to the tip side (i.e., towards the direction of extrusion).

More specifically, the screw to be used in one or more embodiments of the present invention may preferably be characterized in that the average thread groove depth in 20% of the total length of the first flight section from the base side start point of the first flight section (also referred to as the first 20%) is larger than the average thread groove depth in the remaining 80% of the total length of the first flight section (also referred to as the last 80%). More specifically, the ratio of the average thread groove depth in 20% of the total length of the first flight section from the base side start point of the first flight section to the average thread groove depth in the remaining 80% of the total length of the first flight section (i.e., (the average thread groove depth in the first 20%)/(the average thread groove depth in the last 80%)) may preferably be more than 100%, or 102% or more, 104% or more, or 106% or more, or 108% or more, or 110% or more. The lower limit of the ratio is not restricted, but may preferably be typically 200% or less, or 195% or less, or 190% or less, or 185% or less, or 180% or less.

In addition, the ratio of the average thread groove depth in the first 20% from the base side start point of the first flight section along the total length of the first flight section to the screw diameter may preferably be typically 35% or less, particularly 30% or less, or 25% or less, or 20% or less, or 15% or less, or 10% or less. The lower limit is also not particularly restricted, but may preferably be 5% or more.

The average thread groove depth of the second flight section in the extruder according to the embodiment shown in FIG. 1 is not restricted, but may preferably be 30 mm or less, particularly 25 mm or less, or 20 mm or less, or 10 mm or less may preferably be. The lower limit is not restricted, but may preferably be typically 5 mm or more.

The ratio of the average thread groove depth of the second flight section to the screw diameter in the extruder according to the embodiment shown in FIG. 1 is not restricted, but may preferably be typically 30% or less, particularly 25% or less, or 20% or less, or 15% or less, or 10% or less, or 5% or less. The lower limit of the ratio is not restricted, but may preferably be typically 3% or more, or 6% or more, or 9% or more, or 12% or more.

The thread groove depth of the second flight section in the extruder according to the embodiment shown in FIG. 1 may be either uniform or non-uniform along the total length of the second flight section. However, from the viewpoint of improving the cooling (aging) efficiency of the kneaded composition and also facilitating the discharge of the composition after cooling (aging), it may be preferable that the thread groove depths are relatively large on the base side of the second flight section, and gradually decrease from the base side to the tip side (i.e., towards the direction of extrusion).

From the viewpoint of decomposing starch grains more efficiently and locally ageing the starch near the surface of the composition, the screw to be used the extruder according to the embodiment shown in FIG. 1 of the present invention may preferably be characterized in that the average thread groove depth in 20% of the total length of the first flight section from the base side start point of the first flight section (also referred to as the first 20%) is larger than the average thread groove depth in the remaining 80% of the total length of the first flight section (also referred to as the last 80%). More specifically, the ratio of the average thread groove depth in 20% of the total length of the first flight section from the base side start point of the first flight section to the average thread groove depth in the remaining 80% of the total length of the first flight section (i.e., (the average thread groove depth in the first 20%)/(the average thread groove depth in the last 80%)) may preferably be more than 100%, or 102% or more, 104% or more, or 106% or more, or 108% or more, or 110% or more. The lower limit of the ratio is not restricted, but may preferably be typically 200% or less, or 195% or less, or 190% or less, or 185% or less, or 180% or less.

(Average Thread Pitch)

The "pitch" herein refers to, on virtual parallel cross-sections including the rotation center with respect to the rotation axis of the screw (i.e., virtual cross-sections assuming the screw is split along its longitudinal axis), the distance between each two adjacent thread ridges, and the "average pitch" refers to the average of the pitches in a predetermined area. The average tread pitch can be determined, for example, by assuming several parallel sections to the axis of rotation at 450 intervals along the axis of rotation of the screw, measuring multiple pitches each between two adjacent thread ridges in each parallel section, and averaging the obtained values.

The ratio of the average pitch of the first flight section to the screw diameter may preferably be typically 200% or less, particularly 150% or less, particularly 120% or less, particularly 105% or less. The lower limit is also not particularly restricted, but may preferably be 40% or more, or 50% or more, or 60% or more.

The pitches of the first flight section may be either uniform or non-uniform along the entire length of the first flight section. However, from the viewpoint of smoothing food feeds, it may be preferable that the pitches of the first flight section are relatively large the base side of the first flight section, but gradually decrease from the base side to the tip side (i.e., towards the direction of extrusion).

More specifically, the screw to be used in one or more embodiments of the present invention may preferably be characterized in that the average thread pitch in 20% of the total length of the first flight section from the base side start point of the first flight section is smaller than the average thread pitch in the remaining 80% of the total length of the first flight section. More specifically, the ratio of the average thread pitch in 20% of the total length of the first flight section from the base side start point of the first flight section to the average thread pitch in the remaining 80% of the total length of the first flight section (i.e., (the average thread pitch in the first 20%)/(the average thread pitch in the last 80%)) may preferably be less than 100%, or less than 95%, or less than 90%, or less than 85%, or less than 80%, or less than 75%. The lower limit is also not particularly restricted, but may preferably be typically 40% or more, or 50% or more, or 60% or more, or 70% or more.

In addition, the ratio of the average thread pitch in 20% of the total length of the first flight section from the base side start point of the first flight section to the screw diameter may preferably be typically 180% or less, particularly 150% or less, particularly 120% or less, particularly 105% or less. The lower limit is also not particularly restricted, but may preferably be 40% or more, or 50% or more, or 60% or more.

On the other hand, in the case of the extruder according to the embodiment shown in FIG. 1, the ratio of the average thread pitch of the second flight section to the screw diameter may preferably be 99% or less, particularly 90% or less, or 80% or less, or 70% or less, or 60% or less, or 50% or less. The lower limit is also not particularly restricted, but may preferably be 20% or more, or 30% or more, or 40% or more.

The pitches of the second flight section of the extruder according to the embodiment shown in FIG. 1 may be either uniform or non-uniform along the total length of the second flight section. However, from the viewpoint of improving the cooling (aging) efficiency of the kneaded composition and also facilitating the discharge of the composition after cooling (aging), it may be preferable that the pitch are relatively small on the base side of the second flight section, but gradually increase from the base side to the tip side (i.e., towards the direction of extrusion).

More specifically, the screw to be used in one or more embodiments of the present invention may preferably be characterized in that the average thread pitch in 20% of the total length of the second flight section from the base side start point of the second flight section is smaller than the average thread pitch in the remaining 80% of the total length of the second flight section. More specifically, the ratio of the average thread pitch in 20% of the total length of the second flight section from the base side start point of the second flight section to the average thread pitch in the remaining 80% of the total length of the second flight section (i.e., (the average thread pitch in the first 20%)/(the average thread pitch in the last 80%)) may preferably be less than 100%, or less than 95%, or less than 90%, or less than 85%, or less than 80%, or less than 75%. The lower limit is also not particularly restricted, but may preferably be typically 40% or more, or 50% or more, or 60% or more, or 70% or more.

In addition, in the case of the extruder according to the embodiment shown in FIG. 1, the ratio of the average thread pitch in 20% of the total length of the second flight section from the base side start point of the second flight section to the screw diameter may preferably be typically 99% or less, particularly 90% or less, or 80% or less, or 70% or less, or 60% or less, or 50% or less. The lower limit is also not particularly restricted, but may preferably be 5% or more, or 10% or more, or 15% or more, or 20% or more, or 25% or more, or 30% or more, or 40% or more.

From the viewpoint of locally aging the starch near the composition surface, the screw of the extruder according to the embodiment shown in FIG. 1 may preferably be characterized in that the average pitch of the second flight section is smaller than the average pitch of the first flight section. Specifically, the ratio of the average thread pitch of the second flight section to the average pitch of the first flight section may preferably be typically 98% or less, particularly 95% or less, or 93% or less, or 90% or less, or 87% or less, or 85% or less, or 83% or less, or 80% or less. The lower limit of the ratio is not restricted, but may preferably be typically 10% or more, or 15% or more, or 20% or more, or 25% or more, or 30% or more, or 40% or more, or 50% or more, or 60% or more.

(Barrel)

The barrel is a cylindrical structure that surrounds the outer circumference of the screw. The structure of the barrel to be used in one or more embodiments of the present invention is not restricted. However, rather than a tapered barrel in which the inner diameters decrease towards the direction of extrusion, it may be preferable to use a barrel having generally the same inlet and outlet inner diameters (more preferably, the same inlet and outlet inner diameter), since it is easier to clean and of a better quality for food production.

It is also possible to use a barrel with grooves on its inner wall, although it may not be preferable since it may make starch burnt. Therefore, it may be preferable to use a barrel that has no grooves, or as few grooves as possible, at least on the inner wall of the kneading section, more preferably a barrel that has no grooves, or as few grooves as possible, on the inner wall of the entire barrel. Specifically, the ratio of the region of the kneading section having grooves on the inner wall to the total length of the kneading section may preferably be typically 30% or less, particularly 25% or less, or 20% or less, or 15% or less, or 10% or less, or 5% or less, or substantially 0% (i.e., no grooves formed). In addition, the ratio of the region of the barrel having grooves on the inner wall to the total length of the barrel may preferably be 15% or less, particularly 10% or less, or 9% or less, or 8% or less, or 7% or less, or 6% or less, or 5% or less, or 4% or less, or 3% or less, or 2% or less, or 1% or less, or substantially 0% (i.e., no grooves formed).

When using a barrel in which the ratio of the region with grooves satisfies a predetermined ratio or less, it is preferable to adopt a screw having a kneading section with a screw structure with groove holes, more preferably a structure derived from a forward flight section by removing or deforming a part of the forward flight section. When a screw structure with groove holes is adopted, the shape of the deformed and/or removed parts of the forward flight section may preferably form a passage-like structure that penetrates the forward flight section. The cross-section of the passage-like structure may preferably have a U- or V-shaped shape. In addition, the angle formed by the passage-like structure penetrating the forward flight section to the axis of rotation of the screw (average penetrating angle) may preferably be smaller than the angle formed by the curve connecting the thread top points of the forward flight structure to the axis of rotation of the screw (helix angle). Specifically, the "helix angle" of a forward flight structure refers to the arithmetic average of the acute angles formed by the directions connecting the screw thread tops on the screw surface and the direction of the axis of rotation on the screw surface. The helix angle of the forward flight structure can be determined by, for example, measuring the angle between the forward flight structure and the axis of rotation on the screw surface every 30° rotation of the screw and calculating the arithmetic average from all measurements when the screw is rotated 360°. On the other hand, the "average penetrating angle" of a passage-like structure can be calculated as the arithmetic average of the acute angles formed by the directions connecting the deepest parts of the passage-like structure and the direction of the axis of rotation. Specifically, the passage-like structure penetrating the forward flight section may preferably be a structure diagonally penetrating the forward flight structure. More specifically, the average penetrating angle of the passage-like structure is usually more than 20%, and especially more than 30%, and usually less than 80%, and especially less than 70%, of the helix angle of the forward flight structure. In addition, the ratio of the total length of the deformed and/or removed parts to the total length of the ridges of the forward flight in the screw structure with groove holes may preferably be 50% or less. It is also preferable to provide a convex structure that interrupts the flow of dough in the kneading section. Specifically, it is preferable to provide a convex structure on the screw surface of the kneading section that rises to the vicinity of the barrel inner wall (specifically, 80% or more of the distance from the center of the screw to the inner wall of the barrel) such that the space between the screw and the inner wall of the barrel is generally divided into a space on the base side and a space on the tip side by the convex structure, and that the dough fills the interior of the space on the base side, since his may cause a stretching flow in the dough that flows over the convex structure, resulting in good kneading. The kneading section with the convex structure may preferably be structured to reduce the flow rate of the contents relative to the flow rate of the contents in the flight section prior to the kneading section.

(Feeder)

The feeder is attached to a position in the first half of the first flight of the barrel and is configured such that the food material to be kneaded can be fed into the barrel (into the space between the barrel and the screw) through this feeder. The feeder is not particularly limited, and may be a forced injection type feeder, which has a screw or the like inside a mechanism for forcibly feeding the composition material, or a natural drop type feeder, which supplies the composition material by natural drop.

(Die Section)

The die section is a die mounted on the tip end of the barrel in the extrusion direction for continuously molding the composition at the extrusion outlet, typically with one or more flow paths that run through from inside to outside the barrel. The structure and shape of the die section to be used in one or more embodiments of the present invention is not restricted and may be selected as appropriate. Examples of the die shapes include, although not limited to, round, square, triangular, star, oval, crescent, half-moon, cross, and fylfot, as well as any combinations thereof (e.g., a Celtic cross-shaped die hole, which is a combination of a Greek cross shape and a circle shape arranged such that the intersection of the cross is on the center of the circle, and that the circle has a radius of two-thirds or less of the distance from the center to each tip of the cross). In addition, regardless of whether it is the embodiment shown in FIG. 1 with the second flight section, the embodiment shown in FIG. 3 without the second flight section and with the integrated vent and die section, or still other embodiments, it may also be preferable to install a cooler in the die section, because this makes it possible to extrude the composition while cooling the composition, which serves to age the starch in the composition and produce a strong starch matrix structure. In particular, in the embodiment shown in FIG. 3 where the vent section and the die section are integrated into a single section, it may be preferable to install a cooler in the vent and die section in order to prevent swelling of the composition, which has been kneaded at high temperature in the kneading section.

However, the die section to be used in one or more embodiments of the present invention may preferably be characterized in that when the die section is cut perpendicular to the extrusion direction, the average degree of unevenness in the cross-sections of each flow channel satisfies a predetermined limit or larger. The "degree of unevenness" of a cross-section of a flow channel herein refers to, when the die section is cut perpendicular to the extrusion direction, a parameter indicating the degree of unevenness of the shape of a flow channel cross-section (corresponding to the outer edge of the cavity) on a virtual cut plane (assuming that the flow channel of the die section is cut into a circular section). This degree of unevenness can be calculated as {(the length of the perimeter when the convex apexes of convexity with an angle of less than 180° in the flow channel cross-section are connected with the shortest distance)/(the contour length of the flow channel cross-section)}, and is smaller for a more uneven cross-section. The average degree of unevenness can be determined by, e.g., assuming multiple cross-sections of the die section orthogonal to the axis of rotation at 1 mm intervals along the axis of rotation of the screw, measuring the degree of unevenness in each vertical section (if there are multiple channels, measure the degree of unevenness of every channel), and calculating the arithmetic average of the measured values.

Specifically, the degree of unevenness of the flow channel cross-section of the die section may preferably be typically 0.6 or more, particularly 0.65 or more, or 0.7 or more, or 0.75 or more, or 0.8 or more, or 0.85 or more, or 0.9 or more, or 0.95 or more. When the degree of unevenness of the flow channel cross-section of the die section satisfies the lower limits mentioned above, the resulting composition may preferably have both a good texture and high matte quality after heat cooking. In general, the greater the degree of unevenness of the flow channel cross-section of the die section, the smoother the surface of the resulting composition and the better the moldability of the composition. The upper limit is not particularly restricted, but may be typically 1.0 or less.

The die section to be used in one or more embodiments of the present invention may also preferably be characterized in that the average circularity in the cross-section of the flow channel satisfies a predetermined limit or less. The circularity of a flow channel herein refers to a parameter that decreases as the shape of the cross-section of the flow channel moves away from a perfect circle, and can be calculated as {(the perimeter of a perfect circle with the same area as the cross-section of the flow channel)/(the contour length of the cross-section of the flow channel)}. The more complex the shape of the cross-section, the smaller the circularity of the cross-section.

The direction of extrusion of the composition in the die section is also optional and not restricted. For example, it can be horizontal, vertical, or in-between directions.

(Vent Section)

The vent section is installed in the barrel at a position on the tip side of the kneading section, e.g., in the vicinity of the base side of the second flight section (near the boundary with the kneading section) in the case of the extruder according to the embodiment shown in FIG. 1, or integrated with the die section in the case of the extruder according to the embodiment shown in FIG. 3, and has the function to expose the composition to atmospheric pressure or reduced pressure. In the production method of one or more embodiments of the present invention, especially in the extruder according to the embodiment shown in FIG. 1, which has the second flight section, the pressure is rapidly reduced by the vent section at the section where the composition is transferred from the kneading section to the second flight section to form a starch matrix structure by homogenizing the composition with disintegration starch grain structures to prevent heat generation, while rapid cooling in the second flight section immediately afterwards enables local ageing of the starch near the composition surface. On the other hand, especially in the extruder according to the embodiment shown in FIG. 3, which lacks the second flight section and the vent and die sections are integrally provided (i.e., the composition is exposed to atmospheric pressure at the die section, which also serves as the vent section), the composition can be made with the starch grain structures disintegration by rapidly reducing the pressure at the die section, which also serves as the vent section, by exposing the composition to atmospheric pressure. In addition, subsequent rapid cooling of the composition after extrusion (e.g., by adding a small amount of water by mist water spraying and then volatilizing it, thereby rapidly lowering the composition temperature by the heat of evaporation) enables local ageing of the starch near the composition surface.

Specifically, the vent section may be installed on the tip side of the kneading section in the operating state with the screw in the barrel. In the production method of one or more embodiments of the present invention, especially in the extruder according to the embodiment shown in FIG. 1, which has the second flight section, the vent section may preferably be installed at a position on the barrel corresponding to the first half of the second flight section of the screw, i.e., within 50% of the total length of the second flight section from the base side start point of the second flight section, more preferably within 20% of the total length of the second flight section from the base side start point of the second flight section, most preferably at a position on the barrel corresponding to the base side start point (i.e., near the boundary between the second flight section and the kneading section or near the end of the kneading section located at the most tip side). The reason for this is not known, but it is assumed to be due to the rapid pressure drop at the vent section, which causes the starch grain structures in the composition to disintegration and the internal starch to flow out, forming a homogeneous matrix structure. On the other hand, especially in the extruder according to the embodiment shown in FIG. 3, which lacks the second flight section and the vent and die sections are integrally provided (i.e., the composition is exposed to atmospheric pressure at the die section, which also serves as the vent section), the vent section (also works as the die section) may preferably be installed at a position on the barrel corresponding to within 30%, more preferably within 20%, still more preferably within 10%, of the total length of the screw from the end point of the kneading section located at the most leading edge of the screw, and more preferably immediately after the end point of the kneading section located at the most advanced end (i.e., the die and vent section may preferably be installed immediately after the kneading section). It may also be preferable to install a flow retarding structure between the end of the kneading section and the die section, located at the most advanced end of the screw.

The vent section may be opened to atmospheric pressure to reduce the pressure inside the barrel to atmospheric pressure, but may preferably have a forced exhaust mechanism in said vent section. This enables a stronger matrix structure to be formed by forcibly volatilizing a part of the water in the composition and removing air bubbles in the matrix structure while quickly lowering the temperature of the composition. The mechanism may particularly be useful when a uniaxial extruder is employed as the extruder, as this mechanism may serve to incorporate air bubbles into the matrix structure. The forced exhaust mechanism may be selected from known vacuum pumps and the like, e.g., liquid-sealed pumps (water-sealed pumps). Any forced exhaustion mechanism (e.g., vacuum pump) can be used as long as it is capable of forcibly volatilizing some of the water in the composition to the extent that the composition temperature in the vent section is reduced to a certain degree. For example, the forced exhaust mechanism (e.g. vacuum pump, etc.) may preferably have the capacity to reduce the temperature by at least 1° C., more preferably by at least 2° C., at the vent section. The mechanism employed (e.g., vacuum pumps, etc.) can be any mechanism to the extent that the above performance can be achieved, but may be a forced exhaust mechanism with a suction capacity (also referred to as suction pressure or suction gas pressure) of 0.04 MPa or higher, preferably 0.06 MPa or higher, more preferably 0.08 MPa or higher. The upper limit is not particularly restricted, but may preferably be typically 0.1 MPa or lower, or 0.09 MPa or lower, since the pump is so strong it may also suck the dough. In an extruder producing swellings, it is in principle difficult to employ such a configuration as in one or more embodiments of the present invention, as the internal pressure of the extruder must in principle be increased to at least atmospheric pressure while the composition temperature is maintained above 100° C. Conventional extruders for producing swollen foods do not usually employ such a configuration as in one or more embodiments of the present invention, since such an extruder is in principle required to extrude the composition under atmospheric pressure or elevated pressure with maintaining the composition temperature at 100° C. or higher.

(Heater)

The heater (heating equipment) may be installed on the barrel around the first flight section and the kneading section for heating the barrel at the first flight section and the kneading section to control the temperature inside the barrel (the space between the barrel and the screw). The configuration and arrangement of the heater is not limited, but the heater may preferably be configured and arranged such that the first flight section and the kneading section of the barrel can be separately heated and adjusted to a predetermined temperature. The heater may more preferably be configured and arranged to separately heat and adjust a plurality of areas along the axial direction to a predetermined temperature for each of the first flight section and the kneading section of the barrel. The heating temperature conditions of the heater are not restricted, and the heater may preferably be configured to be able to achieve the temperature conditions as detailed in the explanation about the production method of one or more embodiments of the present invention below. Various types of heaters for extruders are well known to those skilled in the art. Examples include: a jacket system or direct heat system (air jacket system), in which a heater such as an electric heating wire or steam pipe is installed around the area of the barrel to be heated so that the heater can acts on the barrel indirectly; and a steam heating system, in which heated steam or the like is blown directly on the composition in the barrel. Preferable among these is a system that can exert heat indirectly (e.g., jacket system) from the viewpoint of retaining the matrix structure in the composition. When a jacket system is employed, it may be preferable to use electric heating wires, which can quickly adjust the temperature and are advantageous for forming matrix structures.

(Cooler)

In the extruder according to the embodiment shown in FIG. 1, which includes the second flight section, the cooler (cooling facility) may preferably be provided in the second flight section and/or the die section of the barrel, and configured to cool the barrel at the second flight section and/or the die section to thereby adjust the temperature of the composition passing through the interior of the barrel (the space between the barrel and the screw). The use of the extruder with the cooler installed in the second flight section and/or the die section of the barrel may be preferred in one or more embodiments of the present invention, since it may serve to age the starch in the composition and create a strong starch matrix structure.

The cooler installed in the second flight section and/or the die section of the barrel may preferably have the capacity to reduce the maximum attainable temperature of the composition by a predetermined temperature or more along the course from the start point of the kneading section to the outlet of the flow channel of the die section. According to the production method of one or more embodiments of the present invention, installation of the cooler in the second flight section of the barrel allows the starch in the composition to age and form a strong starch matrix structure. Specifically, the cooler may preferably have the capacity to reduce the maximum attainable temperature of the composition by a predetermined temperature or more along the course from the start point of the kneading section to the outlet of the die section. More specifically, the cooler may preferably have the capacity to reduce the maximum attainable temperature of the composition by typically 20° C. or more, particularly 25° C. or more, or 30° C. or more, or 35° C. or more, or 40° C. or more, or 45° C. or more, or 50° C. or more, or 55° C. or more, or 60° C. or more, or 65° C. or more, or 70° C. or more, or 75° C. or more, or 80° C. or more. The upper limit is not particularly restricted, but may preferably be typically 200° C. or less, or 150° C. or less, or 100° C. or less.

The cooler installed around the area from the second flight section to the die section of the barrel (i.e., the second flight section and/or the die section) may preferably have the capacity to reduce the temperature of the composition at the outlet of the flow channel of the die section to a predetermined temperature. According to the production method of one or more embodiments of the present invention, installation of the cooler in the second flight section and/or the die section may preferably make it possible to more effectively age the starch on the surface of the composition and thereby inhibit the binding of pieces the resulting composition. In addition, it is preferable to adopt the elongated structure as shown in FIG. 5a or 5b as the die section, since this may help reduce the composition temperature. Adopting the die section with the elongated structure may be especially preferable in the extruder according to the embodiment shown in FIG. 3, which lacks the second flight section and the vent and die sections are integrally provided (i.e., the composition is exposed to atmospheric pressure at the die section, which also serves as the vent section), since this may help inhibit the swelling of the composition. In general, the cooler may preferably have the capacity to lower the composition temperature at the outlet of the die section to typically 85° C. or less, particularly 80° C. or less, or 75° C. or less, or 70° C. or less, especially 65° C. or less. The lower limit is not particularly restricted, but may preferably be 0° C. or more, particularly 5° C. or more, or 10° C. or more, or 15° C. or more, still preferably 20° C. or more, especially 25° C. or more from the viewpoint of for industrial expediency.

Various coolers for such extruders are well known to those skilled in the art. Examples include: a jacket system, in which cooling equipment such as cooling water pipes is installed on the circumferential surface of the barrel corresponding to the cooler installation area mentioned above so as to act indirectly; and a system of making gas or liquid act directly on the composition in the barrel or in the flow channel of the die section or on the composition extruded from the die section (e.g., by injecting water in a liquid state, misty water, air at room temperature, cooled air or inert gas such as liquid nitrogen). Preferred among these is a system that can act indirectly (e.g., a jacket system) from the viewpoint of maintaining the desired matrix structure in the composition. When the jacket system is adopted, it may be preferable to use cooling water piping, which allows rapid temperature adjustment and is advantageous for the formation of the desired matrix structure.

[II. Starch-Containing Composition for Heat Cooking]

The constitution and properties of the starch-containing compositions for cooking produced by the production method of one or more embodiments of the present invention are as follows.

(1) Summary of the Composition:

*Definitions:

The term "heat cooking" herein generally refers to a cooking method of raising the temperature of food by applying heat to the food directly using fire or microwaves or indirectly through a medium such as water or air. Generally, it refers to cooking at a temperature of about 70° C. or higher, typically from 80° C. to 180° C., for example, over a period of time between 1 minute and 60 minutes. Examples of heat cooking include baking, boiling, stir-frying, and steaming. The composition in one or more embodiments of the present invention has the characteristic of not losing their shape when heat-cooked in the liquid. The composition according to one or more embodiments of the present invention may preferably be prepared to be heat-cooked in a water-based liquid (i.e., contain water at a 50% or more). Accordingly, the compositions of one or more embodiments of the present invention may particularly preferably be a composition for heat cooking in liquid, which are to be consumed after being heat-cooked in liquid.

The term "paste composition" herein refers to a food composition produced by kneading food ingredients of edible plant origin, and encompasses kneaded products and pastas (including those not made from wheat).

*Characteristics of the Composition:

The composition of one or more embodiments of the present invention is characterized in that it does not easily disintegration in shape during heat cooking in liquid and has a highly matte texture and an excellent appearance. The term "matte texture" of a composition herein refers to the property of exhibiting a high degree of light scattering on its surface (also referred to as surface light scattering) and appearing to have a rich taste even under visible light. In other words, incident light is reflected in all directions (light scattering) and gloss on the surface is suppressed, resulting in a highly matte texture.

Conventional starch-containing compositions may disintegration and lose their shape when heat-cooked in water. A known method for preventing such disintegration of food compositions is to add an anti-disintegration agent containing sugar such as maltotriose to the compositions. However, this method imparts the unique flavour and texture of maltotriose to the food and also impairs the matte texture of the is food, resulting in a composition with an inferior appearance.

On the other hand, the composition of one or more embodiments of the present invention prepared by the production method of one or more embodiments of the present invention has the property of being resistant to disintegration in shape during heat cooking in liquid and the property of exhibiting a highly matte texture and an excellent appearance. Although it is not clear as to why the composition of one or more embodiments of the present invention prepared by the production method of one or more embodiments of the present invention has such excellent properties, it is estimated as follows. Conventional compositions for heat cooking are mainly made to form a wheat gluten network to prevent shape disintegration during heat cooking, and therefore include a honeycomb-like structure of gluten in glassy, glued starch, which may reflect incident light and cause a loss of matte texture. On the other hand, it is estimated that the production process of one or more embodiments of the present invention results in compositional parts with less light scattering on the surface of the composition even under visible light, due to the presence of an ageing starch layer around the matrix structure of the powdered starch, which prevents diffuse reflection of light so as to prevent shape disintegration during heat cooking.

*Embodiments of the Composition:

The composition of one or more embodiments of the present invention may preferably be a starch-containing composition for cooking that is used for cooking in liquid (especially in water), a cooking environment in which the ingredients of the composition are particularly susceptible to leaching. The starch-containing composition for heat cooking may preferably be a composition in the form of, e.g., noodles or noodle-like strings or strips such as pasta, since the composition of one or more embodiments of the present invention has the property of retaining its edible shape even after heat cooked in water for eating (e.g., more than 5 minutes in water at a temperature of 90° C. or higher).

Examples of the composition of one or more embodiments of the present invention include, although not limited to: pasta, Chinese noodles, udon (Japanese wheat-flour noodles), inaniwa udon, kishimen, houtou, suiton, hiyamugi, somen (variations of udon), soba (Japanese buckwheat-flour noodles), soba gaki (Japanese buckwheat-flour paste), bee-hun (rice vermicelli), pho, reimen (Korean cold noodles), vermicelli, oatmeal, couscous, kiritanpo (variation of Japanese rice cake in an elongate shape), tteok, and gyoza skins.

Examples of pastas include long pasta and short pasta.

The term "long pasta" is typically a generic term referring to long, thin pasta, but may also be used herein in a broader meaning encompassing udon and soba noodles. Specific examples include, although not limited to, spaghetti (diameter: 1.6 mm to 1.7 mm), spaghettini (diameter: 1.4 mm to 1.5 mm), vermicelli (diameter: 2.0 mm to 2.2 mm), cappellini (diameter: 0.8 mm to 1.0 mm), linguini (short diameter: about 1 mm, long diameter: about 3 mm), tagliatelle or fettuccine (short diameter: about 1 mm, long diameter: about 3 mm), and other types of pasta. diameter: about 1 mm, long diameter: about 3 mm), tagliatelle or fettuccine (flat noodles of about 7 mm to 8 mm in width), pappardelle (flat noodles of about 10 mm to 30 mm in width), etc. Long pasta is a product that typically has a large contact area between noodles and therefore tends to lose its surface smoothness and adhere to each other. Accordingly, making the composition of one or more embodiments of the present invention into the form of pasta may be useful and desirable.

The term "short pasta" is typically a general term referring to short pasta, but may also be used herein in a broader meaning encompassing product once shaped in long pasta and then processed into smaller sizes, such as fregola (granular pasta) and couscous. Examples include, although not limited to, macaroni (cylindrical shape with a diameter of about 3 to 5 mm), penne (cylindrical shape with both ends cut diagonally like the tip of a pen), farfalle (shaped like a butterfly), conchiglie (shaped like a seashell), and orecchiette (dome-shaped like an ear), etc.

*Composition in a Dry State:

The composition of one or more embodiments of the present invention may be a composition in a dry state. Specifically, the composition of one or more embodiments of the present invention may be usefully made in a dry state while performing the water retention treatment described below, since the resulting composition has a matte appearance and excellent palatability.

The "dry" state herein refers to a state in which the moisture content is less than 25 mass % on a dry weight basis and the water activity value is less than 0.85. The water content in a composition can be measured by subjecting the dried powder to the decompression heating and drying method described below, and the water activity value can be measured by using a general water activity measurement device (e.g., "LabMaster-aw NEO," manufactured by Novavacina, which includes an electrical resistance (electrolyte) humidity sensor) according to a standard method.

*Composition Made into an Elongated Form:

The composition of one or more embodiments of the present invention may be made in any shape that conventional starch-containing solid compositions have, particularly as a composition into an elongate form such as long pasta.

The composition of one or more embodiments of the present invention made into such an elongated form may preferably have a diameter of, although not limited to, typically 20 mm or smaller, preferably 10 mm or smaller, more preferably 5 mm or smaller, even more preferably 3 mm or smaller, even further preferably 2 mm or smaller. The "diameter" of a composition herein refers to the length of the longest diagonal line of a cut surface of the composition when cut perpendicular to its longitudinal direction (the maximum length of line segments connecting any two points on the contour of the cross-section), and means its diameter if the cut surface is circular, its major axis if the cut surface is oval, or its diagonal if the cut surface is rectangular (e.g., in the case of a composition formed into a plate).

(2) Constitution of the Composition:

The materials for the composition of one or more embodiments of the present invention is not particularly restricted, but may preferably include at least one edible plant. The types of the edible plant is not particularly restricted, but may preferably include at least one dried edible plant, i.e., an edible plant with a dry mass basis moisture content of less than 25%, preferably less than 20%, more preferably less than 15%, and a moisture content activity of 0.85 or less, preferably 0.80 or less, more preferably 0.75 or less. The edible plant to be used may preferably be micronized and powdered. Examples of specific edible plants may preferably contain at least one species of pulse. One or more embodiments of using pulse as a raw material will be explained in detail later. However, the materials for the composition of one or more embodiments of the present invention are not restricted to these examples, but the composition may also contain other edible plants than pulse an/or other raw materials, as long as the various properties explained below are satisfied. Details of pulses and edible plants as raw materials for the composition of one or more embodiments of the present invention will be explained in detail later.

*Insoluble Dietary Fiber:

The composition of one or more embodiments of the present invention contains insoluble dietary fiber. The term "insoluble dietary fiber" used herein refers to indigestible ingredients in food that cannot be digested by human digestive enzymes and are insoluble in water. The insoluble dietary fiber content may be measured in accordance with the Japan Standard Tables for Food Composition 2015 (7th revised edition) using the Prosky variant method. The composition of one or more embodiments of the present invention is useful because it does not result in a composition with a bland texture even when the insoluble fiber content is high. Although the reason for this is not known, it is possible that the high-temperature, high-pressure, strong kneading treatment improves the texture of insoluble dietary fiber by causing the dietary fiber in the composition to interact with starch and protein to form a network structure.

The lower limit of the insoluble dietary fiber content in the composition of one or more embodiments of the present invention may preferably be typically 2.0 mass % or more, particularly 3 mass % or more, particularly 4 mass % or more, particularly 5 mass % or more, or 6 mass % or more, or 7 mass % or more, or 8 mass % or more, or 9 mass % or more, particularly 10 mass % or more, in terms of dry mass basis. By setting the content of insoluble dietary fiber above the aforementioned lower limit, the composition of one or more embodiments of the present invention is more likely to have a structure in which the insoluble dietary fiber is homogeneously dispersed in the matrix-like starch in an appropriate size and the starch is distributed in a matrix-like manner, which in turn improves the rubbery texture of the product. The "dry mass" used herein refers to a mass obtained by calculating the moisture content from the aforementioned "moisture content (dry mass basis moisture content)" and subtracting the calculated moisture content from the overall mass of the composition, etc. The "dry mass basis" used herein refers to a content ratio of each component calculated with the dry mass of the composition as the denominator and the content of each component as the numerator.

The upper limit of the insoluble dietary fiber content in the composition of one or more embodiments of the present invention may preferably be, although not particularly limited to, typically 50 mass % or less, particularly 40 mass % or less, furthermore 30 mass % or less in terms of dry mass basis, from the viewpoint of industrial production efficiency.

The origin of the insoluble dietary fiber contained in the composition of one or more embodiments of the present invention is not particularly limited, and may be either those derived from various naturally-occurring materials containing insoluble dietary fiber or those synthesized. When those derived from naturally-occurring materials are used, insoluble dietary fiber contained in various materials may be isolated, purified, and used, or alternatively, such materials containing insoluble dietary fiber may be used as such. Examples of insoluble dietary fibers that can be used include those derived from cereals, those derived from pulse (beans), those derived from potatoes, those derived from vegetables, those derived from nuts, and those derived from fruits. Preferable among them are those derived from cereals and those derived from pulse (beans) from the viewpoint of the texture of the composition, more preferably those derived from pulse (beans), even more preferably those derived from pea, most preferably those derived from yellow pea. When pulse containing insoluble dietary fiber is used, it may be used either with or without its seed skin, but pulse with seed skin may preferably be used since it has a higher content of dietary fiber.

The insoluble dietary fiber contained in the composition of one or more embodiments of the present invention may be either in the form of an isolated pure product or, more preferably, in the form of being contained in pulse. Specifically, the ratio of the insoluble dietary fiber contained in pulse to the total insoluble dietary fiber content in the whole composition may preferably be typically 10 mass % or more, particularly 20 mass % or more, furthermore 30 mass % or more, particularly 40 mass % or more, or 50 mass % or more, or 60 mass % or more, or 70 mass % or more, or 80 mass % or more, or 90 mass % or more, particularly 100 mass %.

The constitution of the insoluble dietary fiber contained in the composition of one or more embodiments of the present invention is not particularly restricted. However, the ratio of lignin (especially acid-soluble lignin) to the total insoluble dietary fiber content (especially to the total insoluble dietary fiber) may preferably satisfy the aforementioned limits or more, since this will make it easier to obtain a more pronounced texture improvement effect. Specifically, the ratio of the lignin content (especially the acid-soluble lignin content) to the total dietary fiber content to the total insoluble dietary fiber content may preferably be typically 5 mass % or more, particularly 10 mass % or more, or 30 mass % or more, in terms of dry mass basis.

The composition of one or more embodiments of the present invention may preferably be characterized in that the particle size of the insoluble fiber contained therein satisfies a certain size or less. If the particle size of the insoluble dietary fiber is too large, the composition may become shaggy and undesirable in texture. The reason for this is not known, but it is estimated that coarse insoluble dietary fiber inhibits the formation of matrix structures such as starch, making it difficult for the effects of one or more embodiments of the invention to be realized. It is highly likely that the insoluble fiber size in randomly crushed pulse powder is more than 450 μm (because the insoluble fiber in pulse is usually rod-shaped, and the laser diffraction particle size distribution measurement according to one or more embodiments of the invention tends to yield larger values). In particular, when food ingredients containing hard tissues, such as pulse with seed coat, are used as raw materials, the insoluble dietary fiber in the seed coat is coarse and is less easily crushed than the edible portion. Therefore, when such food ingredients are used in one or more embodiments of the present invention, it may be preferable to use one that has undergone a specific crushing process in advance so that the insoluble dietary fiber contained therein is within a specific size range.

According to one or more embodiments of the present invention, the particle size of the insoluble dietary fiber in the composition is evaluated by a method including treating the aqueous suspension of the composition with protease and amylase, and subjecting the composition after the starch- and protein-degradation treatment, in which starch and protein are degraded by enzymes, to the ultrasonication, and then to the measurement using a laser diffraction particle size analyzer to determine the particle size distribution. Specifically, 6 mass % aqueous suspension of the composition is treated with 0.4 volume % of protease and 0.02 mass % of α-amylase at 20° C. for 3 days (also referred to as "[Procedure b]") to carry out the starch- and protein-digestion treatment, and the enzyme-treated composition is subjected to the measurement for the particle diameter distribution after ultrasonication.

Specifically, the composition of one or more embodiments of the present invention may preferably be characterized in that the particle size $d_{90}$ in the particle size distribution of insoluble dietary fiber measured by the above procedure is less than 450 μm, more preferably 400 μm or less, more preferably 350 μm or less, more preferably 300 μm or less, more preferably 250 μm or less, more preferably 200 μm or less, more preferably 150 μm or less, more preferably 100 μm or less, more preferably 80 μm or less, more preferably 60 μm or less, 50 μm or less. On the other hand, the lower limit of the particle diameter $d_{90}$ of the insoluble dietary fiber may preferably be, although not particularly limited to, typically 1 μm or more, more preferably 3 μm or more.

Likewise, the composition of one or more embodiments of the present invention may preferably be characterized in that the particle size $d_{50}$ in the particle size distribution of insoluble dietary fiber measured by the above procedure is less than 450 μm, more preferably 400 μm or less, more preferably 350 μm or less, more preferably 300 μm or less, more preferably 250 μm or less, more preferably 200 μm or less, more preferably 150 μm or less, more preferably 100 μm or less, more preferably 80 μm or less, more preferably 60 μm or less, 50 μm or less. On the other hand, the lower limit of the particle diameter $d_{50}$ of the insoluble dietary fiber may preferably be, although not particularly limited to, typically 1 μm or more, more preferably 3 μm or more.

A more specific procedure for measuring the particle size distribution of insoluble dietary fiber, polysaccharides, etc., in a composition is as follows. 300 mg of the composition is placed in a plastic tube with 5 mL of water, allowed to swell at 20° C. for about 1 hour, and then processed using a small Hiscotron (Microtech Nichion homogenizer NS-310E3) until a porridge-like consistency is obtained (about 15 seconds at 1000 rpm) to prepare a 6 mass % water suspension of the composition. 2.5 mL of the treated sample is then divided and combined with 10 μL of protease (Proteinase K, Takara Bio) and 0.5 mg of α-amylase (α-Amylase from *Bacillus subtilis*, Sigma), and allowed to react at 20° C. for 3 days. After the reaction, the resulting protease- and amylase-treated composition is subjected to sonication, and then to measurement for particle size distribution.

The measurement of particle size distribution of a protease- and amylase-treated composition after ultrasonic treatment shall be performed using a laser diffraction particle size analyzer according to the following conditions. Ethanol is used as the solvent for the measurement, which has little effect on the structure of the composition. The laser diffraction particle size analyzer used for the measurement is not limited to any particular type, an example being Microtrac MT3300 EXII system marketed by Microtrac Bell Inc. The measurement application software used for the measurement is not limited, an example being DMS2 (Data Management System version 2, Microtrac Bell Inc.). When the device and the application software mentioned above are used, the measurement can be carried out by: carrying out cleaning by pressing the Wash button of the software; carrying out calibration by pressing the Set Zero button of the software; and directly loading the sample via the Sample Loading feature until the sample concentration is within the proper range. After the sample is loaded, the measurement sample is subjected to ultrasonic treatment by the measurement device, followed by measurement. Specifically, a sample that has not been subjected to ultrasonic treatment is put into the measurement solvent (ethanol) circulating in the measurement system, the concentration is adjusted to within the appropriate range using the Sample Loading feature, and then the ultrasonic treatment is performed by pressing the Ultrasonic Treatment button of the software. Then, after three times of defoaming, the sample loading can be carried out again to adjust the concentration to within the appropriate range. Thereafter, the sample is promptly laser diffracted at a flow rate of 60% with a measurement time of 10 seconds, and the result is used as the measurement value. The parameters for the measurement may be, e.g., Distribution indication: Volume; Particle refractive index: 1.60; Solvent refractive index: 1.36; Upper limit of measurement: 2,000.00 µm; Lower limit of measurement: 0.021 µm.

The term "particle size $d_{90}$" (or the term "particle size $d_{50}$") herein refers to, when the particle size distribution of the object is measured on a volume basis and divided into two parts at a certain particle size, the particle size at which the ratio between the cumulative value of the particle frequency % on the larger side to that on the smaller side are 10:90 (or 50:50). The "ultrasonic treatment" herein refers to a treatment with ultrasonic waves of 40 kHz frequency at an output of 40 W for 3 minutes, unless otherwise specified.

*Starch:

The composition of one or more embodiments of the present invention contains starch. The composition of one or more embodiments of the present invention is more likely to have the effect of elasticity felt as water is absorbed after heat-cooking when it contains starch at a certain concentration or more. Although the reason is not known, it is possible that the high-temperature, high-pressure, and strong kneading process causes the relatively large molecular weight fraction of starch in the composition to form a network structure, which results in the aforementioned effect.

Specifically, the lower limit of the starch content in the composition of one or more embodiments of the present invention may be typically 20 mass % or more in terms of dry mass basis. It may preferably be 25 mass % or more, particularly 30 mass % or more, or 35 mass % or more, or 40 mass % or more, or 45 mass % or more, particularly 50 mass % or more. On the other hand, the upper limit of the starch content in the composition of one or more embodiments of the present invention may be, although not particularly limited to, 85 mass % or less, particularly 80 mass % or less, or 70 mass % or less, or 60 mass % or less in terms of dry mass basis.

The origin of the starch in the composition of one or more embodiments of the present invention is not particularly restricted. Examples include plant-derived starch and animal-derived starch, but pulse-derived starch may be preferred. Specifically, the ratio of pulse-derived starch to the total starch content of the composition may preferably be typically 30 mass % or more, particularly 40 mass % or more, or 50 mass % or more, or 60 mass % or more, or 70 mass % or more, or 80 mass % or more, or 90 mass % or more, particularly 100 mass %. The upper limit is not particularly restricted, and may be typically 100 mass % or less. The pulse-derived starch may preferably be derived from pea, most preferably from yellow pea. Pulse will be discussed below.

The starch to be incorporated in the composition of one or more embodiments of the present invention may be either an isolated and pure starch or, more preferably, in the form of starch-containing pulse. Specifically, the ratio of starch contained in pulse to the total starch content in the composition may preferably be typically 30 mass % or more, particularly 40 mass % or more, or 50 mass % or more, or 60 mass % or more, or 70 mass % or more, or 80 mass % or more, or 90 mass % or more, particularly 100 mass %. The upper limit is not particularly restricted, and may typically be 100 mass % or less.

In one or more embodiments of the present invention, the starch content in a composition is determined according to the Japan Standard Tables for Food Composition 2015 (7th revised edition) and using the method of AOAC 996.11, by a method in which soluble carbohydrates (glucose, maltose, maltodextrin, etc.) that affect the measured value are removed via extraction treatment with 80% ethanol.

The composition of one or more embodiments of the present invention may preferably be characterized in that the number of starch grain structures satisfies a predetermined value or less. Although the principle behind this is unknown, it is estimated that since the composition is subjected to the high-temperature, high-pressure, and strong kneading conditions described below while the starch grain structures are broken down, the starch diffuses throughout the composition in a matrix-like structure, which enable the amylopectin in the starch to easily develop elasticity during water retention.

The starch grain structures recited in (a) above are iodine-stained structures with circular shapes of about 1 to 50 µm in diameter in a planar image, and can be observed, for example, by preparing 6% aqueous suspension of crushed product of the composition and observing the suspension under magnified view. Specifically, 6% suspension of the composition powder is prepared by sieving crushed product of the composition through a sieve with 150 µm apertures, and 3 mg of the 150-µm pass composition powder is suspended in 50 µL of water. This suspension is then placed on a slide to obtain a prepared slide, which is observed under a phase contrast microscope with polarized light or under an optical microscope with iodine staining. The magnification factor is not restricted, but may be 100 times or 200 times. When the distribution of starch grain structures on the prepared slide is uniform, the percentage of starch grain structures in the entire prepared slide can be estimated by observing a representative field of view. On the other hand, when the distribution of starch grain structures on the prepared slide is found to be biased, a finite number of fields of view (e.g., two or more, e.g., five or ten) can be observed, and the observation results can be added together to obtain a measurement for the entire preparation.

Specifically, in the composition of one or more embodiments of the present invention may preferably be characterized in that the number of starch grain structures observed under these conditions is typically $300/mm^2$ or less, particularly $250/mm^2$ or less, furthermore $200/mm^2$ or less, particularly $150/mm^2$ or less, or $100/mm^2$ or less, or $50/mm^2$ or less, or $30/mm^2$ or less, or $10/mm^2$ or less, particularly $0/mm^2$.

The terms "crushed product of a composition," "composition crushed product," or "crushed composition" used herein all refer to, unless otherwise specified, a composition that has been crushed to such an extent that the particle diameter $d_{50}$ and/or $d_{90}$ (preferably both $d_{50}$ and $d_{90}$) after ultrasonication, as measured by a laser diffraction particle size distribution analyzer, is about 1000 µm or less. The lower limit of the particle diameter $d_{50}$ and/or $d_{90}$ (preferably both particle diameters $d_{50}$ and $d_{90}$) after ultrasonication is not particularly limited, but is usually 1 µm or more.

*Degree of Gelatinization of Starch:

The composition of one or more embodiments of the present invention may preferably be characterized in that the degree of gelatinization of starch in the composition satisfies a predetermined limit or more. Specifically, in the composition of one or more embodiments of the present invention the degree of gelatinization of starch may preferably be typically 50 mass % or more, particularly 60 mass % or more, particularly 70 mass % or more. The upper limit of the degree of gelatinization is not particularly restricted, and may be 100 mass % or less. However, if the degree of gelatinization is too high, starch may break down and the composition may become sticky and of undesirable quality. Accordingly, the upper limit of the degree of gelatinization may preferably be 99 mass % or less, particularly 95 mass % or less, furthermore 90 mass % or less.

In one or more embodiments of the present invention, the degree of gelatinization of a composition is measured as the ratio of the gelatinized starch content to the total starch content using the glucoamylase second method, which is a partial modification of the Central Analytical Laboratory of Customs (following the method by Japan Food Research Laboratories: https://www.jfrl.or.jp/storage/file/221.pdf).

*Protein:

The composition of one or more embodiments of the present invention contains protein. Specifically, the composition of one or more embodiments of the present invention may preferably be characterized by having a protein content of a predetermined value or higher, which tends to improve its elasticity after heat cooking while inhibiting a rubbery feel, resulting in a good texture that is easy to rip off by biting. Although the reason for this is not clear, it is estimated that the high-temperature, high-pressure, strong kneading treatment results in an interaction whereby the starch is spread throughout the composition in a matrix-like form, within which an agglomerate structure, which is thought to consist mainly of proteins, develops to a favourable shape and size, with the aid of dietary fibers, and this interaction results in the formation of a structure that is completely different from the previously known networks of gluten and other proteins.

Specifically, the lower limit of the protein content in the composition of one or more embodiments of the present invention in terms of wet mass basis may be typically 3.0 mass % or more, preferably 4.0 mass % or more, or 5.0 mass % or more, or 6.0 mass % or more, or 7.0 mass % or more, or 8.0 mass % or more, or 9.0 mass % or more, or 10 mass % or more, or 11 mass % or more, or 12 mass % or more, or 13 mass % or more, or 14 mass % or more, or 15 mass % or more, or 16 mass % or more, or 17 mass % or more, or 18 mass % or more, or 19 mass % or more, or 20 mass % or more, or 21 mass % or more, especially 22 mass % or more. On the other hand, the upper limit of the protein content in the composition of the one or more embodiments of present invention may be, although not particularly limited to, typically typically 85 mass % or less, preferably 80 mass % or less, more preferably 75 mass % or less, more preferably 70 mass % or less, more preferably 65 mass % or less, more preferably 60 mass % or less in terms of wet mass basis.

The origin of the protein in the composition of one or more embodiments of the present invention is not particularly limited. Examples include plant-derived protein and animal-derived protein, of which protein of plant origin (especially pulse) is preferred. Specifically, the ratio of pulse-derived protein content to the total protein content in the whole composition may preferably be typically 10 mass % or more, particularly 20 mass % or more, furthermore 30 mass % or more, particularly 40 mass % or more, or 50 mass % or more, or 60 mass % or more, or 70 mass % or more, or 80 mass % or more, or 90 mass % or more, particularly 100 mass %. The pulse-derived protein may preferably be particularly pea-derived protein, most preferably yellow pea-derived protein.

The protein incorporated in the composition of one or more embodiments of the present invention may be in the form of an isolated pure product or, preferably, may be present in the state of being contained in pulse. Specifically, the ratio of the content of protein contained in pulse to the total protein content of the composition may preferably be typically 10 mass % or more, particularly 20 mass % or more, furthermore 30 mass % or more, particularly 40 mass % or more, or 50 mass % or more, or 60 mass % or more, or 70 mass % or more, or 80 mass % or more, or 90 mass % or more, particularly 100 mass %.

Typically 50 mass % or more, particularly 60 mass % or more, furthermore 70 mass % or more, particularly 80 mass % or more, or 90 mass % or more, particularly 100 mass % of each of the protein and starch contents in the composition of one or more embodiments of the present invention may preferably be derived from pulse, more preferably derived from pulse of the same species, more preferably derived from pulse of the same individual. In addition, typically 50 mass % or more, particularly 60 mass % or more, furthermore 70 mass % or more, particularly 80 mass % or more, or 90 mass % or more, particularly 100 mass % of each of the protein and starch contents in the composition of one or more embodiments of the present invention may preferably be present in the state of being contained in edible plant.

The protein content in a composition herein can be measured by, e.g., quantifying the total amount of nitrogen using the combustion method (improved Dumas method) specified in the Food Labeling Law ("About Food Labeling Standards" (Mar. 30, 2015, Shokuhin Table No. 139)), and then multiplying the total amount of nitrogen with the "nitrogen-protein conversion factor."

*Total Oil and Fat Content:

The total oil and fat content in the composition of one or more embodiments of the present invention may preferably be, although not limited to, typically less than 17 mass %, particularly less than 15 mass %, furthermore less than 13 mass %, particularly less than 10 mass %, or less than 8 mass %, or less than 7 mass %, or less than 6 mass %, or less than 5 mass %, or less than 4 mass %, or less than 3 mass %, or less than 2 mass %, or less than 1 mass %, particularly 0.1 less than 8 mass %, in terms of dry mass basis. On the other hand, the lower limit of the total oil and fat content may preferably be, although not particularly limited to, typically 0.01 mass % or more, in terms of dry mass basis. The total oil and fat content in a solid paste composition can be measured by a method, e.g., according to the Japan Standard Tables for Food Composition 2015 (7th revised edition), using the Soxhlet extraction method with diethyl ether.

The origin of the oil and fat content in the composition of one or more embodiments of the present invention is not particularly restricted. Examples include plant-derived oils and fats and animal-derived oils and fats, of which plant-derived oils and fats are preferred. Specifically, the ratio of the content of plant-derived oils and fats in the whole composition may preferably be typically 50 mass % or more, particularly 60 mass % or more, furthermore 70 mass % or more, particularly 80 mass % or more, or 90 mass % or more, particularly 100 mass %. Examples of plant-derived oil and fat content include those derived from cereal, those derived from pulse (beans), those derived from potato, those derived from vegetable, those derived from nuts, and those derived from fruits. From the viewpoint of achieving the aforementioned suitable molecular weight distribution of starch, preferred among these are those derived from pulse (beans), particularly pea-derived oil and fat, most preferably yellow pea-derived oil and fat.

The oil and fat content incorporated in the composition of one or more embodiments of the present invention may be in the form of an isolated pure product or, preferably, may be present in the state of being contained in edible plant (particularly pulse). Specifically, the ratio of the oil and fat content incorporated in pulse to the total protein content of the composition may preferably be typically 50 mass % or more, particularly 60 mass % or more, furthermore 70 mass % or more, particularly 80 mass % or more, or 90 mass % or more, particularly 100 mass %.

Typically, 50 mass % or more, particularly 60 mass % or more, furthermore 70 mass % or more, particularly 80 mass % or more, or 90 mass % or more, particularly 100 mass % of the oil and fat content in the composition of one or more embodiments of the present invention may preferably be derived from pulse, more preferably derived from pulse of the same species, more preferably derived from pulse of the same individual. In addition, typically 50 mass % or more, particularly 60 mass % or more, furthermore 70 mass % or more, particularly 80 mass % or more, or 90 mass % or more, particularly 100 mass % of the oil and fat content in the composition of one or more embodiments of the present invention may preferably be present in the state of being contained in edible plant.

*Dry Mass Basis Moisture Content:

The dry mass basis moisture content in the composition of one or more embodiments of the present invention may preferably be a predetermined value or less. Specifically, the dry mass basis moisture content in the composition of one or more embodiments of the present invention may be, although not limited to, 60 mass % or less, or 55 mass % or less, particularly 50 mass % or less, or 45 mass % or less, or 40 mass % or less, or 35 mass % or less, or 30 mass % or less, or 25 mass % or less, or 20 mass % or less, or 15 mass % or less. On the other hand, the lower limit of the dry mass basis moisture content in the composition of one or more embodiments of the present invention may be, although not limited to, from the viewpoint of industrial production efficiency, 0.5 mass % or more, or 1 mass % or more, or 2 mass % or more. The dry mass basis moisture content of the composition of one or more embodiments of the present invention may be either derived from various ingredients of the composition or derived from further added water. If the dry mass basis moisture content in the dough composition before processing is high, a process such as drying can be employed to adjust the dry mass basis moisture content to within the aforementioned range.

The "dry mass basis water content" herein refers to the ratio of the total amount of water in the composition of one or more embodiments of the present invention which either originates from the raw materials or was added externally to the total amount of solids in the solid paste composition of one or more embodiments of the present invention. The value can be measured by a method, for example, according to the Japan Standard Tables for Food Composition 2015 (7th revised edition), by heating to 90° C. using the decompression heating and drying method. Specifically, an appropriate amount of sample ($W_1$) is put in a pre-weighed weighing vessel ($W_0$) and weighed, the weighing vessel with the lid removed or opened is placed in a reduced pressure electric constant temperature dryer adjusted to a predetermined temperature (more specifically, 90° C.) at normal pressure, the door is closed, and the vacuum pump is operated to dry the sample at a predetermined reduced pressure for a predetermined period of time. The vacuum pump is then stopped, dry air is sent to bring the pressure back to normal, the weighing vessel is removed, the lid is put on, the vessel is left to cool in a desiccator, and the mass is then weighed. The method of drying, cooling, and weighing ($W_2$) is repeated until a constant amount is reached, and the water content (water content based on dry weight) (mass %) is determined using the following formula.

$$\text{Dry basis water content (g/100 g)}=(W_1-W_2)/(W_2-W_0)\times100 \qquad \text{[Formula 1]}$$

In the formula, $W_0$ is the mass (g) of the pre-weighed weighing vessel, $W_1$ is the mass (g) of the weighing vessel with the sample before drying, and $W_2$ is the mass (g) of the weighing vessel with the sample after drying.

*Raw Materials:

The raw materials for the compositions of one or more embodiments of the present invention is not particularly restricted, as long as the various ingredient compositions and properties specified in one or more embodiments of the present invention can be achieved. However, it may be preferable to use one or more edible plants as raw materials, and it is more preferable to use pulse as edible plants.

*Pulse:

When pulse is used as edible plant in the composition of one or more embodiments of the present invention, preferable examples of pulse species that can be used include, although not limited to, one or more selected from *Pisum, Phaseolus, Cajanus, Vigna, Vicia, Cicer, Glycine*, and Lens species. Specific examples of pulse species include, although not limited to: peas (in particular, yellow peas, white peas, and green peas, which are immature seeds), kidney beans, red kidney beans, white kidney beans, black beans, pinto beans, toramame (a variation of kidney beans: concord paul), lima beans, scarlet runner beans, pigeon peas, mung beans, cowpeas, azuki beans, broad beans (*Vicia faba*), soybeans (especially edamame, which are immature seeds of soybeans harvested with their pods in their immature state and characterized by the green appearance of the beans), chickpeas, lentils, blue peas, scarlet runner beans, peanuts, lupin beans, glass peas, locust beans (carob), twisted cluster beans, African locust beans, coffee beans, cacao beans, and Mexican jumping beans. Other classifications of foodstuffs not exemplified can be naturally understood by those skilled in the art who deal with the foodstuffs or processed products of the foodstuffs. Specifically, this can be clearly understood by referring to the food group classifications (p. 249, Table 1) in the Japan Standard Tables for Food Composition 2015 (7th revised edition), which are also widely used in everyday aspects of life in the general household. These pulse species may be used either any one singly or in any combination of two or more.

When pulse is used for the composition of one or more embodiments of the present invention, it may be preferable to use mature pulse rather than immature pulse seeds (e.g., green peas, which are immature pea seeds, or edamame, which are immature soybean seeds), because the proportion of the intermediate molecular weight fraction (molecular weight log 6.5 to 8.0) of starch in the composition increases. For the same reason, it may be preferable to use pulse which is in a state where the dry mass basis moisture content is a predetermined value or less as they mature. Specifically, the dry mass basis moisture content in the pulse to be used for the composition of one or more embodiments of the present invention may preferably be typically less than 15 mass %, particularly less than 13 mass %, furthermore less than 11 mass %, or less than 10 mass %. On the other hand, the lower limit of the dry mass basis moisture content of the pulse may be, although not particularly limited to, typically 0.01 mass % or more.

When pulse is used for the composition of one or more embodiments of the present invention, the content of pulse in the composition of one or more embodiments of the present invention may preferably be, although not limited to, typically 50 mass % or more, particularly 55 mass % or more, furthermore 60 mass % or more, or 65 mass % or more, or 70 mass % or more, or 75 mass % or more, or 80 mass % or more, or 85 mass % or more, or 90 mass % or more, particularly 95 mass % or more, in terms of dry mass basis. The upper limit may be, although not particularly limited to, typically 100 mass % or less.

When pulse is used for the composition of one or more embodiments of the present invention, it may be preferable to use pulse in the form of powder. Specifically, it is preferred to use pulse powder which, when measured using a laser diffraction particle size analyzer after ultrasonication, has a particle diameter $d_{90}$ and/or $d_{50}$ which each satisfy a predetermined upper limit or less. Specifically, the particle diameter $d_{90}$ of the pulse powder after ultrasonication may preferably be less than 500 μm, more preferably 450 μm or less, particularly 400 μm or less, or 350 μm or less, or 300 μm or less, or 250 μm or less, or 200 μm or less, or 150 μm or less, or 100 μm or less, or 90 μm or less, or 80 μm or less, or 70 μm or less, or 60 μm or less, or 50 μm or less. Likewise, the particle diameter $d_{50}$ of the pulse powder after ultrasonication may preferably be less than 500 μm, more preferably 450 μm or less, particularly 400 μm or less, or 350 μm or less, or 300 μm or less, or 250 m or less, or 200 μm or less, or 150 μm or less, or 100 μm or less, or 90 μm or less, or 80 μm or less, or 70 μm or less, or 60 μm or less, or 50 μm or less. The lower limit of each of the particle diameters $d_{90}$ and $d_{50}$ after ultrasonication may be, although not particularly limited to, typically 0.3 μm or more, or 1 μm or more, or 5 μm or more, or 10 μm or more. Especially if the composition has a certain size or more during extrusion, the composition tends to pulsate during molding, which deteriorates productivity and may result in an uneven composition surface. Therefore, it may be preferable to use powdered pulse with a certain size or less.

*Other Food Ingredients:

The composition of one or more embodiments of the present invention may further contain any one or more food ingredients. Examples of such food ingredients include plant ingredients (vegetables, potatoes, mushrooms, fruits, algae, grains, seeds, etc.), animal ingredients (seafood, meat, eggs, milk, etc.), and microbial food products. The amount of these food ingredients can be set appropriately as long as they do not undermine the purpose of one or more embodiments of the present invention.

*Seasonings and Food Additives:

The composition of one or more embodiments of the present invention may contain any one or more seasonings, food additives, etc., or the contents of these seasonings may be limited as explained above. Examples of seasonings and food additives include: soy sauce, miso (Japanese fermented soybean paste), alcohols, sugars (e.g., glucose, sucrose, fructose, glucose-fructose liquid sugar, glucose-fructose liquid sugar, etc.), sugar alcohols (e.g., xylitol, erythritol, maltitol, etc.), artificial sweeteners (e.g., sucralose, aspartame, saccharin, acesulfame K, etc.), minerals (e.g., calcium, potassium, sodium, iron, zinc, magnesium, etc., and their salts), flavoring agents, pH adjusters (e.g., sodium hydroxide, potassium hydroxide, lactic acid, citric acid, tartaric acid, malic acid and acetic acid), cyclodextrins, antioxidants (e.g., vitamin E, vitamin C, tea extract, green coffee bean extract, chlorogenic acid, spice extract, caffeic acid, rosemary extract, vitamin C palmitate, rutin, quercetin, peach extract, sesame extract, etc.), emulsifiers (e.g., glycerin fatty acid esters, acetic acid monoglycerides, lactic acid monoglycerides, citric acid monoglycerides, diacetyl tartaric acid monoglycerides, succinic acid monoglycerides, polyglycerin fatty acid esters, polyglycerin condensed linosylate esters, chiraya extracts, soybean saponins, chia seed saponins, sucrose fatty acid esters, lecithin, etc.), colorants, thickening stabilizers, etc.

However, in view of the recent increase in nature consciousness, the composition of one or more embodiments of the present invention may preferably not contain any additives of any one category, more preferably any two categories, most preferably all three categories, of the so-called emulsifiers, colorants, and thickening stabilizer (e.g., those listed in the "Table of food additive substance names for labeling" section of the "Pocket Book of Food Additives Labeling (2011 edition)" as "colorants," "thickening stabilizers," and "emulsifiers").

In particular, the composition of one or more embodiments of the present invention may preferably not contain a gelling agent, since the composition can be given elasticity without any gelling agent while being prevented from having excessive elasticity. The composition of one or more embodiments of the present invention may preferably not contain an emulsifier, from the viewpoint of making the natural tastes of the ingredients easily perceptible. In addition, the composition of one or more embodiments of the present invention may preferably not contain any food additives (e.g., e.g., those listed in the "Table of food additive substance names for labeling" section of the "Pocket Book of Food Additives Labeling (2011 edition) used for food additive applications). From the perspective of making it easier to perceive the sweetness of the food itself, the composition of one or more embodiments of the present invention may preferably not contain added sugars (especially purified sugars such as glucose, sucrose, fructose, glucose fructose liquid sugar, fructose dextrose liquid sugar, etc.).

The composition of one or more embodiments of the present invention may also preferably be characterized by having little or no sodium chloride content. Conventional starch-containing compositions for heat cooking (especially those containing gluten having network structure) were provided with elasticity via addition of sodium chloride, which affects the taste and leads to excessive salt intake. This is especially pronounced in dry compositions (dried udon, dried hiyamugi, etc.), where sodium chloride is usually used at a level of 3% by mass or higher to maintain compositional elasticity. On the other hand, the composition of one or more embodiments of the present invention is advantageous since even if little or no amount of sodium chloride is added, it can maintain a good quality without losing its elasticity. It is also desirable to apply one or more embodiments of the present invention to solid paste compositions for heat cooking such as pasta, udon, bread, etc., which are usually provided with adhesion and elasticity via addition of gluten and sodium chloride, since they can be made into compositions of good quality without the addition of sodium chloride. Specifically, the sodium chloride content in the composition of one or more embodiments of the present invention on a dry mass basis may typically be 3% by mass or lower, preferably 2% by mass or lower, more preferably 1% by mass or lower, even more preferably 0.7% by mass or lower, particularly preferably 0.5% by mass or lower. The lower limit of the sodium chloride content in the composition of one or more embodiments of the present invention is not particularly limited, and may be 0% by mass. The sodium chloride content in a starch-containing composition is calculated by a method, e.g., in accordance with the "Salt equivalent" section of the Japan Standard Tables for Food Composition 2015 (7th revised edition), by measuring the amount of salt using the atomic absorption method and multiplying the measured value by 2.54.

*Smooth Tissue Part in the Frozen Section of the Composition:

According to one or more embodiments of the present invention, the composition of one or more embodiments of the present invention may preferably be characterized in that when the frozen sections obtained by freezing and sectioning in the procedure described above are observed, it has a smooth tissue part with an average thickness of a predetermined value or more, along a predetermined percentage or more of the periphery of the composition on the cut surface. This physical property is desirable since the composition of one or more embodiments of the present invention satisfying this feature tends to prevent its components from leaking out during heat cooking. Although the reason for this is not clear, it is estimated that when there is a structure along the periphery of the composition that can be cut relatively smoothly compared to the interior of the composition, this structure is observed as a smooth tissue part when the composition is cryosectioned.

The "smooth tissue part" herein refers to a layer structure with an average thickness of a predetermined value or more, observed along the periphery of the frozen composition section image, and having a lighter color and less uneven appearance than the non-smooth portion. The "average thickness" of the smooth tissue part herein refers to the average value of the width of the smooth tissue part in the direction perpendicular to the periphery of the composition on the cut surface, when measured along the periphery of the composition.

Specifically, the smooth tissue part may preferably be formed along 30% or more, or 40% or more, or 50% or more, particularly 60% or more, more particularly 70% or more, still particularly 80% or more, or 90% or more, especially 100% (i.e., along the entire periphery of the composition on the cut plane) of the periphery of the composition on the cut plane. The smooth tissue part may also have an average thickness of typically 18 m or more, or 20 μm or more, particularly 25 μm or more, more particularly 30 μm or more.

The smooth tissue part can be measured by preparing a frozen section of the composition frozen at −25° C. (without treatment in hot water) by cutting a 30 μm thick section along a specific cut plane and observing it. The preparation and observation of such composition frozen sections is not restricted, but the following procedure is preferred, for example. The frozen composition is cut into a section with a thickness of 30 μm according to Kawamoto method described in "Use of a new adhesive film for the preparation of multi-purpose fresh-frozen sections from hard tissues, whole-animals, insects and plants", Arch. Histol. Cytol., (2003), 66[2]:123-43. The thus-obtained frozen section of the composition is stained with, e.g., CBB solution (Coomassie Brilliant Blue R250: 0.1 mass %1; methanol: 40 mass %; acetic acid: 10 mass %). The thus-obtained frozen section is then placed under the field of view of a microscope with a magnification of 200×, for example, and a color photograph with pixel counts of 1360×1024 is taken for analysis.

*Non-Swollen Composition:

The composition of one or more embodiments of the present invention may preferably be a non-swollen food product rather than a swollen food product (particularly a swollen food product having a density specific gravity of less than 1.0 due to swelling). In the production of the compositions of one or more embodiments of the present invention, the compositions can be obtained by, after kneading the dough composition at high temperature and pressure, lowering the temperature while preventing swelling, usually with pressure applied, and then reducing the pressure to about atmospheric pressure, whereby a non-swollen composition according to one or more embodiments of the present invention can be obtained.

[III: Method for Producing Starch-Containing Composition for Heat Cooking]

(1) Summary:

The production method of one or more embodiments of the present invention is a method for producing the composition of one or more embodiments of the present invention explained above, using the extruder of one or more embodiments of the present invention explained above.

The method for producing the composition of one or more embodiments of the present invention not particularly limited and may be any method as long as a composition satisfying the various requirements mentioned above can be obtained. Specifically, a food ingredient as a raw material for the composition of one or more embodiments of the present invention, e.g., pulse, may be mixed with other food ingredient, seasoning, and other ingredients optionally used. Processing such as heating and molding may be added if necessary. Among others, the composition of one or more embodiments of the present invention may be produced efficiently by means of a specific method including preparing a dough composition by mixing the ingredients mentioned above so as to meet the requirements described above, kneading the dough composition under the specific high temperature and pressurized conditions, and allowing the kneaded composition to cool down so as not to swell (hereinafter also referred to as "the production method of one or more embodiments of the present invention").

Specifically, the production method of one or more embodiments of the present invention comprising the steps of:

(i) preparing a composition with an insoluble dietary fiber content of 3.0 mass % or more in terms of wet mass basis, a starch content of 10.0 mass % or more in terms of wet mass basis, a protein content of 3.0 mass % or more in terms of wet mass basis, and a dry mass basis moisture content of more than 25 mass %;

(ii) heating the composition prepared at step (i) along a course from the first flight section to the kneading section so as to reach a temperature of 100° C. or more but 200° C. or less at the kneading section under pressurized conditions, while kneading the composition with an SME value of 350 kJ/kg or more;

(iii) depressurizing the composition kneaded at step (ii), from the pressurized state at the kneading section to atmospheric pressure or less at the vent section; and (iv) lowering the degree of gelatinization in the composition kneaded at step (ii) by 6 mass % or more at the kneading section and onward.

The production method of one or more embodiments of the present invention will be explained in detail below.

(2) Step (i): Preparation of Dough Composition

In this step (i), a food ingredient as a raw material for the composition of one or more embodiments of the present invention, e.g., pulse, may be mixed with other food ingredient, seasoning, and other ingredients optionally used to prepare a composition which is a basis for the composition of one or more embodiments of the present invention (hereinafter also referred to as the "dough composition"). The dough composition (also simply referred to as the "dough" or the "paste dough composition") may be in any form as long as the food ingredients are partly or wholly integrated with water, and it may be in liquid, sol, gel or solid form. For example, it may be in a plasticized form, such as bread dough, or it may be in a non-plasticized form, such as a minced form. The method for preparing the dough composition is not particularly restricted but may be a method in which a food ingredient as a raw material for the composition of one or more embodiments of the present invention (preferably at least one or more pulse, optionally in combination with one or more other edible plants) is simply mixed with other food ingredient, seasoning, and other ingredients optionally used to prepare the dough composition. Preparation of the dough composition at step (i) may be carried out either by a method involving adding water to the raw materials before being fed into the extruder (i.e., one or more embodiments in which the dough composition at step (i) is prepared before being fed into the feeder) or by a method involving adding water to the raw materials already in the extruder (i.e., one or more embodiments in which the raw materials (e.g. pulses) are fed into the feeder with a moisture content of 25 mass % or less in terms of dry mass basis (e.g., in powder form), and the dough composition at step (i) is prepared by adding water to the raw materials being conveyed by the first flight section), or by a method combining these one or more embodiments. In addition, in one or more embodiments where the kneading is carried out using an extruder as will be explained below, and the dough composition at step (i) is prepared by adding water to the raw materials being conveyed in the extruder, it may be preferred that the raw materials in the extruder are not exposed to a high temperature of 90° C. or higher (or 95° C., or 100° C.) with a dry mass basis moisture content of less than 25 mass % (or less than 30 mass %, or less than 35 mass %, or less than 40 mass %), since this may render starch more resistant to thermal decomposition.

*Ingredients of the Dough Composition:

The dough composition may preferably be prepared so as to satisfy the various ingredient requirements explained below.

The starch content in the dough composition in terms of wet mass basis may preferably be typically 10.0 mass % or more, particularly 15 mass % or more, more particularly 20 mass % or more, especially 25 mass % or more, or 30 mass % or more, or 35 mass % or more, or 40 mass % or more, or 45 mass % or more, especially 50 mass % or more. The upper limit is not particularly restricted, but may be typically 80 mass % or less, or 75 mass % or less, or 70 mass % or less.

The dry mass basis moisture content in the dough composition may preferably be typically more than 25 mass %, particularly more than 30 mass %, particularly more than 35 mass %, especially more than 40 mass %, or more than 45 mass %, or more than 50 mass %, or more than 55 mass %, or more than 60 mass %, or more than 65 mass %, or more than 70 mass %, or more than 75 mass %, especially more than 80 mass % may preferably be. The upper limit is not particularly restricted, but may preferably be 200 mass % or less, or 175 mass % or less, or 150 mass % or less.

The wet mass basis content of insoluble dietary fiber in the dough composition may preferably be typically 3.0 mass % or more, especially 4.0 mass % or more, or 5.0 mass % or more, or 6.0 mass % or more, or 7.0 mass % or more, or 8.0 mass % or more, or 9.0 mass % or more, especially 10 mass % or more. The upper limit is not particularly restricted, but may be typically 40 mass % or less, or 30 mass % or less.

The wet mass basis content of protein in the dough composition may preferably be typically 3.0 mass % or more, particularly 4.0 mass % or more, more particularly 5.0 mass % or more, especially 6.0 mass % or more, or 7.0 mass % or more, or 8.0 mass % or more, or 9.0 mass % or more, or 10 mass % or more, or 11 mass % or more, or 12 mass % or more, or 13 mass % or more, or 14 mass % or more, or 15 mass % or more, or 16 mass % or more, or 17 mass % or more, or 18 mass % or more. The upper limit is not particularly restricted, but may be typically 40 mass % or less, or 30 mass % or less.

The contents of insoluble dietary fiber, starch, and protein in the dough composition herein each refer to the wet mass basis ratio calculated with the mass of the whole dough composition containing water as a denominator and the content of each ingredient as a numerator, and may be adjusted so as to satisfy their respective predetermined ranges by adjusting the ingredients contained in the edible plant (e.g., pulse) to be used as a raw material as appropriate.

When edible plant (e.g., pulse) is used as a raw material for the dough composition, the wet mass basis ratio of such edible plant (e.g., pulse) may preferably be 30 mass % or more, particularly 40 mass % or more, more particularly 50 mass % or more, especially 60 mass % or more, or 70 mass % or more, or 80 mass % or more, or 90 mass % or more, or 100 mass %. The upper limit is not particularly restricted but may be typically 100 mass % or less.

When edible plant (e.g., pulse) is used as a raw material for the dough composition, the ratio of the starch content and/or the protein content derived from edible plant (e.g., pulse, especially heat-treated pulse explained below) to the total starch content and/or the total protein content in the dough composition may preferably be a predetermined value or more. Specifically, the ratio of the starch content derived from edible plant (e.g., pulse, especially heat-treated pulse explained below) to the total starch content in the dough composition may preferably be 30 mass % or more, particularly 40 mass % or more, more particularly 50 mass % or more, especially 60 mass % or more, or 70 mass % or more, or 80 mass % or more, or 90 mass % or more, or 100 mass %. The upper limit is not particularly restricted but may be typically 100 mass % or less. Likewise, the ratio of the protein content derived from edible plant (e.g., pulse, especially heat-treated pulse explained below) to the total protein content in the dough composition may preferably be 10 mass % or more, particularly 20 mass % or more, more particularly 30 mass % or more, especially 40 mass % or more, or 50 mass % or more, or 60 mass % or more, or 70 mass % or more, or 80 mass % or more, or 90 mass % or more, especially 100 mass %. The pulse-derived protein may preferably be pea-derived protein, most preferably protein derived from yellow pea.

*Degree of Gelatinization of Starch:

It is preferred to use gelatinized starch as a raw material of the dough composition, since this facilitates the gelatinization step (i.e., step (ii) explained below). Specifically, the degree of gelatinization of the starch contained in the composition before the gelatinization step (i.e., at step (i)) may preferably be a predetermined value or more. Specifically, the upper limit may preferably be 10 mass % or more, particularly 20 mass % or more, more particularly 30 mass % or more, or 30 mass % or more, or 40 mass % or more, or 50 mass % or more, or 60 mass % or more, or 70 mass % or more, or 80 mass % or more, or 90 mass % or more. The upper limit is not particularly restricted but may be typically 100 mass % or less.

For the same reason, the starch contained in the composition before the gelatinization step (i.e., at step (i)) may preferably be starch heated at a predetermined temperature or higher in advance. Specifically, the heat temperature may preferably be 80° C. or higher, particularly 90° C. or higher, more particularly 100° C. or higher, or 110° C. or higher, or 120° C. or higher. The upper limit is not particularly restricted, but may be typically 200° C. or lower, more particularly 180° C. or lower. In addition, since starch heated at a high temperature with a dry mass basis moisture content of less than a predetermined value may have a low processability due to thermal decomposition, the starch contained in the composition before the gelatinization step (i.e., at step (i)) may preferably be starch heated with a dry mass basis moisture content of a predetermined value or higher. Specifically, it may be preferable to use heat-treated starch which have been heated with a dry mass basis moisture content of more than 25 mass %, particularly more than 30 mass %, more particularly more than 35 mass %, especially more than 40 mass %, or more than 45 mass %, or more than 50 mass %, or more than 55 mass %, or more than 60 mass %, or more than 65 mass %, or more than 70 mass %, or more than 75 mass %, especially more than 80 mass %, at a predetermined temperature or higher (specifically, for example 80° C. or higher, particularly 90° C. or higher, more particularly 100° C. or higher, or 110° C. or higher, or 120° C. or higher, while the upper limit is not particularly restricted, but may be for example 200° C. or lower, more particularly 180° C. or lower). The upper limit of the dry mass basis moisture content during the teat treatment is not particularly restricted, but may be typically 200 mass % or less, or 175 mass % or less or 150 mass % or less.

*Starch Degrading Enzyme Activity in Raw Materials:

In order to provide the composition of one or more embodiments of the present invention with a starch degrading enzyme activity of a predetermined value or lower, it may be preferable to use, as a raw material for the dough composition at this step (i), starch or starch-containing edible plant (e.g., pulse) which has been processed so as to adjust the starch degrading enzyme activity to less than a predetermined value. Specifically, such raw materials may preferably be used such that the starch degrading enzyme activity in the dough composition containing starch or starch-containing edible plant (e.g., pulse) in terms of dry mass basis is 100 U/g or less, particularly 60.0 U/g or less, or 50.0 U/g or less, or 40.0 U/g or less, or 30.0 U/g or less. On the other hand, the lower limit may be, although not particularly limited to, typically 0.0 U/g or more, or 5.0 U/g or more, or 10.0 U/g or more, or 20.0 U/g or more, or 30.0 U/g or more, or 35.0 U/g or more. Since starch degrading enzymes contained in edible plants (e.g., pulse) are extremely heat-resistant in general, in order to obtain an edible plant with a low starch degrading enzyme activity, it may be preferable to use a processing method in which heat treatment is carried out at a predetermined temperature or higher with a dry mass basis moisture content of 50 mass % or more. Specifically, it may preferably be 100° C. or higher, particularly 110° C. or higher, especially 120° C. or higher. On the other hand, the upper limit of the temperature may be, although not particularly limited to, typically less than 200° C. The duration of heating may be set as appropriate as long as the starch degrading enzyme activity is adjusted at a predetermined value but may be typically 0.1 minute or more.

According to one or more embodiments of the present invention, the starch degrading enzyme activity (U/g) may preferably decrease before and after step (ii) by 20% or more (i.e., the decreasing ratio defined as "{(in the composition before step (ii) starch degrading enzyme activity (U/g))–(the starch degrading enzyme activity in the composition after step (ii) (U/g))}/(the starch degrading enzyme activity in the composition before step (ii) (U/g))" corresponds to a predetermined value or higher), since this may serve to promote the effects of one or more embodiments of the present invention. The ratio may preferably be particularly 25% or more, more particularly 30% or more, especially 35% or more, or 40% or more, or 45% or more, or 50% or more, or 55% or more, or 60% or more, especially 65% or more. The decreasing ratio corresponding to a predetermined value or higher encompasses special cases where the starch degrading enzyme activity (U/g) in the composition before step (ii) is 0.0 U/g and the ratio therefore diverges to infinity. When the starch degrading enzyme activity (U/g) in the composition before step (ii) is more than 0.0, the upper limit of the ratio is not particularly limited, and may be for example typically 100% or less, or 95% or less.

*PDI of Raw Materials:

In order to provide the composition of one or more embodiments of the present invention with a PDI value of less than a predetermined value, it may be preferable to use, as a raw material for the dough composition at this step (i), protein or protein-containing edible plant (e.g., pulse) which has been processed so as to adjust the PDI value to less than a predetermined value. Specifically, the PDI value of protein or protein-containing edible plant (e.g., pulse) to be used as a raw material of the dough composition may preferably be less than 90 mass %, particularly less than 85 mass %, more particularly less than 80 mass %, especially less than 75 mass %, or less than 70 mass %, or less than 65 mass %, or less than 60 mass %, or less than 55 mass %, or less than 50 mass %, or less than 45 mass %, or less than 40 mass %, or less than 35 mass %, or less than 30 mass %, or less than 25 mass %, or less than 20 mass %, or less than 15 mass %, especially less than 10 mass %. On the other hand, the lower limit of the ratio may be, although not particularly limited to, typically 0 mass % or more, more particularly 2 mass % or more, particularly 4 mass % or more.

The protein dispersibility index (PDI) value herein refers to an index of protein solubility and can be obtained as the percentage of the soluble nitrogen content to the total nitrogen content in the composition {(soluble nitrogen content in the composition)/(total nitrogen content in the composition)×100(%)} according to the standard method. Specifically, a sample to be measured is mixed with 20 times the volume of water and then crushed (using a Microtech Nichion NS-310E3 homogenizer at 8500 rpm for 10 minutes), and the total nitrogen content of the resulting crushed liquid is multiplied by 20 to determine the total nitrogen content of the entire composition. The crushing solution is then centrifuged (3000G for 10 minutes), and the total nitrogen content of the supernatant obtained is then multiplied by 20 to determine the water soluble nitrogen content, whereby the PDI value in the composition can be determined. The total nitrogen content is measured using the combustion method (improved Dumas method) specified in the Food Labeling Law ("About Food Labeling Standards" (Mar. 30, 2015, Shokuhin Table No. 139)).

In addition, the composition may more preferably be characterized in that the ratio of the protein content contained in edible plant (e.g., pulse) to the total protein content in the composition is a predetermined value or higher while the PDI value is a predetermined value or lower, since the food texture improvement effect of the composition may be even more pronounced. As a processing method for obtaining a protein with a low PDI value in the state of being contained in edible plant (e.g., pulse), it may be preferable to carry out heat treatment in a circumstance with a dry mass basis moisture content of 30 mass % or more at a predetermined temperature or higher, e.g., preferably 80° C. or higher, particularly 90° C. or higher, more particularly 100° C. or higher, especially 110° C. or higher. The upper limit of the temperature may be, although not particularly limited to, typically less than 200° C. The duration of heating may be set as appropriate as long as the PDI value is adjusted at a predetermined value but may be typically 0.1 minute or more.

*Particle Diameter of Insoluble Dietary Fiber in Raw Materials:

When edible plant (e.g., pulse) is used as a raw material for the dough composition, since the kneading treatment does not significantly change the shape of insoluble dietary fiber, the insoluble dietary fiber derived from such edible plant (e.g., pulse) may preferably have a predetermined size. It is highly likely that the insoluble fiber size in randomly crushed pulse powder is more than 450 $\mu m$ (because the insoluble fiber in pulse is usually rod-shaped, and the laser diffraction particle size distribution measurement according to one or more embodiments of the invention tends to yield larger values). Therefore, the insoluble dietary fiber contained in food ingredients to be used in one or more embodiments of the present invention (especially food ingredients containing hard tissues, such as pulse with seed coat) may preferably have undergone specific crushing treatment in advance so as to adjust its size to within a specific range. Specifically, as explained above for the insoluble dietary fiber in composition, the particle size of the insoluble dietary fiber in edible plant (e.g., pulse) is evaluated by a method including treating the aqueous suspension of the edible plant (e.g., pulse) with protease and amylase, and subjecting the composition after the starch- and protein-degradation treatment, in which starch and protein are degraded by enzymes, to the ultrasonication, and then to the measurement using a laser diffraction particle size analyzer to determine the particle size distribution. Specifically, 6 mass % aqueous suspension of the edible plant (e.g., pulse) is treated with 0.4 volume % of protease and 0.02 mass % of α-amylase at 20° C. for 3 days (also referred to as "[Procedure b]") to carry out the starch- and protein-digestion treatment, and the enzyme-treated composition is subjected to the measurement for the particle diameter distribution ($d_{90}$ and/or $d_{50}$) after ultrasonication. Such treatment degrades starch and protein among the constituents of the edible plant, so that the particle size distribution of the resulting degraded product is considered to reflect the particle size distribution of the structure composed mainly of insoluble dietary fiber.

Specifically, the particle diameter $d_{90}$ of the insoluble dietary fiber in the edible plant (e.g., pulse) obtained via the procedure mentioned above may preferably be 450 $\mu m$ or less, more preferably, 400 $\mu m$ or less, more preferably 350 $\mu m$ or less, more preferably 300 $\mu m$ or less, more preferably 250 $\mu m$ or less, more preferably 200 $\mu m$ or less, more preferably 150 $\mu m$ or less, more preferably 100 $\mu m$ or less, more preferably 80 $\mu m$ or less, more preferably 60 $\mu m$ or less, more preferably 50 $\mu m$ or less. Likewise, the particle diameter $d_{50}$ of the insoluble dietary fiber in the edible plant (e.g., pulse) obtained via the procedure mentioned above may preferably be 450 $\mu m$ or less, more preferably 400 $\mu m$ or less, more preferably 350 $\mu m$ or less, more preferably 300 $\mu m$ or less, more preferably 250 $\mu m$ or less, more preferably 200 $\mu m$ or less, more preferably 150 $\mu m$ or less, more preferably 100 $\mu m$ or less, more preferably 80 $\mu m$ or less, more preferably 60 $\mu m$ or less, more preferably 50 $\mu m$ or less. If the particle diameter $d_{90}$ and/or $d_{50}$ of the insoluble dietary fiber in the edible plant exceeds these upper limits, the effects of one or more embodiments of the present invention may not be easily obtained. The reason for this is not clear, but it is estimated that large and coarse insoluble dietary fibers inhibit the formation of matrix structure from starch, etc., making it difficult for the effects of one or more embodiments of the invention to be achieved. On the other hand, the lower limit of the particle diameter $d_{90}$ and/or the particle diameter $d_{50}$ of insoluble dietary fiber contained in edible plant may preferably be, although not particularly limited to, typically 1 $\mu m$ or more, more preferably 3 $\mu m$ or more.

*CFW-Stained Sites in Raw Materials:

When edible plant (e.g., pulse) is used as a raw material for the dough composition, since the kneading treatment does not significantly change the shape of insoluble dietary fiber, the insoluble dietary fiber contained in the edible plant (e.g., pulse) may preferably have predetermined shapes. Specifically, as explained above for the insoluble dietary fiber in composition, when water suspension of edible plant (e.g., pulse) is treated with protease and amylase to enzymatically digest starch and protein to prepare a starch- and protein-digested product (specifically, a processed product from the starch- and protein-digestion treatment of [Procedure b]), and the product is stained with CFW (Calcofluor White) and then observed under fluorescence microscope, the average of the longest diameters and/or the average of the aspect ratios of CFW-stained sites each may preferably satisfy a predetermined value or lower. The thus-obtained CFW-stained sites are deemed to have structures composed mainly of insoluble dietary fiber. Specifically, the arithmetic average of the longest diameters of CFW-stained sites in edible plant (e.g., pulse) measured in accordance with the procedure explained above may preferably be typically 450 $\mu m$ or less, particularly 400 $\mu m$ or less, or 350 $\mu m$ or less, or 300 $\mu m$ or less, or 250 $\mu m$ or less, or 200 $\mu m$ or less, or 150 $\mu m$ or less, or 100 $\mu m$ or less, or 80 $\mu m$ or less, more particularly 60 $\mu m$ or less, especially 50 $\mu m$ or less. If the average of the longest diameters of CFW-stained sites exceeds these limits, the effects of one or more embodiments of the present invention may be less likely to be achieved. The reason for this is not clear, but it is estimated that insoluble dietary fibers with large diameters inhibit the formation of matrix structure from starch, etc., making it difficult for the effects of one or more embodiments of the invention to be achieved. On the other hand, the lower limit of the arithmetic average of the longest diameters of CFW-stained sites may preferably be, although not particularly limited to, typically 2 $\mu m$ or more, more preferably 3 $\mu m$ or more.

Since the kneading treatment at step (ii) does not significantly change the shape of insoluble dietary fiber, it may be preferable to use an edible plant (e.g., pulse) in powder form which has been processed such that the insoluble dietary fiber contained therein has an aspect ratio of a predetermined value or lower. It is highly likely that the insoluble fiber size in randomly crushed pulse powder is more than 450 $\mu m$ (because the insoluble fiber in pulse is usually rod-shaped, and the laser diffraction particle size distribution measurement according to one or more embodiments of the invention tends to yield larger values). In addition, if edible plant (e.g., pulse) powder is subjected to air sorting, it is likely that edible plant particles having specific shapes are removed, rendering the aspect ratios of CFW-stained sites in the resulting insoluble dietary fiber powder to be either too high or too low. Therefore, it may be preferable to use an edible plant (e.g., pulse) powder that has been subjected to certain crushing treatment to adjust the arithmetic average of the aspect ratios of CFW-stained sites, which are composed mainly of insoluble dietary fiber, to within a predetermined range. Specifically, the arithmetic average of the aspect ratios of CFW-stained sites in edible plant (e.g., pulse) measured in accordance with the procedure explained above may preferably be typically 5.0 or less, particularly 4.5 or less, or 4.0 or less, or 3.5 or less, or 3.0 or less, or 2.5 or less, especially 2.0 or less. If the average of the aspect ratios of CFW-stained sites exceeds these limits, the effects of one or more embodiments of the present invention may be less likely to be achieved. The reason for this is not clear, but it is estimated that insoluble dietary fibers with large aspect ratios inhibit the formation of matrix structure from starch, etc., making it difficult for the effects of one or more, embodiments of the invention to be achieved. On the other hand, the lower limit of the arithmetic average of the aspect ratios of CFW-stained sites may preferably be, although not particularly limited to, typically 1.1 or more, more preferably 1.3 or more.

The specific conditions and procedures for measuring various parameters related to insoluble dietary fiber in edible plant (e.g., pulse) used as a raw material for the dough composition, i.e., amylase and protease treatment, ultrasonication, particle size distribution (particle size $d_{90}$ and $d_{50}$) measurement, CFW staining and fluorescence microscopy, can be determined in accordance with the aforementioned methods for measuring various parameters related to insoluble dietary fiber in a composition explained above.

*Pulverization and Powdering of Raw Materials:

When edible plant (e.g., pulse) is used as a raw material for the dough composition in one or more embodiments of the present invention, the edible plant may preferably have undergone pulverization and powdering process. The means and conditions for the pulverization and powdering process are not particularly limited. Specifically, the temperature during the pulverization and powdering process is not particularly limited, but it may preferably be dried at a temperature of 200° C. or lower, for example, since if the powder is exposed to too high temperatures, the elasticity of the composition of one or more embodiments of the present invention tends to decrease. However, when pulse is used as the edible plant and heated before subjected to pulverization and powdering for use, the temperature is not particularly limited since the heat load is reduced. The pressure during the pulverization and powdering process is not limited, and may be chosen from high pressures, normal pressures, and low pressures. Examples of devices for the pulverization process include, but are not limited to, blenders, mixers, mills, kneaders, crushers, disintegrators, and grinders. Specific examples that can be used include, for example, media stirring mills such as dry bead mills ball mills (rolling, vibrating, etc.), jet mills, high-speed rotating impact mills (pin mills, etc.), roll mills, hammer mills, etc.

*Heating and Water Addition Treatment of Raw Materials:

When edible plant (e.g., pulse) containing starch is used as a raw material for the dough composition in one or more embodiments of the present invention, it is preferred to use edible plant that has been heated under water-containing conditions as a pre-treatment. It is particularly desirable to use edible plant that has been heated in an environment where the dry mass basis moisture content is adjusted to a predetermined value or higher (wet heating), since this may facilitate the formation of structures in the resulting paste composition for food cooking.

Specifically, the dry mass basis moisture content of edible plant upon heating may preferably be, although not limited to, typically 25 mass % or more, particularly 30 mass % or more, or 40 mass % or more, especially 50 mass % or more. The upper limit of the dry mass basis moisture content is not particularly restricted, but may be typically 200 mass % or less, particularly 175 mass % or less. The heating temperature of edible plant may preferably be, although not limited to, typically 80° C. or higher, particularly 90° C. or higher, more particularly 100° C. or higher, and typically 200° C. or lower, particularly 190° C. or lower.

According to one or more embodiments of the present invention, it is more preferable to use both an edible plant containing starch and an edible plant containing protein, more preferably an edible plant containing both starch and protein, and after pre-heating them with water, and subject the edible plant(s) to pre-heating under water addition conditions before use. Heating of edible plant with water can be achieved by, e.g., steam heating.

On the other hand, when starch-containing edible plant (e.g., pulse) that has been powdered (e.g., to have a $d_{90}$ and/or $d_{50}$<1000 μm) is subjected to pre-heating treatment before use, it may not be preferable to use edible plant heated (e.g., at 90° C. or higher) in a dry environment with a dry mass basis moisture content of less than 25 mass %, since localized heating of the starch may result in overheating, which may accelerate the thermal degradation of the amylopectin in its structure and gives the composition a sticky quality.

*Particle Diameter of the Dough Composition

The particle size of the dough composition as a whole may preferably be similar in size to the edible plant (e.g., pulse) powder mentioned above as a preferably used raw material: Specifically, when measuring the particle size of the entire dough composition, a 1 cm square lump of a composition sample is immersed in 50 mL of a solvent for particle size distribution measurement (e.g. ethanol) at 80° C., allowed to stand for about 5 minutes, then stirred well while crushing with a spatula, suspended in liquid, and sieved with a 8-mesh sieve having an aperture size of 2.36 mm and a line diameter (Wire Dia.) of 1.0 mm to thereby prepare a solution for measurement (also referred to as the suspension). This solution is subjected to ultrasonication and then to particle diameter measurement using a laser diffraction particle size distribution analyzer. The particle diameter $d_{90}$ after ultrasonication may preferably be typically 500 μm or less, particularly 450 μm or less, or 400 μm or less, or 350 μm or less, or 300 μm or less, or 250 μm or less, or 200 μm or less, or 150 μm or less, or 100 μm or less, or 90 μm or less, or 80 μm or less, or 70 μm or less, or 60 μm or less, or 50 μm or less. The particle diameter $d_{50}$ after ultrasonication may preferably be typically 500 μm or less, particularly 450 μm or less, or 400 μm or less, or 350 μm or less, or 300 μm or less, or 250 μm or less, or 200 μm or less, or 150 μm or less, or 100 μm or less, or 90 μm or less, or 80 μm or less, or 70 μm or less, or 60 μm or less, or 50 μm or less. The lower limit of each of $d_{90}$ and $d_{50}$ is not particularly restricted, but may be typically 0.3 μm or more, or 1 μm or more.

The term "mesh" used herein refers to a unit of mesh density for metallic wire meshes, sieves, filters, etc., and represents the number of mesh apertures per inch. For example, "8 mesh pass" means a fraction that passes through a sieve with an aperture size of 2.36 mm. Wire thickness values and aperture spacing values related to mesh-on parameters may be the values specified in U.S.A. Standard Testing Sieves ASTM Specifications E 11-04 (e.g., 8 mesh corresponds to "No. 8" as defined in "Alternative" of the Nominal Dimensions, Permissible Variation for Wire Cloth of Standard Testing Sieves (U.S.A.) Standard Series in this document) or equivalent values, unless otherwise specified.

(3) Step (ii): Kneading Treatment Under High Temperature Conditions

The dough composition obtained at step (i) is kneaded at a certain strength under pressurized, specific high-temperature conditions. This strong kneading under high temperature conditions allows the desired molecular weight distribution of starch explained above to develop properly, whereby the effect of one or more embodiments of the invention is achieved. In particular, kneading under predetermined high-temperature and high-pressure conditions is more desirable.

As for the specific conditions during kneading, the SME (specific mechanical energy) value calculated according to Equation I below may be equal to or higher than a predetermined value, since this may serve to break down the starch grains sufficiently to develop the properties of a matrix. Specifically, the SME value with which the kneading is carried out is typically 350 kJ/kg or more. It may preferably be typically 400 kJ/kg or more, particularly 450 kJ/kg or more, more particularly 500 kJ/kg or more, or 550 kJ/kg or more, or 600 kJ/kg or more, or 700 kJ/kg or more, especially 800 kJ/kg or more. When an extruder is used for the kneading, screw rotation speed may preferably be set at higher than 150 rpm, more preferably higher than 200 rpm, still more preferably higher than 250 rpm.

[Formula 2]

$$SME = \frac{\dfrac{N}{N_{max}} \times \dfrac{\tau - \tau_{empty}}{100}}{Q} \times P_{max} \times 3600 \qquad \text{Equation I}$$

N: Screw rotation speed during kneading (rpm)
$N_{max}$: Maximum screw speed (rpm)
$\tau$: Kneading torque/maximum torque (%)
$\tau_{empty}$: Idling torque/maximum torque (%)
Q: Total mass flow rate (kg/hr)
Pmax: Maximum power of the agitator (e.g. extruder) (kW)

In addition, the aforementioned kneading may more preferably be carried out at such a high temperature as 100° C. or higher, more preferably 110° C. or higher, more preferably 120° C. or higher, since the starch grain structure is more likely to be destroyed. When an extruder is used, the kneading at a high temperature with a high SME value as described above may preferably be carried out at 3% or more (more preferably 5% or more, still more preferably 8% or more, still more preferably 10% or more, still more preferably 15% or more, still more preferably 20% or more) of the total barrel length. Since the starch grain structures derived from pulse and seeds are more robust, the kneading at a high temperature with a high SME value as described above is more useful. The upper limit of the kneading temperature may preferably be 200° C. or less, more preferably 190° C.

or less, more preferably 180° C. or less, more preferably 170° C. or less. If the temperature at this step exceeds the above-mentioned upper limit, especially when an extruder is used for kneading, the temperature at the time of extrusion of the composition from the die section of the extruder may not be sufficiently low.

The above kneading is carried out under pressurized conditions relative to atmospheric pressure. Specifically, it is more desirable to carry out the kneading under conditions in which a higher pressure than usual is applied, as this will facilitate the development of the stained site structure according to one or more embodiments of the present invention. When an extruder is used, the pressure during the kneading can be measured by measuring the outlet pressure of the extruder. When kneading is carried out under pressurized conditions relative to atmospheric pressure, the lower limit of the pressure to be applied may typically be 0.01 MPa or higher, preferably 0.03 MPa or higher, more preferably 0.05 MPa or higher, more preferably 0.1 MPa or higher, more preferably 0.2 MPa or higher, more preferably 0.3 MPa or higher, 0.5 MPa or higher, more preferably 1.0 MPa or higher, more preferably 2.0 MPa or higher, more preferably 3.0 MPa or higher. The upper limit of the pressure is not particularly limited, but it may be 50 MPa or less. It is also preferable to install a flow retardation structure on the tip side of the extruder, near the end point of the kneading segment (preferably just after the end point of the kneading segment), as this can serve to increase the pressure in the kneading segment.

The kneading time can be determined appropriately based on various conditions such as the kneading temperature and pressure and the size of the kneading vessel. In particular, since the amount of heat applied to the composition varies greatly depending mainly on the characteristics of the apparatus used, it may be preferable to determine the processing time such that the physical properties of the composition before and after the processing are adjusted to within their respective desired ranges mentioned above. In general, however, the lower limit of the kneading time may preferably be typically 0.1 minute or more, particularly 0.2 minute or more, more particularly 0.3 minute or more, or 0.4 minutes or more, or 0.5 minutes or more, or 0.8 minute or more, or 1 minutes or more, especially 2 minutes or more. The upper limit of the kneading time is not particularly restricted, but may be typically 60 minutes or less, particularly 30 minutes or less, more particularly 15 minutes or less, from the viewpoint of efficiency.

It is a surprising finding completely unknown in the past that kneading a dough composition under such severe high-temperature and high-pressure conditions serves to form a complex structure of proteins, starches, insoluble dietary fibers, etc., and improve the texture of the compositions, whereby the outflow of insoluble and soluble ingredients of the composition may be suppressed.

The kneading treatment at step (ii) may preferably be carried out until the number of starch grain structures in the composition becomes a predetermined value or lower. Although the principle behind this is unknown, it is estimated that processing the composition under such high temperature, high-pressure, and strong kneading conditions with its starch grain structures being disrupted helps the starch spread in a matrix form throughout the composition, whereby amylopectin in the starch forms a structure that makes it easier for the resulting composition to express elasticity during water retention. Specifically, the kneading treatment of the composition may preferably be carried out until the resulting composition satisfies the requirement(s) (a) and/or (b) below, more preferably both the requirements (a) and (b).

(a) When 6% suspension of a crushed product of the composition is observed, the number of starch grain structures observed is 300/mm$^2$ or less.

(b) When 14 mass % aqueous slurry of a crushed product of the composition is subjected to measurement with a rapid visco-analyzer with elevating the temperature from 50° C. to 140° C. at a rate of 12.5° C./min, the peak temperature of gelatinization obtained is lower than 120° C.

With regard to the requirement (a), the number of starch grain structures observed under the conditions mentioned above for the composition after the kneading treatment at step (ii) may preferably be typically 300/mm$^2$ or less, particularly 250/mm$^2$ or less, more particularly 200/mm$^2$ or less, especially 150/mm$^2$ or less, or 100/mm$^2$ or less, or 50/mm$^2$ or less, or 30/mm$^2$ or less, or 10/mm$^2$ or less, especially 0/mm$^2$. The details of the starch grain structures are the same as those explained above for the composition of one or more embodiments of the present invention.

With regard to the requirement (b), the peak temperature of gelatinization measured under the conditions mentioned above for the composition after the kneading treatment at step (ii) may preferably be typically less than 120° C., particularly less than 115° C. The details of the peak temperature of gelatinization are the same as those explained above for the composition of one or more embodiments of the present invention.

The degree of gelatinization of starch in the composition after the kneading at step (ii) may preferably be a predetermined value or higher, from the viewpoint of preventing shape disintegration during heat cooking. Specifically, the degree of gelatinization of starch in the composition after the kneading at step (ii) may preferably be typically 30 mass % or more, particularly 40 mass % or more, particularly 50 mass % or more, especially 60 mass % or more, especially 70 mass % or more. The upper limit of the degree of gelatinization is not particularly restricted, but if it is too high, the starch may break down and the composition may become sticky and of undesirable quality. Accordingly, the upper limit of the degree of gelatinization may preferably be 99 mass % or less, particularly 95 mass % or less, more particularly 90 mass % or less.

(4) Step (iii): Depressurizing Treatment

This step is to depressurize the composition after being kneaded at step (ii) above from the pressurized state at the kneading section to atmospheric pressure or lower at the vent section. When the pressure is thus rapidly reduced by the vent section, the composition with decomposed starch grain structures is homogenized so as not to generate heat, whereby a starch matrix structure is formed. And rapid cooling immediately afterwards at the second flight section and/or the die section (in the case of extruders of the embodiment shown in FIG. 1) or die section/vent section (in the case of the embodiment shown in FIG. 3) makes it possible to locally age the starch near the composition surface. The vent section may have a structure that reduces the pressure inside the barrel to atmospheric pressure by being opened under atmospheric pressure. However, it may more preferably have a forced exhaust mechanism in said vent section, since it allows for the formation of a stronger matrix structure by removing air bubbles in the matrix structure while the composition is quickly cooled down. The mechanism that can be employed for forced venting is the same as described above.

It is not desirable to subject the composition that has been heated to high temperature at the kneading section to depressurization at the vent section without lowering the temperature, since this will cause the water in the composition to evaporate rapidly, causing the composition to swell and the starch matrix structure to disintegration. Therefore, after kneading the composition under high temperature conditions, it is preferable to lower the temperature of the composition before reducing the pressure at the vent section, to usually less than 110° C., especially less than 105° C., even less than 102° C. and especially less than 100° C. to prevent the composition from swelling. The lower limit is not particularly restricted, but may preferably be 10° C. or more, or 15° C. or more, or 20° C. or more, since the composition may harden if the composition temperature is too low. In the case of the embodiment shown in FIG. 3, where the vent section and the die section are integrated as a single unit (i.e., in the case of a structure where the die section is configured to serve as a vent section by opening the composition to atmospheric pressure), the composition temperature at the die section (i.e., at the vent section) may preferably be at a certain temperature or higher, since if the composition temperature at the die section is too low, then the composition may harden, thereby reducing productivity. Specifically, the lower limit of the temperature may preferably be typically 30° C. or more, particularly 35° C. or more, particularly 40° C. or more, especially 45° C. or more, or 50° C. or more. The upper limit is not particularly restricted, but may be lower than 95° C., or lower than 90° C.

The step of lowering the temperature may preferably be carried out under constant pressure conditions. In this case, the pressurization conditions during this temperature-lowering step are not particularly limited as long as swelling of the composition can be prevented, although they may preferably be the same as those during the kneading step. Specifically, the lower limit of the pressure to be applied during the temperature-lowering step (pressure to be further applied in addition to the atmospheric pressure) may preferably be typically 0.01 MPa or more, particularly 0.03 MPa or more, more particularly 0.05 MPa or more, or 0.1 MPa or more, or 0.2 MPa or more, especially 0.3 MPa or more. On the other hand, the upper limit of the pressure to be applied during the temperature-lowering step is not particularly restricted but may be 50 MPa or lower.

However, the embodiment shown in FIG. 3, where the vent section and the die section are integrated as a single unit (i.e., in the case of a structure where the die section is configured to serve as a vent section by opening the composition to atmospheric pressure), is preferred, since the pressure at the vent section can be relatively increased without the risk of causing the composition to leak at the vent section. Accordingly, it is possible to drop the pressure by a larger decrement at the vent section, and to thereby facilitate the disintegration of the starch grain structures. Specifically, the lower limit of the pressure to be applied during the temperature-lowering step (pressure to be further applied in addition to the atmospheric pressure) may preferably be typically 0.15 MPa or higher, more preferably 0.2 MPa or higher, more preferably 0.25 MPa or higher, more preferably 0.3 MPa or higher, more preferably 0.4 MPa or higher. On the other hand, the upper limit of the pressure is not restricted, but may be 50 MPa or lower.

The composition after step (iii) may be conveyed on a conveyor. In this case, the type of the conveyor is not restricted, but may preferably be a mesh-shaped conveyor having a ventilated (preferably ventilated and water/liquid permeable) loading surface in part or in whole. Employing such a mesh-shaped conveyor makes it easier to apply various treatments to the composition being conveyed, such as water retention treatment, moisture content adjustment treatment, drying treatment, etc., as described below. The details of these processes when a mesh-shaped conveyor is used are described below.

(5) Step (iv): Aging Treatment

It may also be preferable to carry out the step of decreasing the degree of gelatinization in the composition kneaded at step (ii) by a predetermined decrement or more at step (iii) or after step (iii), since this step may serve to locally age the starch near the surface of the composition, resulting in a composition with a stronger matte texture. In one or more embodiments, of the present invention, this step is also referred to as the step of "aging treatment."

Specifically, the decrease ratio of the degree of gelatinization in the composition before and after step (iv) with respect to the degree of gelatinization in the composition kneaded at step (ii) is typically 6 mass % or more (i.e., the aging treatment is to be carried out until the degree of gelatinization decreases by 6 mass % or more). The decrease ratio may preferably be 7 mass % or more, or 8 mass % or more, or 9 mass % or more, particularly 10 mass % or more. On the other hand, the upper limit of the decrease ratio of the degree of gelatinization in the composition before and after step (iv) is not particularly restricted but may preferably be typically 50 mass % or less.

The degree of gelatinization of starch in the composition after the degree of gelatinization is decreased at step (iv) may preferably be a predetermined value or lower, since this reflects that the starch near the surface of the composition has been locally aged, resulting in a composition with a stronger matte texture. Specifically, the degree of gelatinization of starch in the composition after the decrease at step (iv) may preferably be typically 90 mass % or less, particularly 85 mass % or less, particularly 80 mass % or less, or 75 mass % or less, or 70 mass % or less. The lower limit is also not particularly restricted, but may preferably be 10 mass % or more, particularly 20 mass % or more, particularly 30 mass % or more, especially 40 mass % or more, especially 50 mass % or more.

The means of achieving the aging at step (iv) is not particularly limited. For example, the aging at step (iv) can be achieved by carrying out the water retention treatment as will be described below, along with the treatment by the kneading section and the subsequent sections of the extruder, namely the vent section, the second flight section (in the case of the embodiment shown in FIG. 1 described above), and the die section, or as a post-treatment after the processing by the extruder is completed, to age the starch near the composition surface. Specifically, after the composition temperature is lowered to less than 90° C. (the lower limit of the temperature is not particularly restricted, but may preferably be typically more than 0° C., or more than 4° C.) after step (ii), the dry mass basis moisture content may preferably be maintained at 25 mass % or more for typically 0.1 hour or longer, particularly 0.2 hour or longer, particularly 0.3 hour or longer, or 0.4 hour or longer, or 0.5 hour or longer, or 0.6 hour or longer, or 0.7 hour or longer, or 0.8 hour or longer, or 0.9 hour or longer, especially 1.0 hour or longer. The upper limit of the duration is not particularly restricted but may be for example typically 20 hours or shorter, particularly 15 hours or shorter.

Step (iv) may be achieved by the treatment when the composition is in the extruder at step (iii) and the subsequent steps, or by the treatment after the composition is extruded from the extruder, or by the combination of the by the treatment in the extruder and the treatment after the extrusion from the extruder.

The composition temperature at step (iv) is not restricted, but may preferably be 90° C. or less, particularly 80° C. or less, particularly 70° C. or less, especially 60° C. or less. The lower limit is not particularly restricted, but may be more than 0° C., or more than 4° C. The pressure at step (iv) is not particularly restricted but may be normal pressure.

(6) Adjustment of the Moisture Content in the Composition

As an example of a means to accelerate the ageing described above, it may be preferable to add water to the composition at any of the steps (i) to (iii) above to adjust the dry mass basis moisture content in the dough composition to above a predetermined value. The addition of water to the composition may preferably be carried out at step (i) to adjust the dry mass basis moisture content in the dough composition to above a predetermined value. Specifically, the dry mass basis moisture content in the composition may preferably be typically more than 25 mass %, particularly more than 30 mass %, or more than 35 mass or more than 40 mass %, particularly more than 45 mass %, more particularly more than 50 mass %, especially more than 55 mass %, or more than 60 mass %, or more than 65 mass %, or more than 70 mass %, or more than 75 mass %, especially more than 80 mass %. The upper limit of the dry mass basis moisture content in the composition is not particularly restricted, but may be typically 200 mass % or less, or 175 mass % or less, or 150 mass % or less.

Specifically, moisture may preferably be added at step (i) or (ii). It may be more preferable to add water at step (i) until the dough composition has a dry mass basis moisture content of higher than a predetermined value (specifically more than 25 mass %, particularly more than 30 mass %, particularly more than 35 mass %, especially more than 40 mass %, or more than 45 mass %, or more than 50 mass %, or more than 55 mass %, or more than 60 mass %, or more than 65 mass %, or more than 70 mass %, or more than 75 mass %, especially more than 80 mass %, while the upper limit is not particularly restricted, but may be typically 200 mass % or less, or 175 mass % or less, or 150 mass % or less), and then add the reminder of the total moisture content to be incorporated in the composition after step (i), more specifically at step (ii) and/or at step (iii). Specifically, when preparing the dough composition at step (i), it may be preferable to add a predetermined ratio or more of the total moisture content to be incorporated in the composition.

More specifically, typically 50% or more, particularly 55% or more, more particularly 60% or more, or 75% or more, or 80% or more, or 85% or more, or 90% or more, especially 100% of the total moisture to be added during the production process may preferably be mixed with other raw materials. Water may be added either in the form of water or in the form of steam, but may preferably be added in the form of water. When an extruder is used, water may be added to raw materials before being fed into the extruder in advance. Alternatively, raw materials may be fed into the extruder before water is added to the raw materials in the extruder. When the raw materials are kneaded in the extruder, water may be fed via the feeder into the extruder to be mixed with the raw materials to prepare the composition at step (i) in the extruder, followed by step (ii) in succession. However, a predetermined ratio or higher (for example 60% or more, or 75% or more, or 80% or more, or 85% or more, or 90% or more, especially 100%) of the total moisture to be added during the production (especially the moisture to be added at step (i) and step (ii)) may preferably be added when the dough composition is prepared at step (i). Alternatively, water may be added to the raw materials to be fed via the feeder such that they have a dry mass basis moisture content of less than 40 mass %, and then a part (or all) of the total moisture to be added during the production process may be injected into the extruder by a water injection mechanism attached to the extruder barrel to prepare the dough composition at step (i) in the extruder, and step (ii) may be carried out in succession. However, adopting this one or more embodiments may tend to cause air bubbles in the resulting composition. Therefore, it may be preferable to carry out deaeration at any step before the die section, more preferably by a deaeration mechanism attached to the feeder and/or by a vent section attached to the extruder barrel, as will be explained below. In addition, when water is added by the water injection mechanism attached to the extruder barrel during the production process, the extruder may preferably be a biaxial extruder.

In addition, a predetermined ratio or higher of the total moisture to be added during the production process may preferably be mixed with other raw materials before the temperature inside the extruder reaches a predetermined value, since this may help prevent the starch from being decomposed due to overheating. Specifically, a predetermined ratio or higher of the total moisture may preferably be mixed with other raw materials before the temperature inside the extruder reaches typically 90° C. or higher, or 85° C. or higher, or 80° C. or higher. The ratio of the moisture to be mixed with other raw materials before the temperature inside the extruder reaches a predetermined value may preferably be typically 50 mass % or more, particularly 60 mass % or more, more particularly 70 mass % or more, or 80 mass % or more, or 90 mass % or more, especially 100 mass % of the total moisture to be added during the production process (especially of the total moisture to be added at step (i) and step (ii)). When a certain ratio of moisture is mixed with other raw materials, the raw materials may preferably be mixed with the ratio of moisture before being fed into the extruder. Specifically, 60 mass % or more of the total moisture to be added during the production process (especially of the total moisture to be added at step (i) and step (ii)) may preferably be mixed with other raw materials before the temperature inside the extruder reaches 80° C. or higher. In addition, 60 mass % or more of the total moisture to be added during the production process (especially of the total moisture to be added at step (i) and step (ii)) may preferably be mixed with other raw materials before the temperature inside the extruder increases from the external temperature by 20° C. or higher.

In general, simply for the purpose of gelatinizing starch, a dry mass basis moisture content of about 40 mass % or less in the dough composition is sufficient. Considering the subsequent drying step, it can be said that there is no motivation, but rather a disincentive, to add more water. Therefore, it is difficult to conceive of increasing the dry mass basis moisture content in the dough composition, unless having the idea of ageing the starch once it has been gelatinized as in step (iv) of one or more embodiments of the present invention. In addition, even if the dry mass basis moisture content in the dough composition is simply increased, it would still not be possible to adopt the configuration described above, i.e., to adjust the time required after the temperature of the composition decreases to below 80° C. after step (iii) until the dry mass basis moisture content in the composition to be below 25 mass % to a predetermined value or higher, unless having the idea of retaining moisture as in step (iv) of one or more embodiments of the present invention, which is the opposite of the idea of subsequently drying the moisture in the composition.

The specific means for adjusting the moisture content of the composition is not limited, but water addition during the preparation of the dough composition at step (i) above is preferred. The addition of moisture can be done either in the form of water or steam, but it is preferred to add the moisture in the form of water. Furthermore, when an extruder is used, it is preferable to mix a predetermined percentage or more of the moisture to be incorporated into the composition during its production with other ingredients before the interior of the extruder is heated by 20° C. or more, since this may prevent the starch from changing its properties due to overheating. Specifically, it is preferable to mix typically 50% or more, particularly 60% or more, particularly 70% or more, or 80% or more, or 90% or more, especially 100%, of the moisture to be incorporated into the composition during production, with other ingredients before the interior of the extruder is heated by 20° C. or more. When moisture is mixed with other raw materials, it is preferable to mix the aforementioned percentage of moisture beforehand before the raw materials are fed into the extruder:

It is also possible to employ a method to add moisture to the composition at step (iii) or any subsequent step (especially, when an extruder is used, to the composition after extrusion) to increase the time for the composition to reach a dry mass basis moisture content of 25 mass % to a predetermined time or longer. In this method, the moisture may be added either in the form of water or in the form of steam, but may preferably be added in the form of water. It is more preferable to add water by spraying it in the form of mist, since this can serve to reduce the amount of water used in the production process while producing a composition of good quality. Alternatively, it is also possible to employ a method to put the composition directly into water and cause the composition to absorb water.

In addition, it may be preferable to employ a method to volatilize moisture as soon as it is added to the composition at step (iii) or any subsequent step (especially, when an extruder is used, to the composition after extrusion), since the composition temperature drops quickly due to the heat of vaporization. Specifically, the treatment may preferably be carried out with adjusting the dry mass basis moisture content in the composition after volatilization so that it does not fall below 25 mass %. More specifically, as mentioned above for example, it is possible to use a method to convey the composition after step (iii) using a mesh conveyor whose loading surface is partially or fully ventilated (preferably ventilated and water/liquid permeable), and to carry out water retention treatment by adding water to the composition before and after the composition is placed on the conveyor (i.e., before or during transport). This method is preferable because it allows the composition to be conveyed and the aforementioned treatment to be carried out at the same time. The water retention treatment may also be carried out by spraying the composition after conveyor transport with water on mist or by other means.

One or more embodiments of the water retention treatment includes: placing the composition after extrusion on a conveyor; immersing the entire conveyor in water (e.g., by providing a temporary immersion process in a water tank in the conveyor transport process); and optionally blowing air to the composition being conveyed by the conveyor. One or more embodiments of the water retention treatment includes: placing the composition after extrusion on a conveyor; spraying water in mist form on the composition at any stage before or after placing it on the conveyor; and optionally blowing air to the composition being conveyed by the conveyor. In either case, it may be preferable to make part or all of the conveyor loading surface a mesh-like structure with ventilation (such that, e.g., when air is blown vertically through the mesh, more than 1% or 3% of the airflow passes through it), since the added water is more likely to volatilize during transport, and the heat of vaporization can efficiently lower the temperature of the composition and adjust the time taken to reach a moisture content of 25% by mass in terms of dry mass basis. Especially in one or more embodiments where the composition is blown while being conveyed on the conveyor, it may be preferable to blow air from the top and/or from the bottom of the mesh conveyor. The aperture size of the mesh-like structure is not particularly limited, but may be determined such that the average aperture area is 1 $mm^2$ or more (specifically 1 mm×1 mm or more), or 3 $mm^2$ or more (specifically 3 mm×1 mm or more), or 10 $mm^2$ or more (specifically 5 mm×2 mm or more). On the other hand, the upper limit of the average aperture area is not particularly restricted, but may be 2500 $mm^2$ or less (specifically 50 mm×50 mm or less), or 1500 $mm^2$ or less (specifically 50 mm×30 mm or less), or 500 $mm^2$ or less (specifically 20 mm×25 mm or less).

The degree of gelatinization may preferably be decreased by a predetermined ratio or higher (i.e., the decremental difference in the degree of gelatinization calculated as "the degree of gelatinization in the composition before the treatment)–(the degree of gelatinization after the treatment)" is a predetermined value or higher) before and after blower treatment, in which air is blown from the top and/or from the bottom of the mesh conveyor. Specifically, the water retention treatment may preferably be carried out until the decremental difference in the degree of gelatinization reaches 1 mass % or more, particularly 2 mass % or more, more particularly 3 mass % or more, especially 4 mass % or more, especially 5 mass % or more, especially 6 mass % or more. The upper limit is not particularly restricted, but may be typically 50 mass % or less.

If the dry mass basis moisture content of the composition temporarily drops to below 25% by mass on a dry weight basis, the water retention process can be continued by re-hydrating the dry composition to increase the dry mass basis moisture content. When the dry composition is re-hydrated, the temperature may preferably be kept at typically 60° C. or lower, particularly 50° C. or lower, more particularly 40° C. or lower during the majority of the subsequent holding time.

It is also preferable to use a method to extend the duration of time until the dry mass basis moisture content decreases to 25% to be longer than the predetermined time by increasing the ambient humidity of the composition (when an extruder is employed, the composition after extrusion) at step (iii) and subsequent steps. This may serve to locally age the starch near the surface of the composition, which normally loses water quickly and is less likely to age compared to the interior of the composition, and make the resulting composition easier to eat. This is especially preferable when the composition is made into multiple pieces to be eaten together, such as noodles, since pieces of the compositions are less likely to bind to each other. Specifically, the composition after being extruded from the die section can be stored in a high-humidity environment (e.g., >50 RH %) or sprayed with a mist of water or other treatment (also referred to as wetting treatment) to achieve a specified reduction in the degree of gelatinization.

Wetting treatment may be carried out in a closed device with constant humidity, by using a device supplying an atmosphere with constant humidity, or by maintaining relative humidity by holding the water vapor evaporating from the composition around the composition, or by a combination of these methods.

When lowering the moisture content of the composition, the wetting treatment may be carried out before the moisture content is lowered, or may be carried out as the moisture content is lowered, or may be carried out after the moisture content is lowered. It is preferred to perform the wetting treatment before the moisture content is reduced, since the effects of one or more embodiments of the present invention are thereby more pronounced.

The wetting treatment to the composition after step (iii) may preferably be carried out under conditions such that the dry mass basis moisture content moisture content in the composition is adjusted to, for example, usually above 25 mass %, among others above 25 mass %, or even above 30 mass %, or above 30 mass %, or above 35 mass %, or above 40 mass %. The upper limit is not particularly restricted, but may be typically 200 mass % or less, or 175 mass % or less, or 150 mass % or less.

The wetting treatment for the composition after step (iii) above is preferably carried out under conditions such that the parameter A×T (RH %, hr) is above a predetermined lower limit. Where A indicates the relative humidity of the atmosphere (RH %) and T indicates the wetting treatment time (hr). However, it is to be noted that A>50 RH %. For example, if the relative humidity of the atmosphere is 95 RH % (A) and the wetting treatment time is 1 hour (T), the parameter A×T=95 (RH %, hr). It is further preferred that such parameter A×T (RH %-hr) is usually 40 or more, among others 50 or more, even 60 or more, or 70 or more, or 80 or more, especially 90 or more.

The temperature during the wet treatment is not particularly limited, but from the perspective of accelerating the ageing of the composition, it may be preferable to perform the treatment at a predetermined temperature or lower. Specifically, it may be preferable to carry out the treatment at 50° C. or lower, particularly 40° C. or less, or 30° C. or less, or 20° C. or less, or 10° C. or less. The lower limit of the temperature lower limit is not particularly restricted, but may preferably be 0° C. or more, or 4° C. or more.

Alternatively, it is also preferable to use a method to extend the duration of time until the dry mass basis moisture content decreases to 25% to be longer than the predetermined time by adjusting the internal temperature of the extruder (more specifically, the second flight section) to drop below a predetermined value at step (iii). Specifically, the internal temperature of the extruder (more specifically, the second flight section) may preferably be adjusted to typically less than 100° C., particularly less than 95° C., particularly less than 90° C., more particularly less than 85° C., or less than 80° C., or less than 75° C., or less than 70° C., or less than 65° C., or less than 60° C., or less than 55° C., or less than 50° C., or less than 45° C., especially less than 40° C. The lower limit is not particularly restricted, but may be higher than 0° C., or higher than 4° C. This method can extend the duration of time after the composition extruded from inside the extruder until the dry mass basis moisture content decreases to less than 25 mass % to preferably 0.1 hour or longer, particularly 0.2 hours or longer, particularly 0.3 hours or longer, or 0.4 hours or longer, or 0.5 hours or longer, or 0.6 hours or longer, or 0.7 hours or longer, or 0.8 hours or longer, or 0.9 hours or longer, especially 1.0 hours or longer. The upper limit of the extended duration of time is not particularly restricted, but may be typically 20 hours or shorter, particularly 15 hours or shorter.

(7) Extruder

In the production method of one or more embodiments of the present invention, at least steps (ii) and (iii), and optionally some or all of steps (i) and/or (iv), may preferably be carried out using the specific extruder of one or more embodiments of the invention (more preferably a single screw extruder) as described above.

Specifically, the raw materials for the composition of one or more embodiments of the present invention are fed via a feeder and mixed in the extruder of one or more embodiments of the invention, whereby a composition having an insoluble dietary fiber content of 3.0 mass % or more in terms of wet mass basis, a starch content of 10.0 mass % or more in terms of wet mass basis, a protein content of 3.0 mass % or more in terms of wet mass basis, and a dry mass basis moisture content of 25% or more is prepared (step (i)). However, the preparation of the composition by mixing such raw materials may be carried out outside the extruder of one or more embodiments of the present invention, and then the prepared composition may be fed to the extruder of one or more embodiments of the present invention via a feeder and only steps (ii) and (iii) may be carried out by the production method of one or more embodiments of the present invention.

The prepared composition is then conveyed from the first flight section to the kneading section by rotating the screw, while the barrel is heated by a heater to a predetermined temperature while kneading. Thus, the composition is heated by 10° C. or more during the course from the first flight section to the kneading section, while being kneaded at the kneading section at a SME value of 350 kJ/kg or more under pressurized conditions and at a temperature of between 100° C. and 200° C. (step (ii)).

Next, particularly when using an extruder of the embodiment shown in FIG. 1 described above, the kneaded composition is conveyed from the kneading section to the second flight section by rotating the screw, while the pressure is reduced to atmospheric pressure or lower by forced exhaustion at the vent section on the base side of the second flight section, to thereby promote ageing and reduce the degree of sizing of the gelatinization. The composition is thereby depressurized from the pressurized state in the kneading section to atmospheric pressure or lower at the second flight section (step (iii)). Furthermore, the degree of gelatinization of the composition is reduced by a predetermined ratio or more after the kneading section (step (iv)). Both step (iii) and step (iv) may be completed inside the extruder, or step (iv) may be completed by combining the lowering temperature treatment inside the extruder after step (iii) and the water retention treatment outside the extruder. It is also preferred to lower the temperature of the composition temperature discharged from the die section to the aforementioned predetermined temperature by forced exhaust at the vent section and/or by activating the cooler at the die section or (in the case of the extruder of the embodiment shown in FIG. 1 described above) in the second flight section.

(8) Other Conditions

In the production method of one or more embodiments of the present invention, it may be more preferable to keep the total mass flow rate of the extruder to a predetermined level or higher while lowering the outlet temperature setting of the die section of the extruder, since this may promote the gelatinization of the composition. Those conditions may be adjusted as appropriate such that the extruder outlet pressure is to a predetermined level or higher, but specific examples are as follows.

The total mass flow rate (also referred to as the flow volume) is not restricted, but may preferably be maintained to be 0.5 kg/hour or more, particularly 0.7 kg/hour or more, particularly 1.0 kg/hour or more. The upper limit of the total mass flow rate is not particularly restricted, but may preferably be typically 100 kg/hour or less, or 50 kg/hour or less.

The outlet temperature to be set for the extruder is not restricted, but may preferably be less than 80° C., particularly less than 75° C., particularly less than 70° C., or less than 65° C., or less than 60° C., or less than 55° C., or less than 50° C., or less than 45° C., especially less than 40° C. The lower limit is not particularly restricted, but may preferably be typically 0° C. or more, or 4° C. or more.

The difference between the maximum heating temperature during kneading at step (ii) and the temperature when the composition discharged from the die section may preferably be a predetermined value or higher. Specifically, that the difference between the maximum heating temperature during kneading in stage (ii) (the temperature of the highest heating segment in the kneading section of the extruder) and the temperature when the composition discharged from the die section may preferably be 20° C. or more, especially 25° C. or more, even more preferably 30° C. or more. The upper limit of the temperature difference is not particularly restricted, but since excessive cooling may cause blockage of the composition inside the extruder, it may preferably be 110° C. or less, more preferably 100° C. or less.

Conventionally, extruders have often been used to produce puff and other swollen compositions, and their production conditions are particularly difficult to apply to the production of compositions without swelling, as the conditions at step (iii) are usually set at temperatures which cause the compositions to swell. This is because the internal temperature transition of the extruder occurs continuously, and if, for example, only the temperature rise condition during kneading is adopted and the outlet temperature setting is adjusted to a lower temperature as required, the effect of lowering the outlet temperature setting is to lower the temperature during kneading and the entire internal temperature, resulting in a completely different condition, which is not an adjustment that a skilled person can make as required. This was not an adjustment that could be made by a person skilled in the art as appropriate. In addition, when-manufacturing puff and other puffed products, it is technical common technical common knowledge of those skilled in the art to reduce the proportion of moisture in the total mass flow rate in order to cause rapid swelling at reduced pressure. Therefore, there was no motivation to increase the moisture content in the total mass flow rate as in the case of compositions that do not involve swelling.

It may also be preferable to provide, after step (iii) or step (iv), the step of adjusting the dry mass basis moisture content of the composition to a predetermined value or lower, since this may delay or stop the aging of the starch in the composition, resulting in a composition with a good quality. Specifically, the dry mass basis moisture content in the final composition may preferably be less than 60 mass or less than 55 mass %, particularly less than 50 mass %, or less than 45 mass %, or less than 40 mass %, or less than 35 mass %, or less than 30 mass %, or less than 25 mass %, or less than 20 mass %, or less than 15 mass %. On the other hand, the lower limit of the dry mass basis moisture content in the composition of one or more embodiments of the present invention is not restricted, but may be 0.5 mass % or more, or 1 mass % or more, or 2 mass % or more from the viewpoint of industrial production efficiency.

The dry mass basis moisture content of the composition of one or more embodiments of the present invention may be either derived from various ingredients of the composition or derived from further added water. Specifically, it may be preferable to provide, after step (iv), the step of adjusting the dry mass basis moisture content to less than 25 mass %, since this may serve to locally age the starch on the composition surface, once gelatinized at step (ii). This is preferable when the composition is made into multiple pieces to be eaten together, such as noodles, since pieces of the compositions are less likely to bind to each other.

(9) Post Treatment

Although the method for producing the composition of one or more embodiments of the present invention includes at least the steps explained above, any post treatment may also be carried out. Examples of post treatments include molding treatment and drying treatment.

Examples of molding treatments include molding the solid paste composition into a desired form (e.g., pasta, Chinese noodles, udon, inaniwa udon, kishimen, houtou, suiton, hiyamugi, somen, soba, soba gaki, bee-hun, pho, reimen, vermicelli, oatmeal, couscous, kiritanpo, tteok, and gyoza skins, as mentioned above). Such a molding treatment can be carried out using methods normally known in the art. For example, in order to produce compositions in elongated shapes such as pasta, Chinese noodles, or other noodles, the composition can be extruded into elongated forms using an extruder or other devices described above. On the other hand, in order to produce compositions in flat plate shapes, the composition may be molded into flat plate shapes. Furthermore, the composition can be made into any shape such as elongated, granular, or flaky shapes, by, e.g., press-molding the composition or cutting or die-cutting the flat-plate shaped composition. Alternatively, after kneading, the composition may be extruded using a die with a flow channel cross-section having an average degree of unevenness of a predetermined value or higher to thereby mold the composition such that its cross-section has an average degree of unevenness of a predetermined value or higher. Examples of the die shapes include, although not limited to, round, square, triangular, star, oval, crescent, half-moon, cross, and fylfot, as well as any combinations thereof (e.g., a Celtic cross-shaped die hole, which is a combination of a Greek cross shape and a circle shape arranged such that the intersection of the cross is on the center of the circle, and that the circle has a radius of two-thirds or less of the distance from the center to each tip of the cross).

(10) Drying Treatment

It may also be preferable to provide, after step (iv), the step to reduce the dry mass basis moisture content of the composition to a predetermined value or lower (drying treatment step), since this may inhibit quality changes in the composition and ensure that the quality of the composition is maintained. This step may be referred to herein as the "drying treatment" step. Specifically, the dry mass basis moisture content may preferably decrease before and after the drying treatment step by 5% or more (i.e., the decrease ratio calculated as "{(the ratio in the composition before the drying treatment)–(the ratio in the composition after the drying treatment)}/(the ratio in the composition before the drying treatment)" is a predetermined value or higher), particularly 10% or more, particularly 15% or more, especially 20% or more, or 25% or more, or 30% or more, or 35% or more, or 40% or more, or 45% or more, especially 50% or more. The upper limit is not particularly restricted, but may be 100% or less, or 95% or less. Carrying out the drying treatment step after the aging treatment at step (iv) may be particularly preferable since the aged starch formed near the composition surface at step (iv) may inhibit the binding between pieces of the composition during the drying treatment, resulting in excellent productivity.

In addition, the dry mass basis moisture content in the final composition after the drying treatment may preferably be less than 60 mass %, or less than 55 mass %, particularly less than 50 mass %, or less than 45 mass %, or less than 40 mass %, or less than 35 mass %, or less than 30 mass %, or less than 25 mass %, or less than 20 mass %, or less than 15 mass %. On the other hand, the lower limit of the dry mass basis moisture content in the composition of one or more embodiments of the present invention is not restricted, but may be 0.5 mass % or more, or 1 mass % or more, or 2 mass % or more from the viewpoint of industrial production efficiency. The dry mass basis moisture content in the composition of one or more embodiments of the present invention may be either derived from various ingredients of the composition or derived from further added water.

The temperature of the composition during the drying treatment is not restricted, but when the treatment is carried out under normal pressure, it may preferably be more than 50° C., particularly more than 60° C., or more than 70° C., especially more than 80° C. The upper limit is not particularly limited, but may be less than 100° C., or less than 98° C.

It is also preferable to carry out the drying treatment composition slowly with controlling the temperature, because this may serve to reduce the dry mass basis moisture content of the composition to 10 mass % or less in a relatively short time and provide the post-treatment composition (with a dry mass basis moisture content of 10 mass % or less) with a good quality not prone to cracking. Specifically, it may be preferable to calculate the "ambient relative humidity determined from the composition temperature at any given point in time" from the composition temperature during the treatment, and to control the composition temperature so that the average relative humidity during the entire treatment time to a predetermined ratio or higher. For example, in cases where the composition has a relatively high moisture content (e.g., with a dry mass basis moisture content of 25 mass % or more) during the treatment where the dry mass basis moisture content in the composition decreases to 10 mass % or less, it is possible to adjust the composition temperature to a relatively high temperature to the extent that the saturated moisture vapor content does not rise too high, to thereby increase the absolute humidity in the atmosphere via evaporation of the moisture in the composition, whereby the average relative humidity can be adjusted to a predetermined ratio or higher. On the other hand, in cases where the composition has a relatively low moisture content (e.g., with a dry mass basis moisture content of less than 25 mass %), it is possible to adjust the composition temperature to a relatively low temperature to lower the saturated moisture vapor content, whereby the average relative humidity can be adjusted to a predetermined ratio or higher. More specifically, the treatment where the dry mass basis moisture content in the composition decreases to 10 mass % or less may preferably be carried out so as to adjust the average relative humidity during the treatment to typically 50RH % or more, particularly 55RH % or more, more particularly 60RH % or more, or 65RH % or more, or 70RH % or more, or 75RH % or more, or 80RH % or more. In addition, at least either the average relative humidity during the period when the composition has a dry mass basis moisture content of 25 mass % or more and/or the average relative humidity during the period when the composition has a dry mass basis moisture content of less than 25 mass % but 10 mass % or more may preferably be adjusted to a predetermined ratio or higher (50RH % or more, particularly 55RH % or more, more particularly 60RH % or more, or 65RH % or more, or 70RH % or more, or 75RH % or more, or 80RH % or more). More specifically, it may be preferable that at the average relative humidity during the period when the composition has a dry mass basis moisture content of 25 mass % or more satisfies the predetermined ratio or higher mentioned above, and it is more preferable that the average relative humidity during the period when the composition has a dry mass basis moisture content of less than 25 mass % but 10 mass % or more also satisfies the predetermined ratio or higher mentioned above.

It is also preferable that the average relative humidity is adjusted to a predetermined ratio or higher at least during the first 40% of the period of time required from the start of the drying treatment until the dry mass basis moisture content in the composition decreases to 10 mass % (the time window during which the composition moisture is relatively high; more preferably, the dry mass basis moisture content may be 25 mass % or more during this time window) and/or during the last 60% of the period of time required from the start of the drying treatment until the dry mass basis moisture content in the composition decreases to 10 mass % (the time window during which the composition moisture is relatively low; more preferably, the dry mass basis moisture content may be less than 25 mass % during this time window). This adjustment may serve to provide the post-treatment composition (with a dry mass basis moisture content of 10 mass % or less) with a good quality not prone to cracking. It is more preferable that the average relative humidity is adjusted to a predetermined ratio or higher during both of these time windows. Specifically, the drying treatment may preferably be carried out so as to adjust the average relative humidity to 50RH % or more, particularly 55RH % or more, more particularly 60RH % or more, or 65RH % or more, or 70RH % or more, or 75RH % or more, or 80RH % or more during the first 40% and/or the last 60% of the period of time mentioned above.

Any method used for drying food products can be used to adjust the composition temperature during the drying treatment under the conditions mentioned above. However, it may be preferable to adjust the composition temperature and/or the ambient temperature using, e.g., air drying.

The pressure during the drying treatment is also not particularly limited, and it may be carried out either under atmospheric pressure or under reduced pressure. When the treatment is carried out under reduced pressure (e.g., less than 0.1 MPa), the temperature of the composition may preferably be less than 80° C., in particular less than 70° C., or less than 60° C., in particular less than 50° C. The lower limit is not particularly limited, but may be higher than 0° C., or higher than 4° C.

Any method commonly used for drying food products can be used as a drying method. Examples include freeze drying, air drying (e.g., draught drying (hot air drying), fluidized bed drying, spray drying, drum drying, low temperature drying, sun drying, shade drying, etc.), pressurized drying, reduced pressure drying, microwave drying, oil heat drying, etc. Of these methods, from the viewpoint that the color tone and flavor inherent in food ingredients are not significantly changed, and that non-food aromas (e.g. burnt smell) can be controlled, microwave drying is preferred, and microwave drying under reduced pressure is even more preferred. On the other hand, from the viewpoint of processing large quantities of compositions, air drying (e.g., hot air drying, fluidized bed drying, spray drying, drum drying, low temperature drying, sun drying, shade drying, etc.) is also preferred, and draught drying (especially hot air drying with ambient temperatures within a predetermined temperature range) is particularly preferred.

During the drying treatment, it may be preferable to treat the composition for predetermined amount of time or longer in an environment where the ambient temperature exceeds a predetermined level, because this may reduce the time required for the dry mass basis moisture content to decrease by a predetermined ratio or higher. Specifically, the drying treatment may preferably be carried out at an ambient temperature of typically higher than 50° C., particularly higher than 60° C., more particularly higher than 70° C., or higher than 80° C. The upper limit of the ambient temperature is not particularly restricted, but may be typically 100° C. or lower. An environment where the ambient temperature is higher than a predetermined temperature can be created by, e.g., storing the composition extruded from the die section at high temperature environment, maintaining the temperature of the composition extruded at high temperature to increase the ambient temperature, or blowing the composition with high temperature air.

The treatment of the composition at ambient temperature may be carried out for a predetermined amount of time or longer, typically 0.1 hour or longer, particularly 0.2 hour or longer, or 0.3 hour or longer, or 0.4 hour or longer, or 0.5 hour or longer, or 0.6 hour or longer, or 0.7 hour or longer, or 0.8 hour or longer, or 0.9 hour or longer, especially 1.0 hour or longer. The upper limit of the duration is not particularly restricted, but may be 20 hours or less, or 15 hours or less.

[III: Crushed Product of Starch-Containing Composition for Heat Cooking and its Agglomerate]

The composition of one or more embodiments of the present invention may be crushed before use. Specifically, the production method of one or more embodiments of the present invention may further include, after the cooling of step (iii), the step of (v) crushing the composition to produce a crushed composition. The thus-obtained crushed product of the composition of one or more embodiments of the present invention (hereinafter also referred to as "the crushed composition of one or more embodiments of the present invention") also constitutes a subject of one or more embodiments of the present invention. When the composition of one or more embodiments of the present invention is crushed into the crushed composition of one or more embodiments of the present invention, the conditions for crushing the composition are not particularly limited but may be determined such that the particle diameter $d_{50}$ and/or $d_{90}$ of the crushed composition is adjusted to within the range of 50 μm or more but 1000 μm or less.

When producing the crushed composition of one or more embodiments of the present invention, it may be preferable to crush the composition of one or more embodiments of the present invention with high water retention properties, since the resulting crushed composition may constitute an agglomerate with excellent shape retention property even at s high moisture content in terms of dry mass basis. Specifically, according to one or more embodiments of the present invention, even when an agglomerate is produced from a crushed composition with a high dry mass basis moisture content, for example, of typically 50 mass % or more, particularly 60 mass % or more, more particularly 70 mass % or more, or 80 mass % or more, or 90 mass % or more, especially 100 mass % or more, the resulting agglomerate may have excellent shape retention property. The upper limit of the dry mass basis moisture content is not particularly restricted, but may be 500 mass % or less, or 400 mass % or less. It is also possible to add moisture to the agglomerate composition followed by baking or kneading, whereby an agglomerate composition with excellent moisture retention property is obtained.

It is also possible to use the crushed composition of one or more embodiments of the present invention as a raw material to prepare an agglomerate of the crushed composition, e.g., by subjecting the crushed composition again to the high-temperature, strong-kneading treatment according to the production method of one or more embodiments of the present invention, or by adding a certain volume of water to the crushed composition followed by kneading. It may also be preferable to produce an agglomerate by pasta-pressing a crushed composition of one or more embodiments of the present invention containing more than 15 mass % of moisture (preferably a crushed composition the decremental difference in the dry mass basis moisture content at step (iii) and onward is 10 mass % or less) as a raw material, more preferably with heating at 70° C. or higher (or 80° C. or higher). In other words, the production method of one or more embodiments of the present invention may further include, after the crushing at step (v), the step of (vi) agglomerating the crushed composition to produce a crushed composition agglomerate. The thus-obtained agglomerate of the crushed composition of one or more embodiments of the present invention (also referred to as "the crushed composition agglomerate of one or more embodiments of the present invention") may also preferably be used as the composition of one or more embodiments of the present invention or as a raw material at step (i) of the production method of one or more embodiments of the present invention. The crushed composition agglomerate of one or more embodiments of the present invention also constitutes a subject of one or more embodiments of the present invention. When the composition of one or more embodiments of the present invention is crushed into the crushed composition of one or more embodiments of the present invention, the manufacture conditions are as explained above.

In addition, it may be preferable to use the crushed composition and/or the crushed composition agglomerate as a heat-treated raw material at step (i) of the production method of one or more embodiments of the present invention at a predetermined ratio, since this may serve to inhibit binding between pieces of the resulting composition. Specifically, the crushed composition obtained at step (v) and/or the crushed composition agglomerate obtained at step (vi) may be incorporated into the dough composition prepared at step (i) at a predetermined ratio in terms of dry mass basis. The lower limit of the ratio is not particularly restricted, but may be typically 5 mass % or more, particularly 10 mass % or more, more particularly 15 mass % or more, especially 20 mass % or more in terms of dry mass basis. The upper limit of the ratio is not particularly restricted, but may be typically 100 mass % or less, or 90 mass % or less.

EXAMPLES

One or more embodiments of the present invention will now be described in further detail by way of Examples. These examples are shown merely for convenience of the description, and should not be construed as limitations to the present invention in any sense.

[Preparation of Starch-Containing Solid Compositions]

The starch-containing composition sample in each of the Examples and Comparative Examples was produced by preparing a composition from a predetermined combination of materials, kneading the prepared composition using a predetermined uniaxial extruder under predetermined conditions and also gelatinizing it, and subjecting the kneaded composition to post-treatment for aging. Protein and starch were used as those contained in their respective food ingredients, and the contents thereof were adjusted using fractions having high contents of starch and protein, which were separated based on their differences in specific gravity.

Tables 1 and 2 below indicate the configuration and operating conditions for the extruder used for producing the starch-containing composition sample in each of the Examples and Comparative Examples and the details of processing using the extruder. Table 3 indicates the combination of raw materials used for producing the starch-containing composition sample in each of the Examples and Comparative Examples. Table 5 indicates the properties and characteristics of the starch-containing composition sample in each of the Examples and Comparative Examples during the production process (at each of the gelatinization and aging steps). Table 5 indicates sensory evaluation results for each starch-containing composition sample.

The Examples and Comparative Examples using a barrel with a vent section were carried out using a barrel with the vent section located at a position corresponding to the second flight section and within 5% from the start point of the second flight section when the screw is in operation with the screw in the barrel (the embodiment shown in FIG. 1) except Examples 64 and 65, which were carried out using a barrel according to the embodiment shown in FIG. 3, and a variant of the die section as shown in FIG. 5B. In each of the screw used in the Examples and Comparative Examples, the ratio of the forward flight structure to the total length of the first flight section and the ratio of the forward flight structure to the total length of the second flight section were both 100%.

In the Examples and Comparative Examples using a screw having a flow retarding structure, the flow retarding structure was located at the position between the tip end of the second flight section and the die section, and was a screw structure with grooved holes (with a passage-like structure arranged in an oblique direction to the forward flight structure, where the angle of the passage-like structure to the axis of rotation is 50% of the helix angle).

The samples of the starch-containing compositions for heat cooking prepared for the Examples and Comparative Examples, as well as samples of the raw materials used for each composition sample, were subjected to the following analysis and sensory evaluation.

[Enzyme (Amylase and Protease) Treatment]

Samples of the raw material composition before processing and the composition after processing for each of the Examples and Comparative Examples were subjected to the amylase and protease treatment as follows. 300 mg of each sample was placed in a plastic tube with 5 mL of water, allowed to swell at 20° C. for about 1 hour, and then processed using a small Hiscotron (Microtech Nichion homogenizer NS-310E3) until a porridge-like consistency is obtained (about 15 seconds at 1000 rpm) to prepare a 6 mass % water suspension of the composition. 2.5 mL of the treated sample is then divided and combined with 10 μL of protease (Proteinase K, Takara Bio) and 0.5 mg of α-amylase (α-Amylase from *Bacillus subtilis*, Sigma), and allowed to react at 20° C. for 3 days.

[Measurement of Particle Diameter $d_{50}$ after Enzyme Treatment and Ultrasonication]

The samples of the raw material composition before processing and the composition after processing for each of the Examples and Comparative Examples having undergone amylase and protease were subjected to measurement of the particle diameter distribution after ultrasonication, using a laser diffraction particle size analyzer, under the following conditions. Ethanol was used as the solvent for the measurement. The laser diffraction particle size analyzer used for the measurement was Microtrac MT3300 EXII system marketed by Microtrac Bell Inc. The measurement application software used was DMS2 (Data Management System version 2, Microtrac Bell Inc.). The measurement was carried out as follows. Cleaning was carried out by pressing the Wash button of the software, calibration was carried out by pressing the Set Zero button of the software, and the sample was directly loaded via the Sample Loading feature until the sample concentration was adjusted to within the proper range. The ultrasonic treatment was then performed by pressing the Ultrasonic Treatment button of the software, and after three times of defoaming, the sample loading was carried out again to confirm that the concentration was adjusted to within the appropriate range. Thereafter, the sample was promptly laser diffracted at a flow rate of 60% with a measurement time of 10 seconds, and the particle diameter distribution was obtained. The parameters for the measurement may be, e.g., Distribution indication: Volume; Particle refractive index: 1.60; Solvent refractive index: 1.36; Upper limit of measurement: 2,000.00 µm; Lower limit of measurement: 0.021 µm. The particle diameter $d_{50}$ was calculated from the obtained particle diameter distribution.

[Measurement of Starch, Protein, Insoluble Dietary Fiber, and Dry Mass Basis Moisture Contents]

The "Starch" content was determined according to the Japan Standard Tables for Food Composition 2015 (7th revised edition) and using the method of AOAC 996.11, by a method in which soluble carbohydrates (glucose, maltose, maltodextrin, etc.) that affect the measured value are removed via extraction treatment with 80% ethanol. The "Protein" content was determined according to the Japan Standard Tables for Food Composition 2015 (7th revised edition), by quantifying the total amount of nitrogen using the modified Kjeldahl method, and then multiplying the total amount of nitrogen with the "nitrogen-protein conversion factor." The "Insoluble dietary fiber" content was determined according to the Japan Standard Tables for Food Composition 2015 (7th revised edition), using the Prosky variant method. The "Dry mass basis moisture content" was according to the Japan Standard Tables for Food Composition 2015 (7th revised edition), by heating to 90° C. using a decompression heating and drying method.

[Measurement of the Number of Starch Grain Structures in the Field of View]

Each composition of the Test and Comparative Examples was pulverized with a mill and filtered through an aperture size of 150 µm to prepare composition powder. 3 mg of the powder was suspended in 50 µL of water to prepare a 6% aqueous suspension of composition powder. The suspension was dropped onto a glass slide, on which a cover glass was then placed and lightly crushed to obtain a prepared slide. Representative sites in the prepared slide were observed under a phase contrast microscope (ECLIPSE80i, Nikon) at a magnification of 200× to determine the number of starch grain structures in the field of view.

[Sensory Evaluation]
*Summary of Sensory Evaluation Procedure:

One mass of each starch-containing composition of the Examples and Comparative Examples prepared in the manner described above was heat-cooked in 9 masses of water at 90° C. for 5 minutes, and sensory evaluation was conducted on both the product before and after the heat cooking.

Specifically, the heat cooled compositions were placed on paper plates, and 10 trained sensory inspectors observed the compositions and evaluated the appearance of each composition before cooking, in terms of "Matte appearance," the appearance of each composition after cooking before tasting and the taste of each composition upon eating, in terms of "Burn" and "Shape disintegration during heat cooking," and the appearance and taste of each composition before and after cooking, in terms of "Overall evaluation," in accordance with the following criteria. The average of the scores of 10 sensory inspectors was calculated for each evaluation item, and rounded off to the first decimal place to obtain the final score.

*Sensory Inspectors:

The sensory inspectors were selected from those who achieved excellent performance in the identification training described in A to C below, had experience in product development, had a lot of knowledge about food qualities such as taste and texture, and were capable of performing absolute evaluation for each sensory evaluation item.

A) Taste discrimination test: a total of seven samples were prepared, including five aqueous solutions prepared for five tastes (sweetness: taste of sugar; sourness: taste of tartaric acid; umami: taste of monosodium glutamate; saltiness; taste of sodium chloride; and bitterness: taste of caffeine), each with a concentration close to the threshold value of each component, and two sample solutions with distilled water, and the trainees were instructed to accurately identify the sample of each taste.

B) Concentration difference discrimination test: a series of five solutions with slightly different concentrations was prepared for each of salt and acetic acid, and the trainees were instructed to accurately distinguish the solutions of different concentrations for each component.

C) Three-point identification test to accurately identify from three soy sauce samples, two from Manufacturer A and one from Manufacturer B, the soy sauce sample from Manufacturer B.

For any of the aforementioned evaluation items, standard samples were evaluated in advance by all the inspectors, and each score of the evaluation criteria was standardized before objective sensory inspection was carried out by 10 inspectors. The evaluation of each evaluation item was carried out using a method in which each inspector selected one of the scores closest to his or her own evaluation from a five-point grading scale for each item. The total of the evaluation results was calculated from the arithmetic mean of the scores of the 10 inspectors, and the standard deviation was further calculated to assess the variation between the inspectors.

*Evaluation Criteria for "Matte Appearance":

For each composition, the appearance of the composition before cooking (matte appearance) was evaluated on the following five-point grading scale. The degree of matte appearance was determined by evaluating the degree of light scattering on the surface of the composition, using 2 mm thick haze standard plates made of acrylic resin (haze values of 5%, 10%, 20% and 30%; Murakami Color Technology Laboratory Ltd.) as references. Specifically, the degree of light scattering on the surface of the composition under visible light (illuminance of 1000 lux) was evaluated using standard plates with haze values ranging from 5% (low cloudiness, incident light reflected almost linearly, and relatively weak matte appearance) to 30% (high cloudiness, incident light reflected in all directions, and relatively strong matte appearance) as indices. For example, "surface light scattering was between haze value 20% and haze value 30%" means that the degree of light scattering on the surface of the composition was evaluated as being "equal to or greater than the standard plate with a haze value of 20% but lower than the standard plate with a haze value of 30%."

5: The surface light scattering on the composition surface under visible light was larger than haze value 30%, with strong matte appearance.

4: The surface light scattering on the composition surface under visible light was haze value 20% or more less than 30%, with significant matte appearance.

3: The surface light scattering on the composition surface under visible light was haze value 10% or more less than 20%, with some matte appearance.

2: The surface light scattering on the composition surface under visible light was haze value 5% or more less than 10%, with little matte appearance.

1: The surface light scattering on the composition surface under visible light was haze value less than 5%, with no matte appearance.

*Evaluation Criteria for "Shape Disintegration During Heat Cooking":

For each composition, one mass part of the sample was heat-cooked in 9 mass parts of water at 90° C. for 5 minutes, and shape disintegration of the composition was evaluated on the following five-point grading scale.

5: Very favorable, with no disintegration in shape was observed.

4: Favorable, with little disintegration in shape was observed.

3: Rather favorable, with disintegration in shape in part was observed.

2: Rather unfavorable, with disintegration in shape was observed.

1: Unfavorable, with significant disintegration in shape was observed.

*Evaluation Criteria for "Burn":

For each composition, the appearance of the composition after heat-cooking (the degree of burn) was evaluated and noted in the "Comments" column. The degree of burn was determined using the brightness defined in the Munsell color system (JISZ8721) as a reference, and if the difference in brightness reduction of the composition after processing compared to the dough composition before processing was one or more, it was evaluated as "Discoloration associated with burn was observed"; if the difference in brightness reduction of the composition after processing compared to the composition of the dough before processing was 0 or more but less than 1, it was evaluated as "Slight discoloration associated with burn was observed."

[Results]

Tables 1 to 5 below summarize the processing conditions, materials, properties and evaluation results of each of the Examples and Comparative Examples.

TABLE 1

| | | Barrel Ratio of area with grooves in Barrel to total length of Kneading section (%) | Vent section Vent section exists? | Suction pressure (MPa) | Die section Degree of unevenness of die section | Shape of die section | Kneading temperature (° C.) | Difference between maximum temperature at Kkneading section and outlet temperature at Die section (° C.) | Outlet temperature of Die section (° C.) | Kneading conditions SME (kJ/kg) | Screw as a whole L/D ratio |
|---|---|---|---|---|---|---|---|---|---|---|---|
| Example | 1 | 0% | Yes | 0.08 | 1.0 | Round | 120 | 60 | 60 | 2,181 | 42 |
| Example | 2 | 0% | Yes | 0.08 | 1.0 | Round | 120 | 60 | 60 | 1,695 | 42 |
| Example | 3 | 0% | Yes | 0.08 | 1.0 | Round | 120 | 60 | 60 | 1,586 | 42 |
| Example | 4 | 0% | Yes | 0.08 | 1.0 | Round | 120 | 60 | 60 | 1,486 | 42 |
| Example | 5 | 0% | Yes | 0.08 | 1.0 | Round | 120 | 60 | 60 | 1,980 | 42 |
| Example | 6 | 0% | Yes | 0.08 | 1.0 | Square | 120 | 60 | 60 | 2,018 | 42 |
| Example | 7 | 0% | Yes | 0.08 | 1.0 | Round | 120 | 60 | 60 | 2,208 | 42 |
| Example | 8 | 0% | Yes | 0.08 | 1.0 | Square | 120 | 60 | 60 | 2,101 | 42 |
| Example | 9 | 0% | Yes | 0.08 | 1.0 | Round | 120 | 60 | 60 | 2,005 | 42 |
| Example | 10 | 0% | Yes | 0.08 | 1.0 | Round | 120 | 50 | 70 | 2,077 | 43 |
| Example | 11 | 0% | Yes | 0.08 | 1.0 | Round | 120 | 50 | 70 | 2,077 | 43 |
| Example | 12 | 0% | Yes | 0.08 | 1.0 | Round | 120 | 50 | 70 | 2,077 | 43 |
| Example | 13 | 0% | Yes | 0.08 | 1.0 | Round | 120 | 50 | 70 | 2,077 | 43 |
| Example | 14 | 35% | Yes | 0.08 | 1.0 | Round | 120 | 60 | 60 | 2,003 | 42 |
| Example | 15 | 0% | Yes | 0.08 | 1.0 | Round | 120 | 80 | 40 | 2,351 | 42 |
| Example | 16 | 0% | Yes | 0.08 | 1.0 | Round | 120 | 70 | 50 | 2,158 | 42 |
| Example | 17 | 0% | Yes | 0.08 | 1.0 | Round | 120 | 50 | 70 | 2,239 | 42 |
| Example | 18 | 0% | Yes | 0.08 | 1.0 | Round | 120 | 35 | 85 | 2,001 | 42 |
| Comparative Example | 19 | 0% | Yes | 0.08 | 1.0 | Round | 190 | 105 | 85 | 1,568 | 42 |
| Example | 20 | 0% | Yes | 0.08 | 1.0 | Round | 120 | 60 | 60 | 2,050 | 42 |
| Example | 21 | 0% | Yes | 0 08 | 1.0 | Round | 120 | 30 | 60 | 1,785 | 42 |
| Example | 22 | 0% | Yes | 0.08 | 1.0 | Round | 120 | 30 | 60 | 1,785 | 42 |
| Example | 23 | 0% | Yes | 0.08 | 1.0 | Round | 120 | 30 | 60 | 1,785 | 42 |
| Example | 24 | 0% | Yes | 0.08 | 0.3 | Fylfot | 120 | 60 | 60 | 2,065 | 42 |
| Example | 25 | 0% | Yes | 0.08 | 0.1 | Fylfot | 120 | 60 | 60 | 1,963 | 42 |

TABLE 1-continued

| | | | | | | Processing conditions | | | | |
| | | | | | | | | Temperature setting | | |
| | | Barrel Ratio of area with grooves in Barrel to total length | | | Die section | | | Difference between maximum temperature at | | |
| | | | Vent section | | Degree of un- | | | Kkneading section and outlet | Outlet temperature | Kneading | Screw as a |
| | | of Kneading section (%) | Vent section exists? | Suction pressure (MPa) | evenness of die section | Shape of die section | Kneading temperature (° C.) | temperature at Die section (° C.) | of Die section (° C.) | conditions SME (kJ/kg) | whole L/D ratio |
|---|---|---|---|---|---|---|---|---|---|---|---|
| Example | 26 | 0% | Yes | 0.08 | 1.0 | Round | 120 | 60 | 60 | 1,561 | 42 |
| Example | 27 | 0% | Yes | 0.08 | 1.0 | Round | 120 | 60 | 60 | 1,841 | 42 |
| Example | 28 | 0% | Yes | 0.08 | 1.0 | Round | 120 | 60 | 60 | 2,020 | 42 |
| Example | 29 | 0% | Yes | 0.08 | 1.0 | Round | 120 | 60 | 60 | 2,005 | 42 |
| Example | 30 | 0% | Yes | 0.08 | 1.0 | Round | 120 | 60 | 60 | 1,890 | 42 |
| Example | 31 | 0% | Yes | 0.08 | 1.0 | Round | 120 | 60 | 60 | 2,011 | 42 |
| Example | 32 | 0% | Yes | 0.08 | 1.0 | Round | 120 | 60 | 60 | 1,890 | 42 |
| Example | 33 | 0% | Yes | 0.08 | 1.0 | Round | 120 | 60 | 60 | 2,011 | 42 |
| Example | 34 | 0% | Yes | 0.08 | 1.0 | Round | 120 | 60 | 60 | 2,011 | 42 |
| Example | 35 | 0% | Yes | 0.08 | 1.0 | Round | 120 | 60 | 60 | 2,011 | 42 |
| Example | 36 | 0% | Yes | 0,08 | 1.0 | Round | 120 | 60 | 60 | 2,031 | 42 |
| Example | 37 | 0% | Yea | 0.08 | 1.0 | Round | 120 | 60 | 60 | 2,031 | 42 |
| Example | 38 | 0% | Yes | 0.08 | 1.0 | Round | 120 | 60 | 60 | 2,031 | 42 |
| Example | 39 | 0% | Yes | 0.08 | 1.0 | Round | 120 | 60 | 60 | 2,181 | 42 |
| Example | 40 | 0% | Yes | 0.08 | 1.0 | Round | 120 | 60 | 60 | 2,181 | 42 |
| Example | 41 | 0% | Yes | 0.08 | 1.0 | Round | 115 | 65 | 50 | 2,261 | 48 |
| Example | 42 | 0% | Yes | 0.08 | 1.0 | Round | 115 | 65 | 50 | 2,195 | 42 |
| Comparative Example | 43 | 0% | Yes | 0.08 | 1.0 | Round | 120 | 60 | 60 | 2,009 | 42 |
| Example | 44 | 0% | Yes | 0.08 | 1.0 | Round | 120 | 60 | 60 | 2,151 | 42 |
| Example | 45 | 0% | Yes | 0.08 | 1.0 | Round | 120 | 60 | 60 | 2,351 | 42 |
| Example | 46 | 0% | Yes | 0.08 | 1.0 | Round | 120 | 60 | 60 | 2,513 | 42 |
| Example | 47 | 0% | Yes | 0 08 | 1.0 | Round | 120 | 60 | 60 | 2,622 | 42 |
| Example | 48 | 0% | Yes | 0.08 | 1.0 | Round | 120 | 60 | 60 | 2,692 | 42 |
| Example | 49 | 0% | Yes | 0.08 | 1.0 | Round | 120 | 60 | 60 | 2,848 | 42 |
| Comparative Example | 50 | 0% | Yes | 0.08 | 1.0 | Round | 90 | 60 | 30 | 2,234 | 42 |
| Example | 51 | 0% | Yes | 0.08 | 1.0 | Round | 100 | 55 | 45 | 1,965 | 42 |
| Example | 52 | 0% | Yes | 0.08 | 1.0 | Round | 110 | 45 | 65 | 1,859 | 42 |
| Example | 53 | 0% | Yes | 0.08 | 1.0 | Round | 140 | 80 | 60 | 2,305 | 42 |
| Example | 54 | 0% | Yes | 0.08 | 1.0 | Round | 160 | 100 | 60 | 2,327 | 42 |
| Example | 55 | 0% | Yes | 0.08 | 1.0 | Round | 180 | 100 | 80 | 2,371 | 42 |
| Comparative Example | 56 | 0% | Yes | 0 08 | 1.0 | Round | 210 | 110 | 100 | 2,041 | 42 |
| Comparative Example | 57 | 0% | Yes | 0.08 | 1.0 | Round | 120 | 60 | 60 | 280 | 18 |
| Example | 58 | 0% | Yes | 0.08 | 1.0 | Round | 120 | 60 | 60 | 420 | 25 |
| Example | 59 | 0% | Yes | 0.08 | 1.0 | Square | 120 | 50 | 70 | 691 | 33 |
| Example | 60 | 0% | Yes | 0.08 | 1.0 | Square | 115 | 65 | 50 | 998 | 38 |
| Example | 61 | 0% | Yes | 0.05 | 1.0 | Round | 105 | 60 | 60 | 603 | 42 |
| Example | 62 | 0% | Yes | 0.03 | 1.0 | Round | 105 | 60 | 60 | 580 | 42 |
| Example | 63 | 0% | Yes | Only opened | 1.0 | Round | 105 | 60 | 60 | 625 | 42 |
| Comparative Example | 64 | 0% | No | — | 1.0 | Round | 105 | 60 | 60 | 524 | 42 |
| Example | 65 | 0% | Yes (combined with die section) | — (opened to atmostic pressure) | 0.9 | Crescent (average width of 1 mm) | 120 | 60 | 60 | 852 | 42 |
| Example | 66 | 0% | Yes (combined with die section) | — (opened to atmostic pressure) | 0.8 | Celtic cross | 120 | 60 | 80 | 784 | 42 |

TABLE 1-continued

| | | | | | | | | | | | |
|---|---|---|---|---|---|---|---|---|---|---|---|
| | | | | | | Processing conditions | | | | | |
| | | | | | | | Temperature setting | | | | |
| | | Barrel Ratio of area with grooves in Barrel to total length of Kneading section (%) | Vent section | | Die section | | | Difference between maximum temperature at | | | |
| | | | Vent section exists? | Suction pressure (MPa) | Degree of un-evenness of die section | Shape of die section | Kneading temperature (° C.) | Kkneading section and outlet temperature at Die section (° C.) | Outlet temperature of Die section (° C.) | Kneading conditions SME (kJ/kg) | Screw as a whole L/D ratio |
| Example | 67 | 0% | Yes (combined with die section) | — (opened to atmostic pressure) | 0.8 | Celtic cross | 120 | 60 | 60 | 784 | 42 |

TABLE 2

| | Processing conditions | | | | | | | |
| | First flight section | | Second flight section | | | Post-treatment section | | |
| | Thread groove | Kneading section | Thread groove | Thread pitch | Flow retarding structure | Type of post-treatment | Second treatment | Time after composition |
| | (Average thread groove depth in first 20%)/(Average thread groove depth in last 80%) of First flight section | (Length of Kneading section)/(Total length of Screw) (%) | (Average thread groove depth in first 20%)/(Average thread groove depth in last 80%) of Second flight section | (Average thread pitch in first 20%)/(Average thread pitch in last 80%) of Second flight section | (Length of Flow retarding structure)/(Total length of Screw) (%) | First treatment (RH %: average relative humidity/average ambient temperature) | Second treatment (average ambient temperature) | temperatures dropped to below 90° C. until dry mass basis moisture content deceases to below 25 mass % (hour) |
|---|---|---|---|---|---|---|---|---|
| Example 1 | 133% | 39% | 117% | 71% | 5% | 50 RH %, 30° C., 1 hour | 20° C., Air drying | 2 |
| Example 2 | 133% | 39% | 117% | 71% | 0% | 50 RH %, 30° C., 1 hour | 20° C., Air drying | 2 |
| Example 3 | 133% | 39% | 117% | 71% | 10% | 50 RH %, 30° C., 1 hour | 20° C., Air drying | 2 |
| Example 4 | 133% | 39% | 117% | 71% | 15% | 50 RH %, 30° C., 1 hour | 20° C., Air drying | 2 |
| Example 5 | 119% | 39% | 118% | 87% | 5% | 50 RH %, 30° C., 1 hour | 20° C., Air drying | 2 |
| Example 6 | 121% | 39% | 119% | 85% | 5% | 50 RH %, 30° C., 1 hour | 20° C., Air drying | 2 |
| Example 7 | 138% | 39% | 121% | 84% | 5% | 50 RH %, 30° C., 1 hour | 20° C., Air drying | 2 |
| Example 8 | 122% | 39% | 122% | 83% | 5% | 50 RH %, 30° C., 1 hour | 20° C., Air drying | 2 |
| Example 9 | 138% | 39% | 124% | 82% | 5% | 50 RH %, 30° C., 1 hour | 20° C., Air drying | 2 |
| Example 10 | 138% | 25% | 115% | 78% | 5% | 50 RH %, 30° C., 1 hour | 20° C., Air drying | 3 |
| Example 11 | 138% | 25% | 115% | 78% | 5% | 50 RH %, 30° C., 1 hour | 20° C., Air drying | 2 |
| Example 12 | 138% | 25% | 115% | 78% | 5% | 50 RH %, 30° C., 1 hour | 20° C., Air drying | 2 |
| Example 13 | 138% | 25% | 115% | 78% | 5% | 50 RH %, 30° C., 1 hour | 20° C., Air drying | 1.5 |
| Example 14 | 138% | 25% | 117% | 71% | 5% | 50 RH %, 30° C., 1 hour | 20° C., Air drying | 2 |
| Example 15 | 138% | 26% | 117% | 71% | 5% | No wetting treatment | 20° C., Air drying | 0.8 |
| Example 16 | 138% | 25% | 117% | 71% | 5% | No wetting treatment | 20° C., Air drying | 0.4 |
| Example 17 | 138% | 25% | 117% | 71% | 5% | No wetting treatment | 20° C., Air drying | 0.2 |
| Example 18 | 138% | 27% | 117% | 71% | 5% | No wetting treatment | 20° C., Air drying | 0.1 |
| Comparative Example 19 | 138% | 39% | 117% | 71% | 5% | No wetting treatment | 20° C., Air drying | 0.01 |

TABLE 2-continued

| | Processing conditions | | | | | | | | |
| | First flight section | Second flight section | | | Post-treatment section | | | |
| | Thread groove | Kneading section | Thread groove | Thread pitch | Flow retarding structure | Type of post-treatment | | Time after composition |
| | (Average thread groove depth in first 20%)/(Average thread groove depth in last 80%) of First flight section | (Length of Kneading section)/(Total length of Screw) (%) | (Average thread groove depth in first 20%)/(Average thread groove depth in last 80%) of Second flight section | (Average thread pitch in first 20%)/(Average thread pitch in last 80%) of Second flight section | (Length of Flow retarding structure)/(Total length of Screw) (%) | First treatment (RH %: average relative humidity; average ambient temperature) | Second treatment (average ambient temperature) | temperatures dropped to below 90° C. until dry mass basis moisture content desceases to below 25 mass % (hour) |
| Example 20 | 138% | 39% | 117% | 71% | 5% | No wetting treatment | 20° C., Air drying | 10 |
| Example 21 | 138% | 39% | 117% | 71% | 5% | 50 RH %, 4° C., 1 hour | 40° C., Air drying | 3 |
| Example 22 | 138% | 39% | 117% | 71% | 5% | 95 RH %, 60° C., 1 hour | 20° C., Air drying | 4 |
| Example 23 | 138% | 39% | 117% | 71% | 5% | Submerged in water at 4° C., | 20° C., Air drying | 4 |
| Example 24 | 133% | 39% | 117% | 71% | 5% | 50 RH %, 30° C., 1 hour | 20° C., Air drying | 1.4 |
| Example 25 | 133% | 39% | 117% | 71% | 5% | 50 RH %, 30° C., 1 hour | 20° C., Air drying | 1.2 |
| Example 26 | 100% | 39% | 117% | 72% | 5% | 50 RH %, 30° C., 1 hour | 20° C., Air drying | 2 |
| Example 27 | 120% | 39% | 117% | 72% | 5% | 50 RH %, 30° C., 1 hour | 20° C., Air drying | 2 |
| Example 28 | 140% | 39% | 117% | 72% | 5% | 50 RH %, 30° C., 1 hour | 20° C., Air drying | 2 |
| Example 29 | 150% | 39% | 117% | 72% | % | 50 RH %, 30° C., 1 hour | 20° C., Air drying | 2 |
| Example 30 | 133% | 39% | 140% | 72% | 15% | 70 RH %, 20° C., 0.7 hours | 20° C., Air drying | 3 |
| Example 31 | 133% | 39% | 130% | 72% | 15% | 70 RH %, 20° C., 0.7 hours | 20° C., Air drying | 2.8 |
| Example 32 | 133% | 39% | 117% | 72% | 15% | 70 RH %, 20° C., 0.7 hours | 20° C., Air drying | 2.3 |
| Example 33 | 133% | 39% | 100% | 72% | 15% | 70 RH %, 20° C., 0.7 hours | 20° C., Air drying | 2 |
| Example 34 | 133% | 39% | 117% | 60% | 10% | 60 RH %, 20° C., 0.8 hours | 20° C., Air drying | 2.8 |
| Example 35 | 133% | 39% | 117% | 72% | 10% | 60 RH %, 20° C., 0.8 hours | 20° C., Air drying | 2.5 |
| Example 36 | 133% | 39% | 117% | 85% | 10% | 60 RH %, 20° C., 0.8 hours | 20° C., Air drying | 2.5 |
| Example 37 | 133% | 39% | 117% | 95% | 10% | 60 RH %, 20° C., 0.8 hours | 20° C., Air drying | 2.3 |
| Example 38 | 133% | 39% | 117% | 100% | 10% | 60 RH %, 20° C., 0.8 hours | 20° C., Air drying | 2 |
| Example 39 | 133% | 39% | 117% | 71% | 5% | 80 RH %, 20° C., 1 hour | 20° C., Air drying | 10< |
| Example 40 | 133% | 39% | 117% | 71% | 5% | None | None | 10< |

TABLE 2-continued

| | | First flight section | Second flight section | | | Post-treatment section | | |
| | | Thread groove | Thread groove | Thread pitch | | Type of post-treatment | | |
| | | (Average thread groove depth in first 20%)/(Average thread groove depth in last 80%) of First flight section | Kneading section (Length of Kneading section)/(Total length of Screw) (%) | (Average thread groove depth in first 20%)/(Average thread groove depth in last 80%) of Second flight section | (Average thread pitch in first 20%)/(Average thread pitch in last 80%) of Second flight section | Flow retarding structure (Length of Flow retarding structure)/(Total length of Screw) (%) | First treatment (RH %: average relative humidity; average ambient temperature) | Second treatment (average ambient temperature) | Time after composition temperatures dropped to below 90° C. until dry mass basis moisture content desceases to below 25 mass % (hour) |
|---|---|---|---|---|---|---|---|---|---|
| Example | 41 | 138% | 19% | 113% | 80% | 5% | 50 RH %, 30° C., 1 hour | 20° C., Air drying | 2 |
| Example | 42 | 138% | 39% | 113% | 71% | 5% | 50 RH %, 30° C., 1 hour | 20° C., Air drying | 2 |
| Comparative Example | 43 | 138% | 39% | 113% | 71% | 5% | 50 RH %, 30° C., 1 hour | 20° C., Air drying | 0 |
| Example | 44 | 138% | 39% | 117% | 71% | 5% | 50 RH %, 30° C., 1 hour | 20° C., Air drying | 0 |
| Example | 45 | 138% | 39% | 117% | 71% | 5% | 50 RH %, 30° C., 1 hour | 20° C., Air drying | 0.3 |
| Example | 46 | 138% | 39% | 117% | 71% | 5% | 50 RH %, 30° C., 1 hour | 20° C., Air drying | 1 |
| Example | 47 | 138% | 39% | 117% | 71% | 5% | 50 RH %, 30° C., 1 hour | 20° C., Air drying | 3 |
| Example | 48 | 138% | 39% | 117% | 71% | 5% | 50 RH %, 30° C., 1 hour | 20° C., Air drying | 4 |
| Example | 49 | 138% | 39% | 117% | 71% | 5% | 50 RH %, 30° C., 1 hour | 20° C., Air drying | 4 |
| Comparative Example | 50 | 138% | 39% | 117% | 71% | 5% | 50 RH %, 30° C., 1 hour | 20° C., Air drying | 2.5 |
| Example | 51 | 138% | 39% | 117% | 71% | 5% | 50 RH %, 30° C., 1 hour | 20° C., Air drying | 2.1 |
| Example | 52 | 138% | 39% | 117% | 71% | 5% | 50 RH %, 30° C., 1 hour | 20° C., Air drying | 2 |
| Example | 53 | 138% | 39% | 117% | 71% | 5% | 50 RH %, 30° C., 1 hour | 20° C., Air drying | 2 |
| Example | 54 | 138% | 39% | 117% | 71% | 5% | 50 RH %, 30° C., 1 hour | 20° C., Air drying | 2 |
| Example | 55 | 138% | 39% | 117% | 71% | 5% | 50 RH %, 30° C., 1 hour | 20° C., Air drying | 1.3 |
| Comparative Example | 56 | 133% | 39% | 117% | 71% | 5% | 50 RH %, 30° C., 1 hour | 20° C., Air drying | 1.1 |
| Comparative Example | 57 | 133% | 39% | 117% | 71% | 5% | 50 RH %, 30° C., 1 hour | 20° C., Air drying | 2 |
| Example | 58 | 133% | 39% | 177% | 71% | 5% | 50 RH %, 30° C., 1 hour | 20° C., Air drying | 2 |
| Example | 59 | 128% | 39% | 115% | 75% | 5% | 50 RH %, 30° C., 1 hour | 20° C., Air drying | 2 |
| Example | 60 | 138% | 39% | 118% | 80% | 5% | 50 RH %, 30° C., 1 hour | 20° C., Air drying | 2 |

TABLE 2-continued

| | | Processing conditions | | | | | | | | |
|---|---|---|---|---|---|---|---|---|---|---|
| | | First flight section | Second flight section | | | | Post-treatment section | | | |
| | | Thread groove | Thread groove | Thread pitch | | Flow retarding structure | Type of post-treatment | | | Time after composition |
| | | (Average thread groove depth in first 20%)/ (Average thread groove depth in last 80%) of First flight section | Kneading section (Length of Kneading section)/ (Total length of Screw) (%) | (Average thread groove depth in first 20%)/ (Average thread groove depth in last 80%) of Second flight section | (Average thread pitch in first 20%)/ (Average thread pitch in last 80%) of Second flight section | (Length of Flow retarding structure)/ (Total length of Screw) (%) | First treatment (RH %: average relative humidity: average ambient temperature) | Second treatment (average ambient temperature) | | temperatures dropped to below 90° C. until dry mass basis moisture content desceases to below 25 mass % (hour) |
| Example | 61 | 133% | 39% | 117% | 71% | 5% | 50 RH %, 30° C., 1 hour | 20° C., Air drying | | 2 |
| Example | 62 | 133% | 39% | 117% | 71% | 5% | 50 RH %, 30° C., 1 hour | 20° C., Air drying | | 2 |
| Example | 63 | 133% | 39% | 117% | 71% | 5% | 50 RH %, 30° C., 1 hour | 20° C., Air drying | | 2 |
| Comparative Example | 64 | 133% | 39% | 117% | 71% | 5% | 50 RH %, 30° C., 1 hour | 20° C., Air drying | | 2 |
| Example | 65 | 133% | 10% | — | — | 1% | 50 RH %, 40° C., 4 hours | 20° C., Air drying | | 4 |
| Example | 66 | 133% | 10% | — | — | 0% | 50 RH %, 40° C., 4 hours | 60° C., Air drying | | 1 |
| Example | 67 | 133% | 10% | — | — | 1% | No wetting treatment | 70° C., Air drying | | 0.2 |

TABLE 3

| | | Moisture | Protein | | Insoluble | |
|---|---|---|---|---|---|---|
| | | Dry mass basis moisture content (%) | Origin of Protein | Protein content (wet mass basis %) | dietary fiber content (wet mass basis %) | Starch Origin of Starch |
| Example | 1 | 70% | Yellow pea | 12.8 | 9.2 | Yellow pea |
| Example | 2 | 70% | Yellow pea | 12.8 | 9.2 | Yellow pea |
| Example | 3 | 72% | Yellow pea | 12.8 | 9.2 | Yellow pea |
| Example | 4 | 70% | Yellow pea | 12.8 | 9.2 | Yellow pea |
| Example | 5 | 70% | Soybean + Yellow pea | 17.6 | 4.1 | Yellow pea |
| Example | 6 | 70% | Lentil | 7.6 | 11.8 | Lentil |
| Example | 7 | 70% | Black turtle bean | 7.1 | 10.6 | Black turtle bean |
| Example | 8 | 70% | White pea | 8.8 | 9.4 | White pea |
| Example | 9 | 70% | Chickpea | 6.9 | 7.6 | Chickpea |
| Example | 10 | 70% | Yellow pea | 4.1 | 3.5 | Yellow pea |
| Example | 11 | 70% | Yellow pea | 8.2 | 4.7 | Yellow pea |
| Example | 12 | 70% | Yellow pea | 10.6 | 7.1 | Yellow pea |
| Example | 13 | 70% | Yellow pea | 17.6 | 17.6 | Yellow pea |
| Example | 14 | 70% | Yellow pea | 12.8 | 9.2 | Yellow pea |
| Example | 15 | 70% | Yellow pea | 12.8 | 9.2 | Yellow pea |
| Example | 16 | 70% | Yellow pea | 12.8 | 9.2 | Yellow pea |
| Example | 17 | 70% | Yellow pea | 12.8 | 9.2 | Yellow pea |
| Example | 18 | 70% | Yellow pea | 12.8 | 9.2 | Yellow pea |
| Comparative Example | 19 | 70% | Yellow pea | 12.8 | 9.2 | Yellow pea |
| Example | 20 | 70% | Yellow pea | 12.8 | 11.8 | Yellow pea |
| Example | 21 | 70% | Yellow pea | 12.8 | 9.2 | Yellow pea |
| Example | 22 | 70% | Yellow pea | 12.8 | 9.2 | Yellow pea |
| Example | 23 | 70% | Yellow pea | 12.8 | 9.2 | Yellow pea |
| Example | 24 | 70% | Yellow pea | 12.8 | 9.2 | Yellow pea |
| Example | 25 | 70% | Yellow pea | 12.8 | 9.2 | Yellow pea |
| Example | 26 | 70% | Yellow pea | 12.8 | 9.2 | Yellow pea |
| Example | 27 | 70% | Yellow pea | 12.8 | 9.2 | Yellow pea |
| Example | 28 | 70% | Yellow pea | 12.8 | 9.2 | Yellow pea |
| Example | 29 | 70% | Yellow pea | 12.8 | 9.2 | Yellow pea |
| Example | 30 | 70% | Yellow pea | 12.8 | 9.2 | Yellow pea |
| Example | 31 | 70% | Yellow pea | 12.8 | 9.2 | Yellow pea |
| Example | 32 | 70% | Yellow pea | 12.8 | 9.2 | Yellow pea |
| Example | 33 | 70% | Yellow pea | 12.8 | 9.2 | Yellow pea |
| Example | 34 | 70% | Yellow pea | 12.8 | 9.2 | Yellow pea |
| Example | 35 | 70% | Yellow pea | 12.8 | 9.2 | Yellow pea |
| Example | 36 | 70% | Yellow pea | 12.8 | 9.2 | Yellow pea |
| Example | 37 | 70% | Yellow pea | 12.8 | 9.2 | Yellow pea |
| Example | 38 | 70% | Yellow pea | 12.8 | 9.2 | Yellow pea |
| Example | 39 | 70% | Yellow pea | 12.8 | 9.2 | Yellow pea |
| Example | 40 | 70% | Yellow pea | 12.8 | 9.2 | Yellow pea |
| Example | 41 | 70% | Yellow pea | 12.8 | 9.2 | Yellow pea |
| Example | 42 | 70% | Yellow pea | 12.8 | 9.2 | Yellow pea |
| Comparable Example | 43 | 20% | Yellow pea | 18.2 | 13.0 | Yellow pea |
| Example | 44 | 26% | Yellow pea | 17.3 | 12.4 | Yellow pea |
| Example | 45 | 35% | Yellow pea | 16.1 | 11.6 | Yellow pea |
| Example | 46 | 45% | Yellow pea | 15.0 | 10.8 | Yellow pea |
| Example | 47 | 100% | Yellow pea | 10.9 | 7.8 | Yellow pea |
| Example | 48 | 150% | Yellow pea | 8.7 | 6.2 | Yellow pea |
| Example | 49 | 200% | Yellow pea | 7.3 | 5.2 | Yellow pea |
| Comparative Example | 50 | 70% | Yellow pea | 12.8 | 9.2 | Yellow pea |
| Example | 51 | 70% | Yellow pea | 12.8 | 9.2 | Yellow pea |
| Example | 52 | 70% | Yellow pea | 12.8 | 9.2 | Yellow pea |
| Example | 53 | 70% | Yellow pea | 12.8 | 9.2 | Yellow pea |
| Example | 54 | 70% | Yellow pea | 12.8 | 9.2 | Yellow pea |
| Example | 55 | 70% | Yellow pea | 12.8 | 9.2 | Yellow pea |
| Comparative Example | 56 | 70% | Yellow pea | 12.8 | 9.2 | Yellow pea |
| Comparative Example | 57 | 70% | Yellow pea | 12.8 | 9.2 | Yellow pea |
| Example | 58 | 70% | Yellow pea | 12.8 | 9.2 | Yellow pea |
| Example | 59 | 70% | Yellow pea | 12.8 | 9.2 | Yellow pea |
| Example | 60 | 70% | Yellow pea | 12.8 | 9.2 | Yellow pea |
| Example | 61 | 55% | Yellow pea | 14.1 | 10.1 | Yellow pea |
| Example | 62 | 55% | Yellow pea | 14.1 | 10.1 | Yellow pea |
| Example | 63 | 55% | Yellow pea | 14.1 | 10.1 | Yellow pea |

TABLE 3-continued

Characteristics of dough compositions
Dough compositions

| | | Moisture | Protein | | | Insoluble | |
| | | Dry mass basis moisture content (%) | Origin of Protein | Protein content (wet mass basis %) | dietary fiber content (wet mass basis %) | Starch Origin of Starch |
|---|---|---|---|---|---|---|
| Comparative Example | 64 | 55% | Yellow pea | 14.1 | 10.1 | Yellow pea |
| Example | 65 | 51% | Yellow pea | 14.4 | 10.3 | Yellow pea |
| Example | 66 | 51% | Yellow pea | 14.4 | 10.3 | Yellow pea |
| Example | 67 | 51% | Yellow pea | 14.4 | 10.3 | Yellow pea |

TABLE 4

Characteristics of compositions during/after processing
Starch-containing compositions

| | | | Starch | | | | | Insoluble dietary fiber |
| | | Moisture Dry mass basis moisture content after post-treatment (%) | [A] Degree of gelatinization of starch after kneading (mass %) | [B] Degree of gelatinization of starch after aging (mass %) | [A] – [B] (mass %) | (a) Number of starch grains (/mm2) | (b) RVA peak temperature of gelatinization (° C.) | d90 of post-processing composition after amylase/protease treatment and ultrasonication (μm) |
|---|---|---|---|---|---|---|---|---|
| Example | 1 | 10% | 97% | 45% | 52% | 0 | 81 | 103 |
| Example | 2 | 10% | 96% | 68% | 28% | 0 | 75 | 89 |
| Example | 3 | 10% | 98% | 40% | 58% | 0 | 91 | 86 |
| Example | 4 | 10% | 95% | 31% | 64% | 0 | 86 | 89 |
| Example | 5 | 10% | 98% | 47% | 51% | 0 | 67 | 98 |
| Example | 6 | 10% | 96% | 44% | 52% | 0 | 75 | 101 |
| Example | 7 | 10% | 95% | 54% | 41% | 0 | 80 | 102 |
| Example | 8 | 10% | 92% | 47% | 45% | 0 | 81 | 88 |
| Example | 9 | 10% | 95% | 44% | 51% | 0 | 72 | 98 |
| Example | 10 | 10% | 80% | 56% | 24% | 0 | 88 | 45 |
| Example | 11 | 10% | 82% | 51% | 31% | 0 | 92 | 58 |
| Example | 12 | 10% | 89% | 51% | 38% | 0 | 93 | 61 |
| Example | 13 | 10% | 98% | 48% | 50% | 0 | 94 | 78 |
| Example | 14 | 10% | 97% | 45% | 52% | 0 | 86 | 105 |
| Example | 15 | 10% | 97% | 76% | 21% | 0 | 86 | 153 |
| Example | 16 | 10% | 96% | 81% | 15% | 0 | 93 | 86 |
| Example | 17 | 10% | 96% | 86% | 10% | 0 | 91 | 140 |
| Example | 18 | 10% | 98% | 91% | 7% | 0 | 90 | 98 |
| Comparative Example | 19 | 10% | 96% | 91% | 5% | 0 | 52 | 108 |
| Example | 20 | 10% | 98% | 38% | 60% | 0 | 63 | 96 |
| Example | 21 | 10% | 98% | 41% | 57% | 0 | 69 | 48 |
| Example | 22 | 20% | 98% | 38% | 60% | 0 | 72 | 56 |
| Example | 23 | 20% | 98% | 35% | 63% | 0 | 70 | 58 |
| Example | 24 | 10% | 94% | 73% | 21% | 0 | 69 | 97 |
| Example | 25 | 10% | 95% | 86% | 9% | 0 | 73 | 87 |
| Example | 26 | 10% | 79% | 35% | 44% | 0 | 74 | 131 |
| Example | 27 | 10% | 90% | 40% | 50% | 0 | 73 | 122 |
| Example | 28 | 10% | 98% | 44% | 54% | 0 | 74 | 68 |
| Example | 29 | 10% | 98% | 43% | 55% | 0 | 71 | 51 |
| Example | 30 | 10% | 97% | 28% | 69% | 0 | 70 | 181 |
| Example | 31 | 10% | 96% | 33% | 63% | 0 | 70 | 161 |
| Example | 32 | 10% | 97% | 39% | 58% | 0 | 73 | 105 |
| Example | 33 | 10% | 97% | 70% | 27% | 0 | 70 | 84 |
| Example | 34 | 14% | 98% | 35% | 63% | 0 | 73 | 101 |
| Example | 35 | 14% | 94% | 38% | 56% | 0 | 73 | 101 |
| Example | 36 | 14% | 97% | 68% | 29% | 0 | 74 | 99 |
| Example | 37 | 14% | 96% | 80% | 16% | 0 | 71 | 99 |
| Example | 38 | 14% | 98% | 88% | 10% | 0 | 73 | 99 |
| Example | 39 | 36% | 95% | 71% | 24% | 0 | 72 | 103 |
| Example | 40 | 65% | 96% | 86% | 10% | 0 | 70 | 103 |
| Example | 41 | 10% | 49% | 40% | 9% | 131 | 110 | 111 |
| Example | 42 | 10% | 59% | 45% | 14% | 0 | 102 | 512 |
| Comparative Example | 43 | 10% | 51% | 47% | 4% | 0 | 80 | 102 |
| Example | 44 | 10% | 76% | 68% | 8% | 0 | 80 | 84 |
| Example | 45 | 10% | 86% | 72% | 14% | 0 | 75 | 58 |
| Example | 46 | 10% | 84% | 68% | 16% | 0 | 71 | 45 |

TABLE 4-continued

Characteristics of compositions during/after processing
Starch-containing compositions

| | | Moisture Dry mass basis moisture content after post-treatment (%) | Starch | | | | | Insoluble dietary fiber |
| | | | [A] Degree of gelatinization of starch after kneading (mass %) | [B] Degree of gelatinization of starch after aging (mass %) | [A] − [B] (mass %) | (a) Number of starch grains (/mm2) | (b) RVA peak temperature of gelatinization (° C.) | d90 of post-processing composition after amylase/protease treatment and ultrasonication (μm) |
|---|---|---|---|---|---|---|---|---|
| Example | 47 | 10% | 95% | 55% | 40% | 0 | 70 | 43 |
| Example | 48 | 10% | 95% | 45% | 50% | 0 | 75 | 35 |
| Example | 49 | 10% | 95% | 38% | 57% | 0 | 72 | 33 |
| Comparative Example | 50 | 10% | 28% | 22% | 6% | 321 | 131 | 105 |
| Example | 51 | 10% | 51% | 44% | 7% | 115 | 119 | 45 |
| Example | 52 | 10% | 62% | 51% | 11% | 0 | 101 | 311 |
| Example | 53 | 10% | 71% | 53% | 18% | 0 | 69 | 110 |
| Example | 54 | 10% | 88% | 48% | 40% | 0 | 63 | 108 |
| Example | 55 | 10% | 92% | 68% | 24% | 0 | 58 | 107 |
| Comparative Example | 56 | 10% | 56% | 90% | 6% | 0 | 50 | 98 |
| Comparative Example | 57 | 12% | 24% | 18% | 6% | 405 | 125 | 103 |
| Example | 58 | 12% | 39% | 27% | 12% | 205 | 117 | 104 |
| Example | 59 | 12% | 45% | 31% | 14% | 89 | 102 | 54 |
| Example | 60 | 12% | 65% | 43% | 22% | 0 | 89 | 121 |
| Example | 61 | 10% | 60% | 41% | 19% | 0 | 96 | 98 |
| Example | 62 | 10% | 58% | 45% | 13% | 0 | 96 | 98 |
| Example | 63 | 10% | 58% | 48% | 8% | 0 | 90 | 98 |
| Comparative Example | 64 | 10% | 60% | 55% | 5% | 0 | 89 | 99 |
| Example | 65 | 5% | 91% | 71% | 20% | 0 | 85 | 68 |
| Example | 66 | 5% | 92% | 80% | 12% | 0 | 86 | 56 |
| Example | 67 | 5% | 92% | 86% | 6% | 0 | 88 | 56 |

TABLE 5 / TABLE 5-continued

Sensory evaluation

| | | Matte appearance | Shape disintegration during heat cooking | Comments |
|---|---|---|---|---|
| Example | 1 | 5 | 5 | |
| Example | 2 | 4 | 5 | |
| Example | 3 | 5 | 5 | |
| Example | 4 | 5 | 5 | |
| Example | 5 | 5 | 5 | |
| Example | 6 | 5 | 5 | |
| Example | 7 | 5 | 5 | |
| Example | 8 | 5 | 5 | |
| Example | 9 | 5 | 5 | |
| Example | 10 | 5 | 5 | |
| Example | 11 | 5 | 5 | |
| Example | 12 | 5 | 5 | |
| Example | 13 | 5 | 4 | |
| Example | 14 | 5 | 5 | Noticeable discolouration associated with burn |
| Example | 15 | 5 | 5 | |
| Example | 16 | 5 | 5 | |
| Example | 17 | 4 | 5 | |
| Example | 18 | 3 | 5 | |
| Comparative Example | 19 | 2 | 5 | |
| Example | 20 | 5 | 5 | |
| Example | 21 | 5 | 5 | |
| Example | 22 | 5 | 5 | |
| Example | 23 | 5 | 5 | |
| Example | 24 | 4 | 5 | |
| Example | 25 | 4 | 5 | |
| Example | 26 | 4 | 4 | |
| Example | 27 | 5 | 5 | |
| Example | 28 | 5 | 5 | |
| Example | 29 | 5 | 5 | |
| Example | 30 | 5 | 5 | |
| Example | 31 | 5 | 5 | |
| Example | 32 | 5 | 5 | |
| Example | 33 | 4 | 5 | |
| Example | 34 | 5 | 5 | |
| Example | 35 | 5 | 5 | |
| Example | 36 | 5 | 5 | |
| Example | 37 | 4 | 5 | |
| Example | 38 | 3 | 5 | |
| Example | 39 | 4 | 5 | |
| Example | 40 | 3 | 5 | |
| Example | 41 | 4 | 3 | |
| Example | 42 | 5 | 5 | Slight discolouration associated with burn |
| Comparative Example | 43 | 1 | 3 | |
| Example | 44 | 3 | 3 | |
| Example | 45 | 5 | 5 | |
| Example | 46 | 5 | 5 | |
| Example | 47 | 5 | 5 | |
| Example | 48 | 5 | 5 | |
| Example | 49 | 5 | 5 | |
| Comparative Example | 50 | 3 | 2 | |
| Example | 51 | 4 | 4 | |
| Example | 52 | 5 | 4 | |
| Example | 53 | 5 | 5 | |
| Example | 54 | 5 | 5 | |
| Example | 55 | 5 | 5 | |
| Comparative Example | 56 | 3 | 5 | Slight discolouration associated with burn |
| Comparative Example | 57 | 3 | 1 | |

TABLE 5-continued

| | | Sensory evaluation | |
| | Matte appear-ance | Shape disinte-gration during heat cooking | Comments |
| --- | --- | --- | --- |
| Example | 58 | 4 | 3 |
| Example | 59 | 5 | 4 |
| Example | 60 | 5 | 5 |
| Example | 61 | 5 | 5 |
| Example | 62 | 5 | 4 |
| Example | 63 | 4 | 3 |
| Comparative Example | 64 | 3 | 1 |
| Example | 65 | 5 | 5 |
| Example | 66 | 5 | 5 |
| Example | 67 | 4 | 4 |

One or more embodiments of the present invention is widely applicable in the field of various food products for cooking, and its use is of great value.

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

EXPLANATION OF SYMBOLS

| | |
| --- | --- |
| 100, 102 | Extruder |
| 200, 202 | Barrel |
| 300, 302 | Screw |
| 400, 402 | Feeder |
| 500 | Die section (flow channel shown in broken lines) |
| 502/602 | Die and vent section (flow channel shown in broken lines) |
| 600 | Vent section |
| 700, 702 | Heater |
| 800, 800A, 800B, 802, 802A, 802B | Cooler |
| 200A, 202A, 300A, 302A | First flight section |
| 200B, 202B, 300B, 302B | Kneading section |
| 200C, 300C | Second flight section |

What is claimed is:

1. A method for producing a composition using an extruder comprising: a screw to be rotated by a motor; a barrel surrounding the circumference of the screw comprising a tip side and a base side; a feeder, attached to the base side of the barrel, for injecting a food material; and a die section, attached to the tip side of the barrel, for molding and discharging a kneaded food material; and a vent section integrated with the die section as a single unit, the barrel being free of a vent section; wherein the composition contains starch and is used for heat cooking, and the screw includes, from the base side to the tip side, at least a first flight section and a kneading section, the method comprising: (i) preparing the composition with an insoluble dietary fiber content of 3.0 mass % or more in terms of wet mass basis, a starch content of 10.0 mass % or more in terms of wet mass basis, a protein content of 3.0 mass % or more in terms of wet mass basis, and a dry mass basis moisture content of more than 45 mass %; (ii) heating the composition prepared at step (i) along a course from the first flight section to the kneading section under a pressure of 0.01 MPa or higher and 50 MPa or lower so as to reach a temperature of 105° C. or more but 200° C. or less at the kneading section under pressurized conditions, while kneading the composition with an SME value of 350 kJ/kg or more; (iii) cooling the composition heated at step (ii) under a pressure of 0.01 MPa or higher and 50 MPa or lower to a temperature of less than 100° C.; (iv) depressurizing the composition cooled at step (iii), from a pressurized state at the kneading section to atmospheric pressure or less at the vent section.

2. The method according to claim 1, wherein the screw further includes a second flight section on the tip side of the kneading section.

3. The method according to claim 1, wherein the highest temperature of the composition kneaded at step (ii) is decreased by 20° C. or more along a course from the kneading section to an outlet of the die section.

4. The method according to claim 1, wherein a groove-like structure is formed on the inner wall of the barrel in an area of 30% or less of the total length of the kneading section.

5. The method according to claim 2, wherein a cooling equipment is provided at any position between the kneading section and the second flight section and/or the die section.

6. The method according to claim 1, wherein an average thread groove depth in a region corresponding to the last 80% of the total length of the first flight section is smaller than the average thread groove depth in a region corresponding to the first 20% of the total length of the first flight section from the base side start point of the first flight section.

7. The method according to claim 2, wherein the average thread groove depth in a region corresponding to the last 80% of the total length of the second flight section is smaller than the average thread groove depth in a region corresponding to the first 20% of the total length of the second flight section from the base side start point of the second flight section.

8. The method according to claim 2, wherein an average thread groove pitch in a region corresponding to the last 80% of the total length of the second flight section is larger than the average thread groove pitch in a region corresponding to the first 20% of the total length of the second flight section from the base side start point of the second flight section.

9. The method according to claim 1, wherein when the composition is subjected to treatment under Procedure A followed by ultrasonication, and then measurement for the particle diameter distribution, the $d_{50}$ and/or $d_{90}$ obtained from the particle diameter distribution is less than 450 μm, wherein Procedure A comprises 6 mass % aqueous suspension of the composition is treated with 0.4 volume % of protease and 0.02 mass % of α-amylase at 20° C. for 3 days.

10. The method according to claim 1, wherein the degree of gelatinization of the starch in the composition after kneading at step (ii) is 30 mass % or more.

11. The method according to claim 1, wherein the composition after the kneading at step (ii) or after the depressurization at step (iv) satisfies the requirement(s) (a) and/or (b) below:
   (a) when 6% suspension of a crushed product of the composition is observed, the number of starch grain structures observed is 300/mm² or less,
   (b) when 14 mass % aqueous slurry of a crushed product of the composition is subjected to measurement with a rapid visco-analyzer with elevating the temperature from 50° C. to 140° C. at a rate of 12.5° C./min, the peak temperature of gelatinization obtained is lower than 120° C.

12. The method according to claim 1, wherein the composition contains an edible plant, having a ratio of the content of starch contained in the edible plant to the total starch content in the composition of 30 mass % or more.

13. The method according to claim 12, wherein the edible plant is a pulse, selected from one or more of *Pisum, Phaseolus, Cajanus, Vigna, Vicia, Cicer, Glycine* and Lens species.

14. The method according to claim 13, wherein the composition contains the pulse at a ratio of 50 mass % or more in terms of dry mass basis.

15. The method according to claim 1, wherein the composition is a product having a specific gravity of 1.0 or more.

16. The method according to claim 1, further comprising the step of: (v) crushing the composition from step (iv) to produce a crushed composition.

17. The method according to claim 16, further comprising the step of: (vi) agglomerating the crushed composition from step (v) to produce a crushed composition agglomerate.

18. The method according to claim 2, wherein the extruder further comprises a flow retarding structure located between a tip side end point of the second flight section and the die section.

19. A method for producing a composition using an extruder comprising: a screw to be rotated by a motor; a barrel surrounding the circumference of the screw comprising a tip side and a base side; a feeder, attached to the base side of the barrel, for injecting a food material; a die section, attached to the tip side of the barrel, for molding and discharging a kneaded food material; and a vent section integrated with the die section as a single unit, the barrel being free of a vent section; wherein: the composition contains starch and is used for heat cooking, and the screw includes, from the base side to the tip side, at least a first flight section and a kneading section, the method comprising: (i) preparing the composition with an insoluble dietary fiber content of 3.0 mass % or more in terms of wet mass basis, a starch content of 10.0 mass % or more in terms of wet mass basis, a protein content of 3.0 mass % or more in terms of wet mass basis, and a dry mass basis moisture content of more than 25 mass %; (ii) heating the composition prepared at step (i) along a course from the first flight section to the kneading section so as to reach a temperature of 100° C. or more but 200 C or less at the kneading section under pressurized conditions, while kneading the composition with an SME value of 350 kJ/kg or more; (iii) cooling the composition heated at step (ii) under a pressure of 0.01 MPa or higher and 50 MPa or lower to a temperature of less than 100° C.; (iv) depressurizing the composition cooled at step (iii), from a pressurized state at the kneading section to atmospheric pressure or less at the vent section; (v) adjusting the dry mass basis moisture content of the composition obtained at step (iv) to less than 15 mass %; (vi) crushing the composition obtained at step (v) to obtain a crushed composition; (vii) agglomerating the crushed composition to obtain a crushed composition agglomerate.

20. A method for producing a composition using an extruder comprising: a screw to be rotated by a motor; a barrel surrounding the circumference of the screw comprising a tip side and a base side; a feeder, attached to the base side of the barrel, for injecting a food material; a die section, attached to the tip side of the barrel, for molding and discharging a kneaded food material; and a vent section integrated with the die section as a single unit, the barrel being free of a vent section; wherein: the composition contains starch and is used for heat cooking, and the screw includes, from the base side to the tip side, at least a first flight section and a kneading section, the method comprising: (i) preparing the composition comprising a pulse with seed skin, the composition comprising an insoluble dietary fiber content of 3.0 mass % or more in terms of wet mass basis, a starch content of 10.0 mass % or more in terms of wet mass basis, a protein content of 3.0 mass % or more and 60 mass % or less in terms of wet mass basis, and a dry mass basis moisture content of more than 45 mass %; (ii) heating the composition prepared at step (i) along a course from the first flight section to the kneading section under a pressure of 0.01 MPa or higher and 50 MPa or lower so as to reach a temperature of 105° C. or more but 200° C. or less at the kneading section, while kneading the composition with an SME value of 550 kJ/kg or more; (iii) cooling the composition heated at step (ii) under a pressure of 0.01 MPa or higher and 50 MPa or lower to a temperature of less than 90° C.; (iv) depressurizing the composition cooled at step (iii), from a pressurized state at the kneading section to atmospheric pressure or less at the vent section; (v) adjusting the dry mass basis moisture content of the composition obtained at step (iv) to less than 15 mass %.

\* \* \* \* \*